(12) United States Patent
Chang et al.

(10) Patent No.: US 10,239,170 B2
(45) Date of Patent: Mar. 26, 2019

(54) PRECISION GUN SMITH PLATFORM

(71) Applicant: Stage 5 Enterprises, LLC, Laguna Hills, CA (US)

(72) Inventors: Charles Chang, Laguna Hills, CA (US); Emil Chao, Studio City, CA (US)

(73) Assignee: Stage 5 Enterprises, LLC, Laguna Hills, CA (US)

( * ) Notice: Subject to any disclaimer, the term of this patent is extended or adjusted under 35 U.S.C. 154(b) by 71 days.

(21) Appl. No.: 15/636,603

(22) Filed: Jun. 28, 2017

(65) Prior Publication Data

US 2017/0368652 A1 Dec. 28, 2017

Related U.S. Application Data

(60) Provisional application No. 62/355,743, filed on Jun. 28, 2016.

(51) Int. Cl.

| | |
|---|---|
| *B23Q 3/06* | (2006.01) |
| *B23Q 3/00* | (2006.01) |
| *B25H 1/02* | (2006.01) |
| *B25H 1/10* | (2006.01) |
| *B25H 1/00* | (2006.01) |
| *F41A 3/66* | (2006.01) |
| *B25H 1/08* | (2006.01) |
| *F41C 3/00* | (2006.01) |

(52) U.S. Cl.
CPC ............. *B23Q 3/062* (2013.01); *B23Q 3/005* (2013.01); *B25H 1/0042* (2013.01); *B25H 1/02* (2013.01); *B25H 1/08* (2013.01); *B25H 1/10* (2013.01); *F41A 3/66* (2013.01); *F41C 3/00* (2013.01)

(58) Field of Classification Search
CPC ...... B23Q 3/062; B23Q 3/005; B25H 1/0042; B25H 1/02; B25H 1/08; B25H 1/10; F41A 3/66; F41A 3/00
USPC ........................................................ 269/303
See application file for complete search history.

(56) References Cited

U.S. PATENT DOCUMENTS

| | | | | |
|---|---|---|---|---|
| 1,308,451 A | * | 7/1919 | Schachat | B23Q 16/007 269/10 |
| 3,060,982 A | * | 10/1962 | Patterson | B23Q 3/005 144/117.3 |
| 3,172,417 A | * | 3/1965 | Zulkowitz | B23Q 3/005 144/134.1 |
| 3,379,229 A | * | 4/1968 | Siegal | B23D 47/025 108/64 |
| 4,289,305 A | * | 9/1981 | Penner | B27B 25/10 269/303 |
| 4,488,714 A | * | 12/1984 | Phillips | B23Q 3/005 269/233 |

(Continued)

*Primary Examiner* — George B Nguyen
(74) *Attorney, Agent, or Firm* — Weide & Miller, Ltd.

(57) ABSTRACT

A gun smith platform includes a top plate. The top plate has a tool hole centrally disposed on the top plate that extends through the top plate through which a work piece attached to a work tool mounted to a bottom side of the top plate may extend, a plurality of alignment holes extending in a linear pattern from the tool hole, the alignment holes configured to receive alignment pins, at least one row of threaded mounting holes disposed parallel to the linear pattern of alignment holes, and a recessed track disposed parallel to the at least one row of threaded mounting holes. Four legs are attached to and supporting the top plate.

20 Claims, 47 Drawing Sheets

(56) References Cited

U.S. PATENT DOCUMENTS

| | | | | |
|---|---|---|---|---|
| 4,521,006 A | * | 6/1985 | Waters | B23Q 1/267 |
| | | | | 269/304 |
| 4,684,113 A | * | 8/1987 | Douglas | B23Q 1/035 |
| | | | | 269/21 |
| 4,880,221 A | * | 11/1989 | Richards | B25B 5/10 |
| | | | | 269/139 |
| 5,135,036 A | * | 8/1992 | Caron | B25H 1/02 |
| | | | | 144/286.1 |
| 5,715,880 A | * | 2/1998 | Tucker | B23Q 3/002 |
| | | | | 144/134.1 |
| 6,131,896 A | * | 10/2000 | Csipkes | B25B 11/02 |
| | | | | 269/100 |
| 7,886,455 B1 | * | 2/2011 | Stojkovic | G01B 3/563 |
| | | | | 33/534 |
| 8,215,296 B1 | * | 7/2012 | Cisneros | B28D 7/04 |
| | | | | 108/28 |
| 9,009,986 B1 | * | 4/2015 | Chang | F41A 3/66 |
| | | | | 33/640 |
| 2015/0075410 A1 | * | 3/2015 | Wong | B23K 26/38 |
| | | | | 108/28 |
| 2017/0100834 A1 | * | 4/2017 | Luis y Prado | B25H 1/04 |

* cited by examiner

PRECISION GUN SMITH PLATFORM

BACKGROUND

1. Field

The disclosed embodiments relate to product manufacturing and finishing, and more specifically relate to jigs, templates, aids, and methods for manufacturing and finishing firearms, such as 80% firearms.

2. Related Art

Building and finishing firearms, such as 80% firearms is a popular craft among enthusiasts. Typically, this craft requires a high level of skill for the user to complete. Additionally, high-cost machines such as milling machines, lathes, and the like have traditionally been necessary for finishing firearms. This has prevented this hobby from becoming more widespread. Many would likely enjoy firearm finishing, but lack time and means to learn the skill and acquire the necessary tools.

Several different firearms are offered as 80% firearms for finishing by enthusiasts. One example of an 80% fire arm is 1911 handgun platform. The 1911 80% series frame includes several different "classes" of frame styles. For example, there is are standard government frames that come in standard and officer sizes. These frames are characterized by flat frame sides. In 80% frames, the slide stop and safety holes are typically already machined. Another class of frames are government frames with a tactical rail, or tactical class. These have tactical rails in the frame sides that are not flat. A third class of frames are two part frames where the top is steel and the bottom grip is plastic or metal. These frames are wider than standard frames and have a variable width in the front and rear of the sides. These frames are used for the higher end "race gun" market that is dominated by custom build guns.

To complete an 80% firearm such as the 1911 handgun, several steps are required. Such steps include "decking" the frame by reducing the height of the frame to bring the "deck" into specification. This is typically done with a milling machine to mill the top of the frame to the proper height. Another step is to finish the barrel seat of the frame to round the feature. This is also traditionally completed with a milling machine with a ball end mill. As other examples, the frame rails that retain the slide need to be fabricated, the frame rail width needs to be reduced, and the hammer and sear holes need to be drilled.

Thus, there are several processes requiring significant skill and costly tools. What is needed are products and methods that simplify the finishing of an 80% firearm to make the craft more accessible to enthusiasts.

SUMMARY

Accordingly, a precision gun smith platform (GSPlat) is provided that provides templates and methods for finishing firearms with lower cost tools that requires less skill from the user. The GSPlat incorporates a router in an inverted position under the main routing surface similar to a wood working router table. The GSPlat table along with a set of attachments, jigs, and templates allow the user to hold +/−0.001" tolerance required for precision gunsmithing. This is a low cost and lower skill approach as opposed to a more traditional milling machine with the required vices, collets, end mills, and specialized measurement tools that require training or familiarity with metal working. Unlike a generic milling machine, the GSPlat is template and jig driven that is adaptable for each set or series of gunsmithing steps for a specific firearm.

The jig and template structure allows the user to complete several gunsmithing tasks on different pistols, rifles, and shotguns above and beyond completing 80% firearms. Using the presets features, the GSPlat offers simplified operation and ease of use for one class of customers. Using the precision adjustment features, custom and precise gunsmithing can be achieved for another class of customers.

For many precision rifles and guns, many other parts need to be fitted to the firearm (such as the barrel) or modified (adding complex sights, flatten the top of the slide to reduce, or fitting improve beavertail safeties. This complex system enables complex gunsmith operation that can be done with household tools, requires little or no measurements, and in many case, is template driven.

Beyond 80% frames, the disclosed embodiments allow for the machining and fitting required for the other parts typically used to improve performance, accuracy, and ergonomics. The embodiments generally provide a template driven process that results in the desired finished product that removes the need for 1) complex setup and measurements, 2) custom ways of holding down the part, and 3) a complex and expensive x-y stage seen in mills. Further, the disclosed embodiments help constrain the part to remove only the desired material. This system can be adopted to a large number of modifications, added features, and part fitting associated with gunsmithing of rifles, pistols, and shotguns Also described herein is a jig designed to complete the 1911 80% frame jig (FrmJig) using a hand-held router. This configuration is like several other jigs that adapt hand held routers to 80% AR-15 frames where the router moves relative to a stationary firearm. Although the primary object of the FrmJig is the 80% 1911 frame, this jig can be adapted to several other available and planned pistols. Unlike the 80% AR-15 jigs that focus on milling out pockets, the FrmJig machines rails that are often used for pistols that require reciprocating slides.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF EMBODIMENTS

General Setup

A gun smith platform and methods for finishing a firearm on a gun smith platform will be described. Components of a gun smith platform and key jigs and sub-systems will first be described including sub parts and assemblies.

Router Table Assembly and Router Alignment

Figure 1:
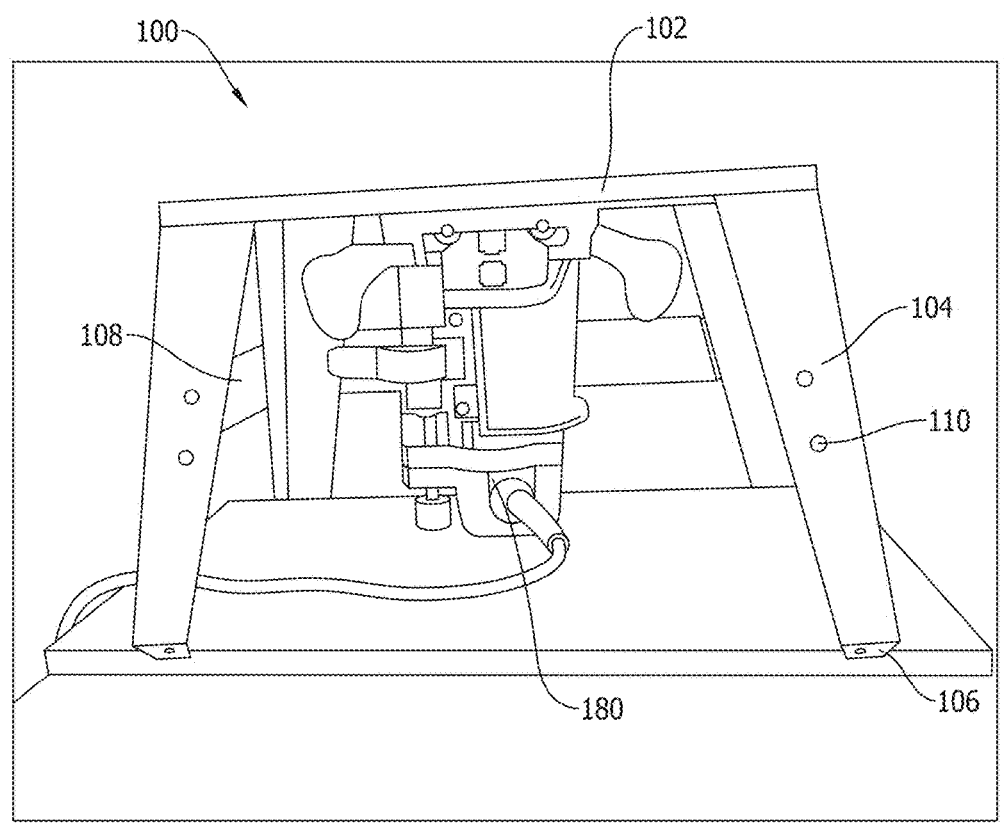
FIG. 1 shows a precision gun smith platform, according to one exemplary embodiment.

FIG. 1 shows a precision gun smith platform, according to one exemplary embodiment. A gun smith platform 100 comprises a top plate 102 with supporting legs 104. The legs 104 may comprise flanges 106 at a bottom end thereof for mounting the platform 100 to stabilize it during use. Cross members 108 may be connected to the legs 103 via holes 110 to further stabilize the platform 100. A machine tool 180 is mounted on a bottom side of the top plate 102. The machine tool 180 may comprise a router and is used to remove material from a workpiece as will be described in more detail below.

In some embodiments, a standard wood working router may be attached to the gun smith platform 100. This allows for lower costs to an operator. However, wood working tools generally operate at high speeds. When metalworking, such speeds may overheat cutting tools. Accordingly, the wood working router may be modified with a speed controller to increase the operation life of the cutting tools. It has been found that a single-speed router with an external speed control allows the router to operate at a slower speed than is achieved with variable speed routers. When operating at a low speed, the torque is also lower and it has been found that best results are achieved when no more than 5 mm of material is removed in a single pass.

The gun smith platform 100 is preferably constructed from a metal. For example, the platform may be constructed out of steel or a steel alloy, aluminum, or any other suitable metal. The metal material may comprise a coating to protect the material from corrosion or the like.

Figure 2:
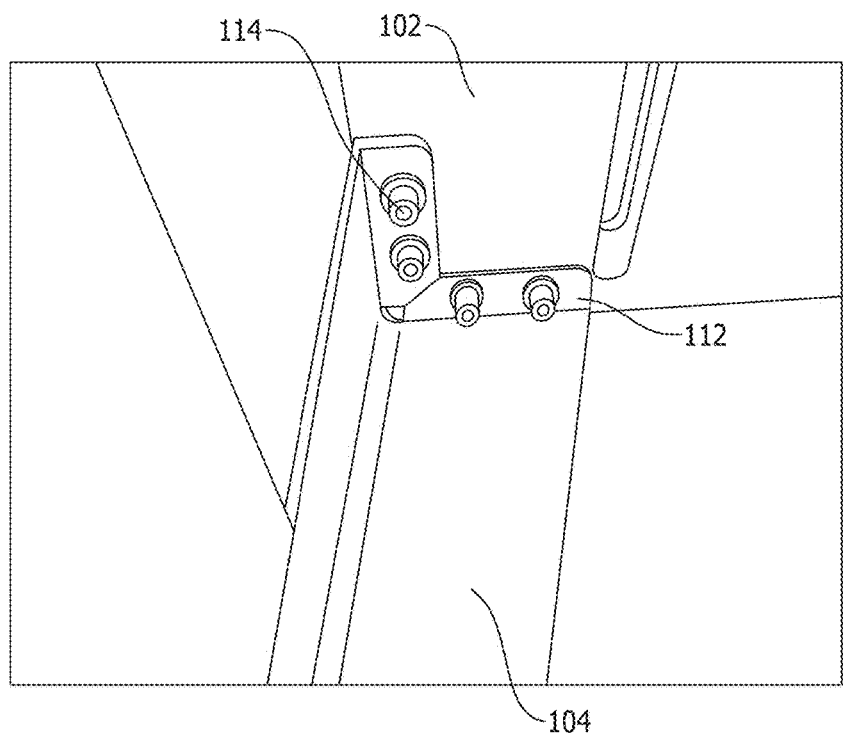
FIG. 2 shows a leg attachment to the gun smith platform, according to an exemplary embodiment.

FIG. 2 shows a leg attachment to the gun smith platform, according to an exemplary embodiment. The gun smith platform 100 may be assembled by attaching the legs 104 to the plate 102. In this example, the legs 104 have upper flanges 112 at a top end thereof that abut against the bottom surface of the top plate 102. Fasteners 114 are used to secure the legs 104 to the top plate 102.

Returning to FIG. 1, the machine tool 180 is attached to the bottom surface of the top plate 102 using appropriate fasteners such as screws. Initially, the fasteners are not completely tightened to allow for further alignment which will be described in more detail below. If a woodworking router is used, the plastic router base plate should be removed before installing the router to the top plate 102. The machine tool may be aligned by squaring a shaft of the tool with a top surface of the top plate 102. This may be accomplished by inserting shims between the machine tool 180 and the bottom surface of the top plate 102 as needed.

Figure 3A:
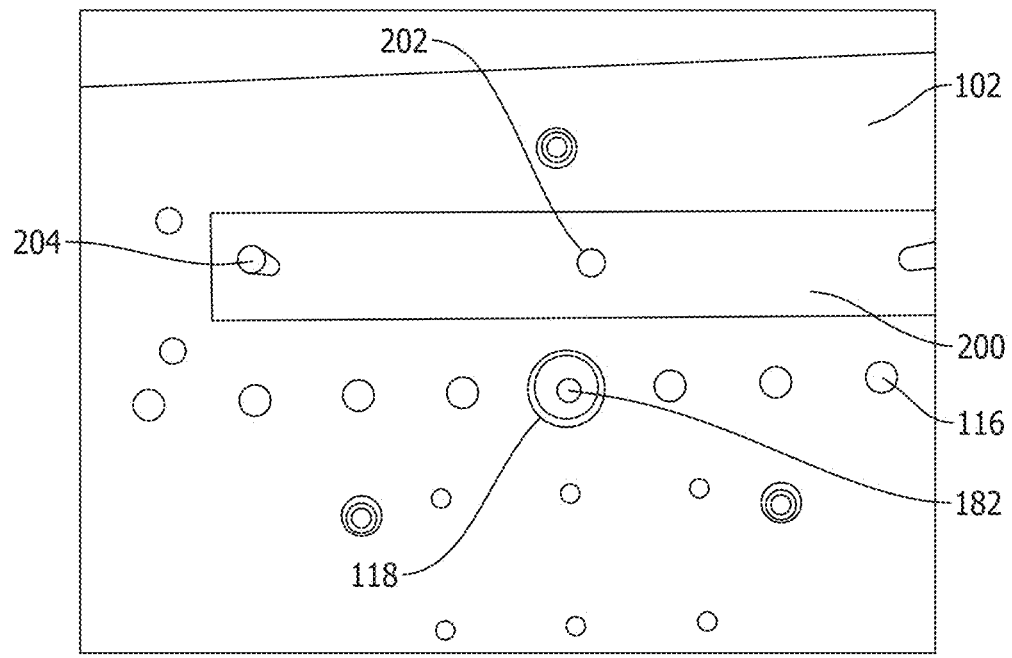
FIGS. 3A and 3B show a template for aligning a machine tool, according to one exemplary embodiment.
Figure 3B:
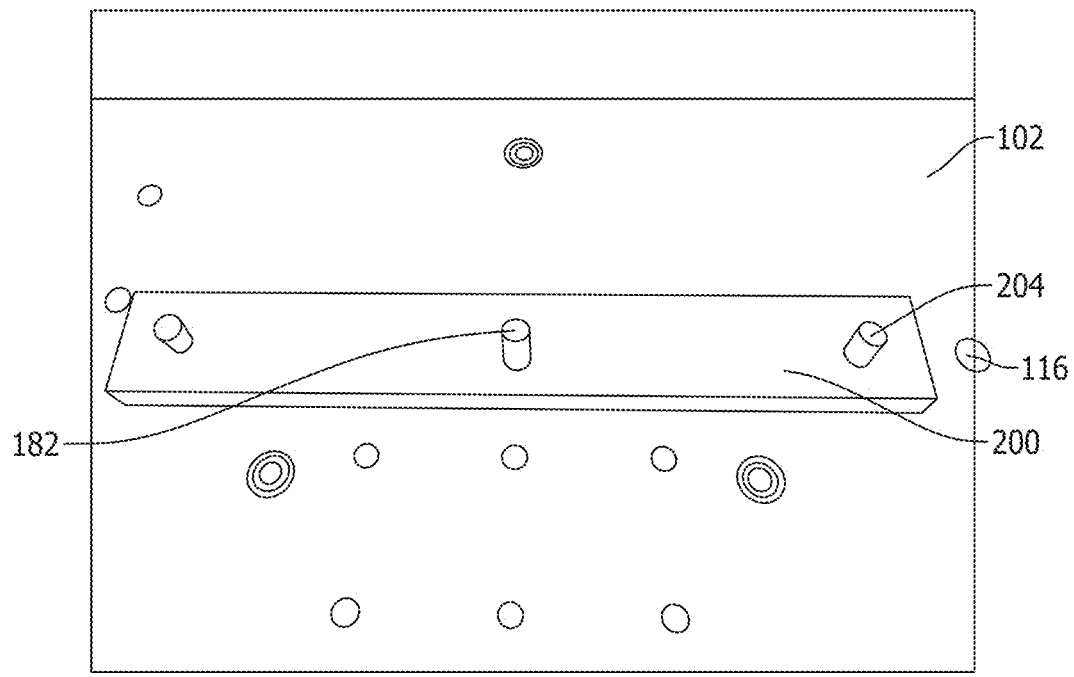

FIGS. 3A and 3B show a template for aligning a machine tool, according to one exemplary embodiment. The position of the machine tool 180 within an x-y plane defined by the top plate 102 may be aligned and verified using a template 200 and dowel pins. In FIG. 3A, a template 200 includes three alignment holes 202. The outside alignment holes 202 are configured to receive a dowel 204. For example, ¼" diameter by ¾" dowel pins may be inserted into the alignment holes 202. The template 200 with the dowels 204 is configured to be placed on top of the top plate 102 so that the dowels 204 are inserted into plate alignment holes 116 surrounding a tool hole 118 through which the shaft 182 of the machine tool 180 is inserted.

FIG. 3B shows the template placed over the plate alignment holes 116 with dowels 2014 inserted into predetermined alignment holes. For example, the dowels may be inserted into the third holes away from the tool 118 (FIG. 3A). The machine tool 180 is aligned so that the shaft 182 extends through the middle alignment hold 202 of the template 200. When the shaft 182 is properly aligned in the template 200, the machine tool is securely attached to the plate 102 so that it does not move during operation.

The platform 100 may be mounted to a work table during use. For example, the platform 100 may be screwed onto a work table surface via the flanges 106. In another example, the platform 100 may be screwed into a portable panel which may then be clamped to a work table surface.

Figure 4:
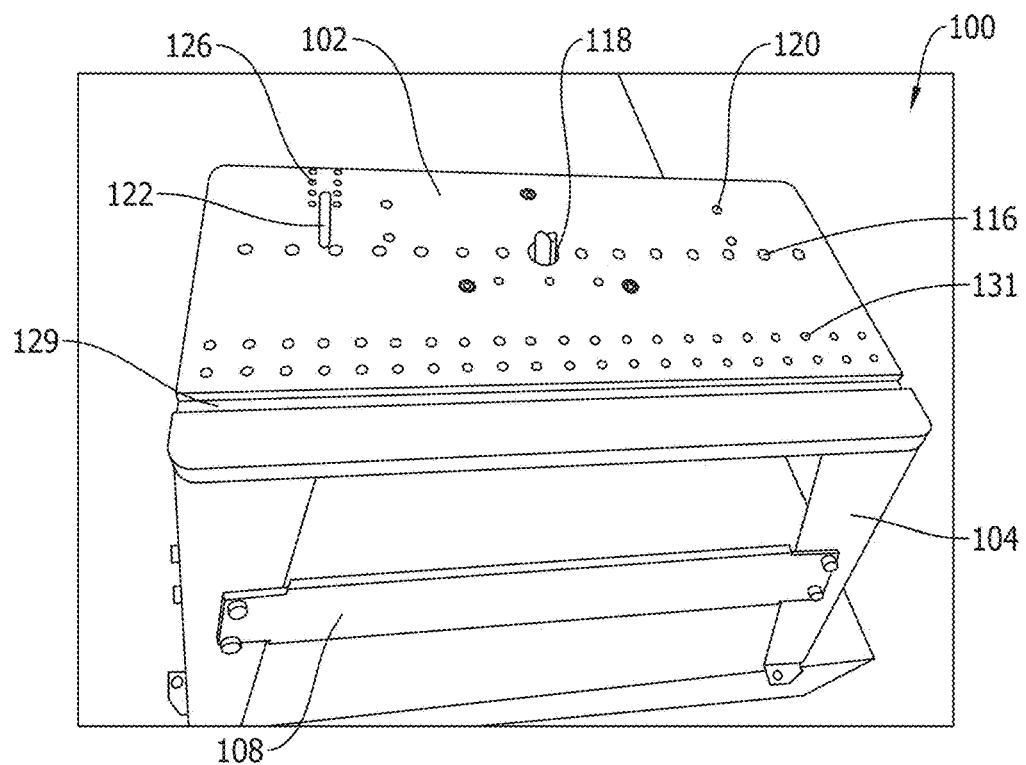
FIG. 4 shows a top perspective view of a gun smith platform according to an exemplary embodiment.
Figure 5A:
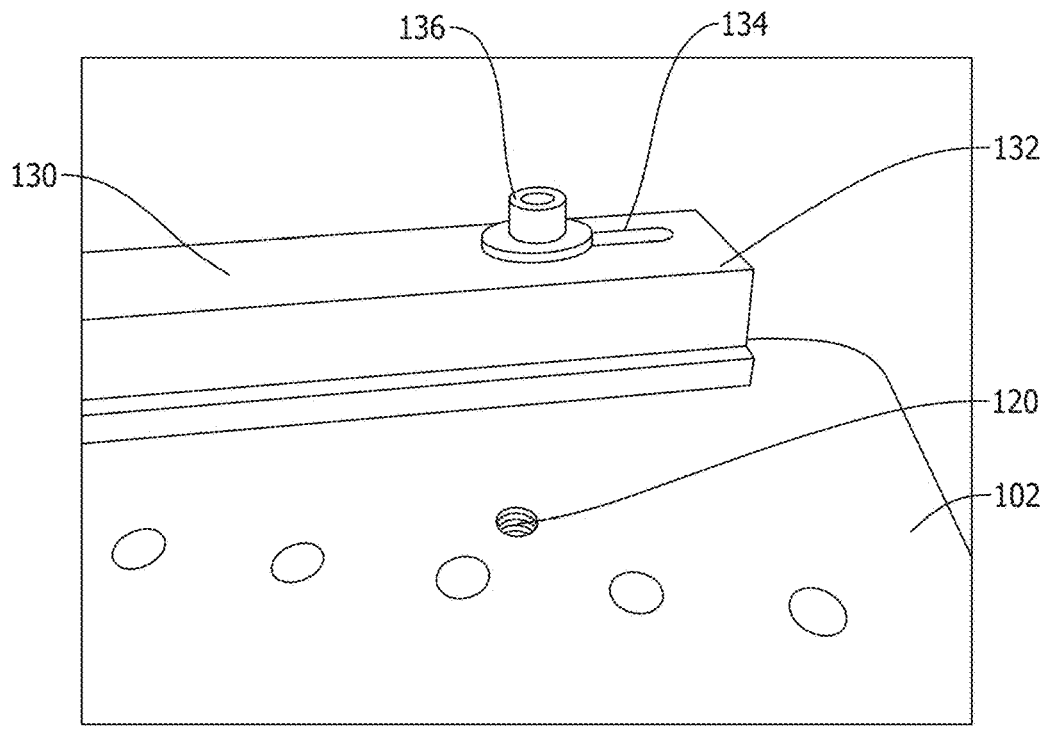
FIGS. 5A, 5B, 5C, and 5D show an attachment of a fence to the gun smith platform, according to an exemplary embodiment.

FIG. 4 shows a top perspective view of a gun smith platform according to an exemplary embodiment. The top plate 102 of the gun smith platform 100 further comprises precisely located fence anchor holes 120. In this embodiment, two anchor holes 120 are provided to allow for two anchor positions for a fence 130 (FIG. 5A). The top plate 102 further includes an elongated hole 122 for an adjustable end of the fence 130 which will be described in more detail below. The gun smith platform 100 also comprises a recessed track 129 for orienting workpieces on the top plate 102. As mentioned above, the gun smith platform 100 comprises alignment holes 116 that receive pins or dowels to precisely align parts and jigs that are used on the gun smith platform 100. Threaded holes 131 are also precisely located on the top plate 102 to secure parts and jigs to the platform 100, which will be described in more detail below.

Router Table Fence

FIGS. 5A, 5B, 5C, and 5D show an attachment of a fence to the gun smith platform, according to an exemplary embodiment. As shown in FIG. 5A, a fence 130 is configured to be removably attached to the top plate 102 to facilitate steps of removing material from a workpiece. The fence 130 comprises a first anchor end 132. The anchor end 132 comprises one or more apertures 134 through which a fastener 136 attaches the fence 130 to the top plate 102 via one of the anchor holes 120. The anchor hole 120 to which the fence 130 is attached depends on the step of material for removal for a given workpieces. Thus, the fence 130 may be removable to switch between the various anchor holes 120 as needed.

Figure 5B:
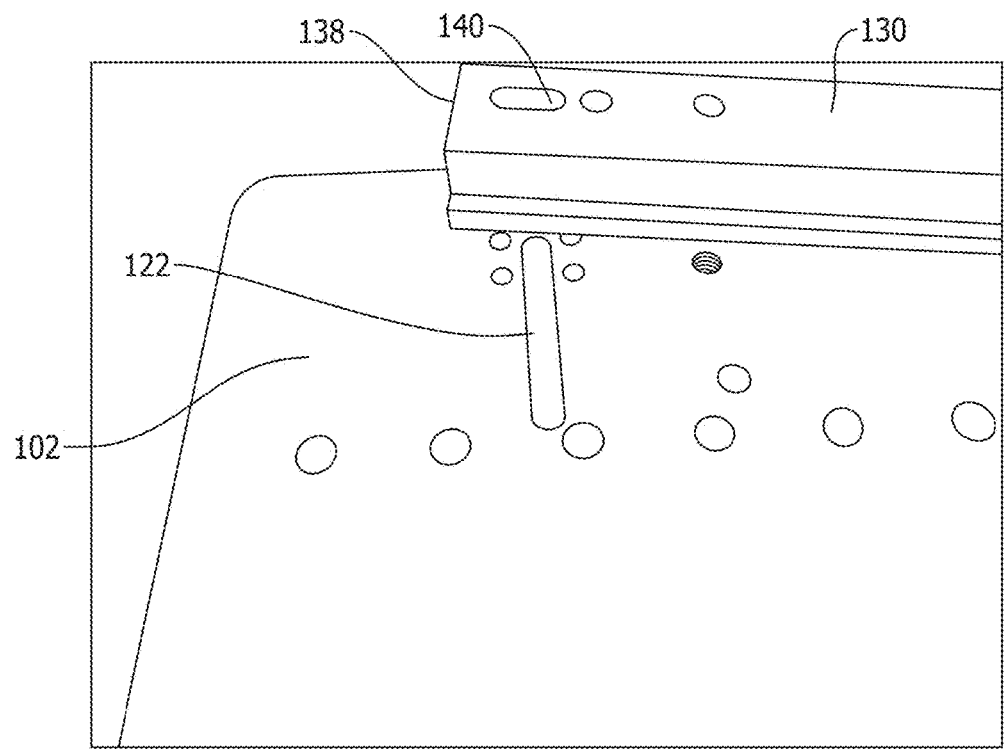
Figure 5C:
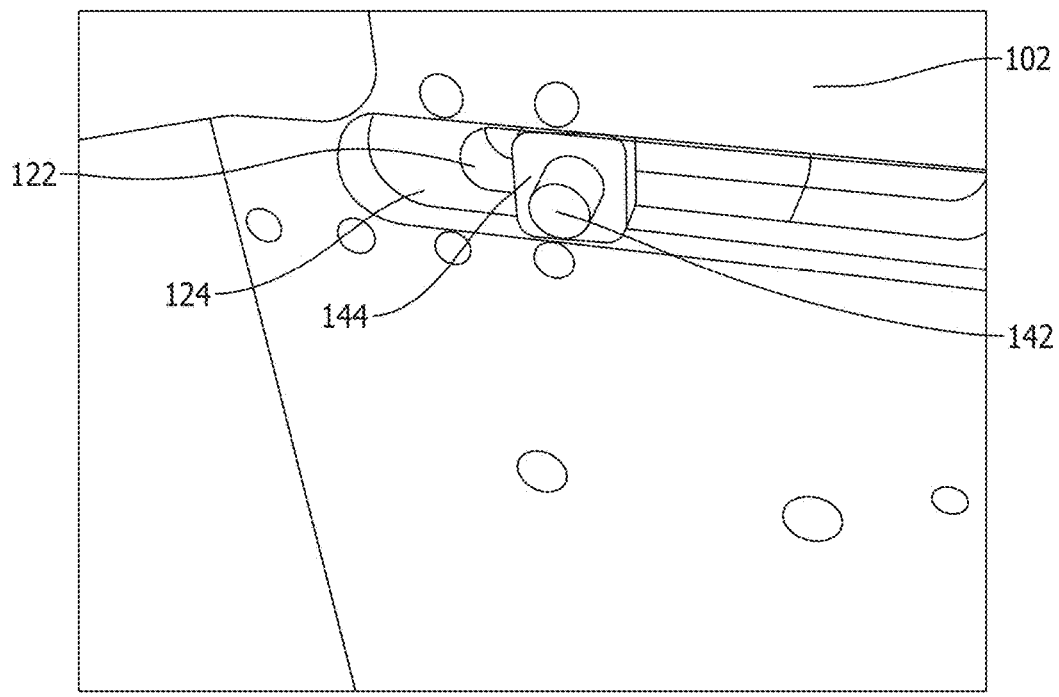
Figure 5D:
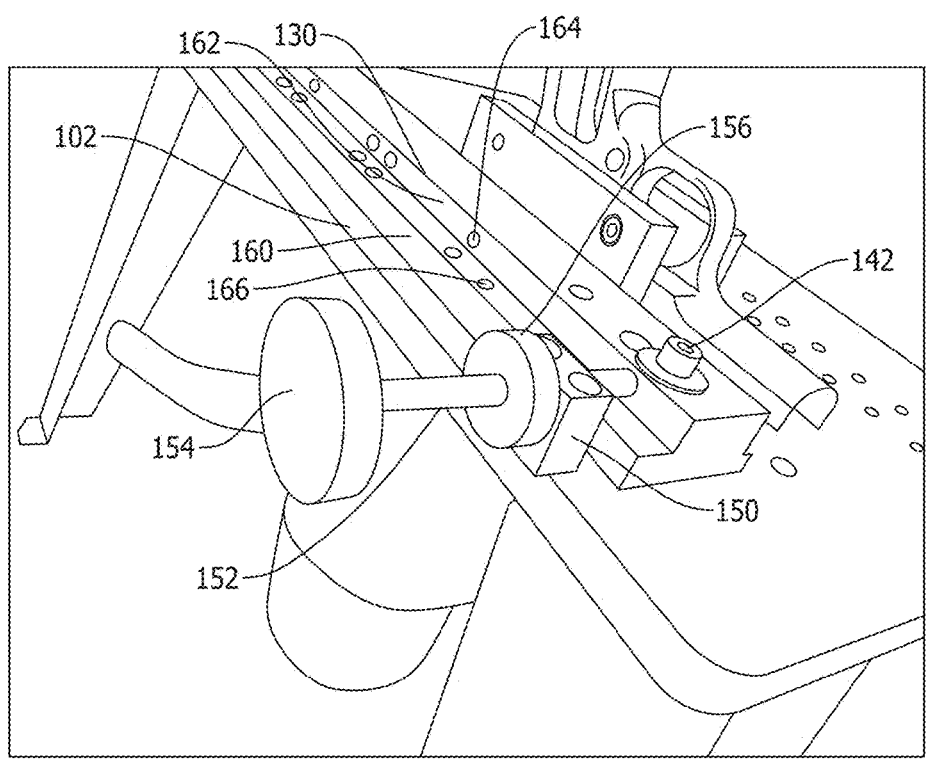

FIG. 5B shows an adjustable second end 138 of the fence 130 that is opposite the anchor end 132. The second end 138 comprises one or more apertures 140 to attach the adjustable end 138 of the fence 130 to the top plate 102 via the elongated hole 122. As shown in FIG. 5C, a fastener 142 may be used in combination with a washer 144 to attach the fence 130 at the second end 138 to the top plate 102. The bottom surface of the top plate 102 may comprise a cutout portion 124 surrounding the elongated hole 122 to stabilize the washer 144.

The elongated hole 122 allows the adjustable end 138 of the fence 130 to rotate about the anchor hole 120 to which the anchor end 132 is attached. The allows the fence 130 to be adjusted depending on the operation taking place on the gun smith platform 100. Exact adjustments of the fence 130 are facilitated by an adjustment mechanism 152. A stand 150 is attached to the top plate 102 via stand holes 126 (see FIG. 4). The adjustment mechanism 152 is threaded through the stand 150 via a handle 154. When the desired position is set, the adjustment mechanism locks into place via the lock 156. This accurately locates the fence 130 on the top plate 102. In one example, the adjustment mechanism may be formed with a screw just that each revolution of the handle 143 moves the screw ¼$^{th}$ of an inch, or approximately 5 mm.

The fence comprises a shelf 160 forming a vertical face 162. The vertical face 164 comprises several threaded holes 164. Similarly, the shelf 166 comprises several threaded holes 166 therein. This allow the fence edges to perform multiple functions as is described in more detail below. The threaded holes 164, 166 are configured to be symmetrical such that the fence may be used in either 180-degree orientation, simplifying the setup for the user allowing both sides of the fence to support secondary functions (such as holding down stones for hammer/sear fitting as described in more detail below).

Barrel Holder

Figure 6A:
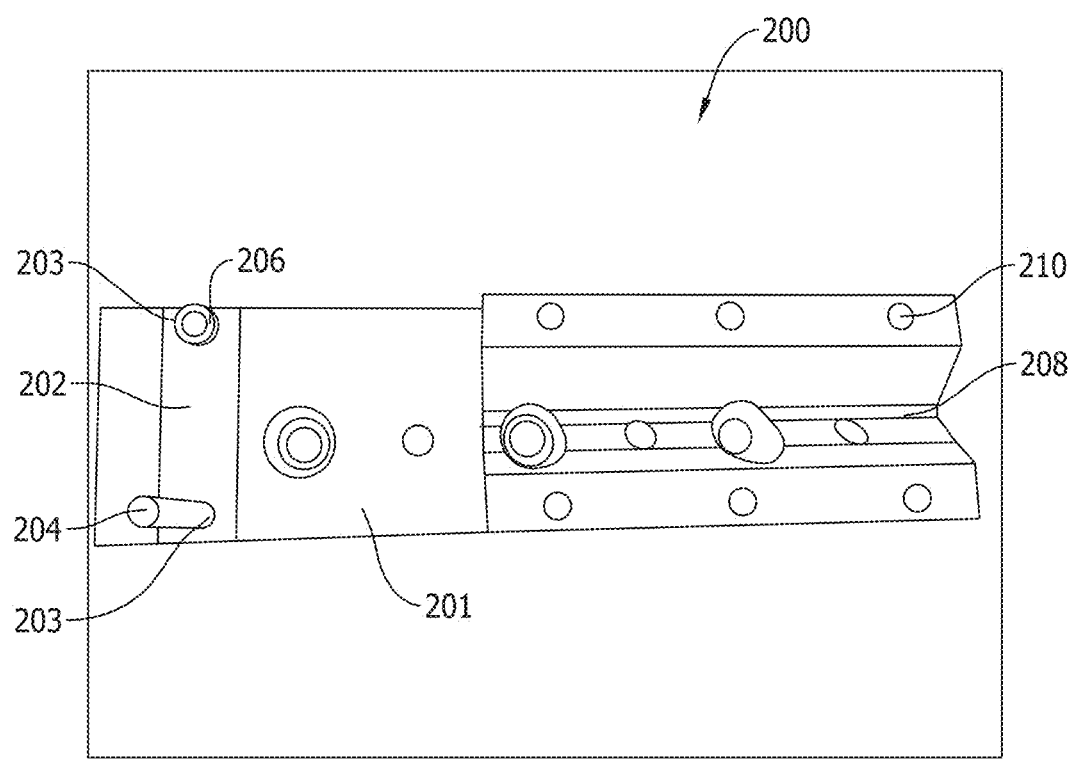
FIGS. 6A, 6B, and 6C show assembly of a barrel to a barrel holder jig used in conjunction with the gun smith platform according to an exemplary embodiment.
Figure 6B:
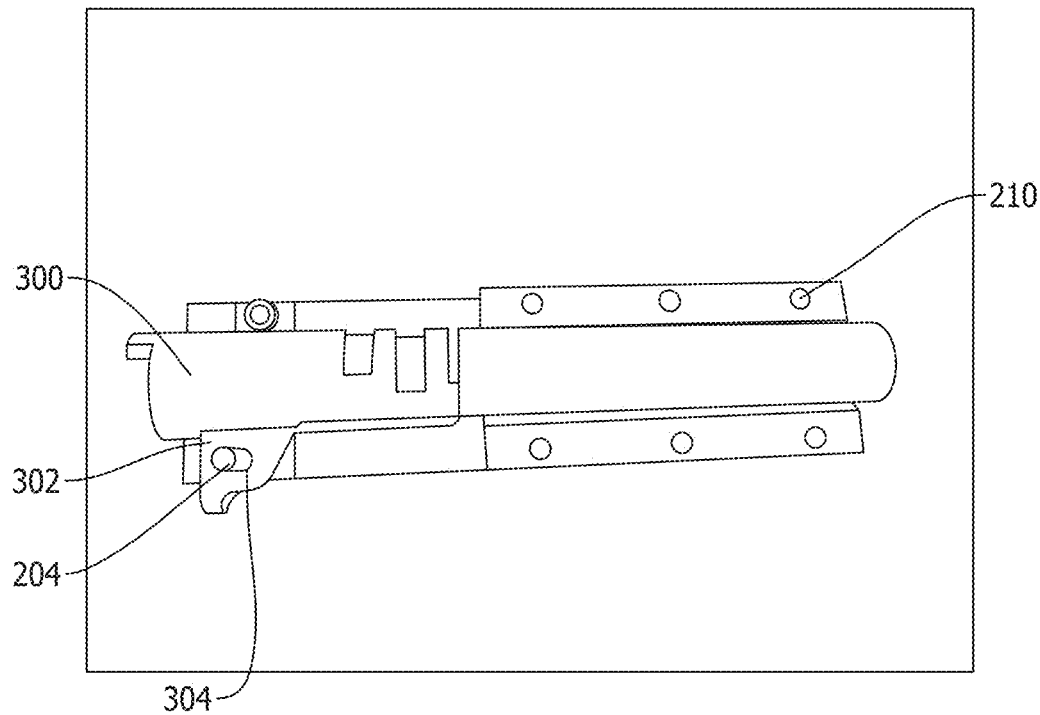
Figure 6C:
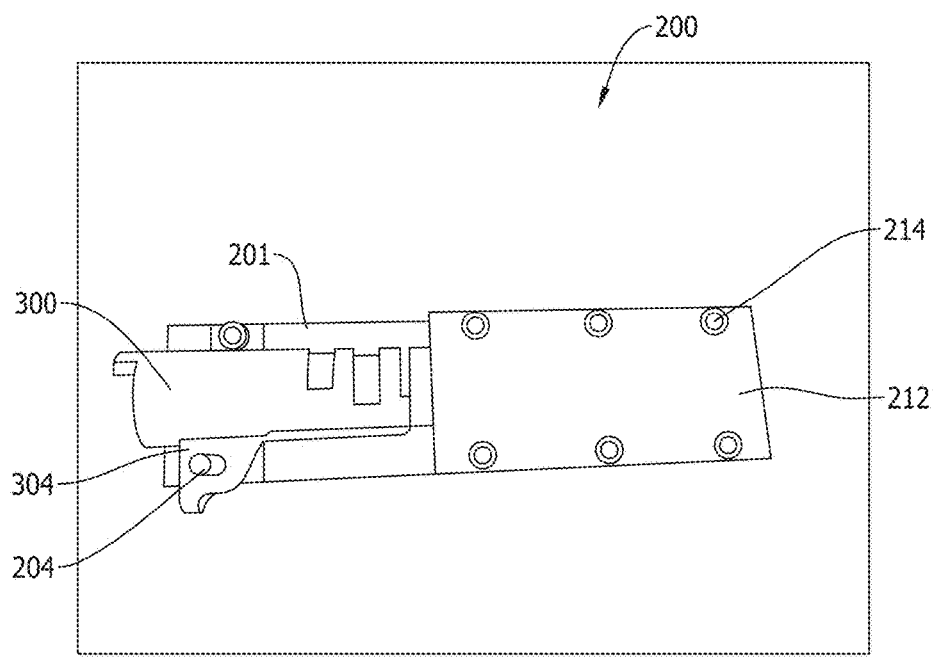

FIGS. 6A, 6B, and 6C show assembly of a barrel to a self-centering barrel holder jig used in conjunction with the gun smith platform according to an exemplary embodiment. As shown in FIG. 6A, a barrel jig 200 comprises a base 201 one which a barrel alignment mount 202 is attached. The barrel alignment mount 202 comprises two apertures 203. One aperture receives a barrel guiding pin 204 and the other aperture receives a fastener 206 to secure the mount 202 to the base 201. The pin 204 and the fastener 206 may be fit into either hole 203, i.e. the pin 204 and fastener 206 are interchangeable. The base 201 further comprises a v-shaped self-centering barrel rest 208. At the top of the barrel rest 208 are a plurality of apertures 210.

As shown in FIG. 6B, a barrel 300 fits into the v-shaped barrel rest 208 (FIG. 6A). The barrel 300 may be part of an unfinished firearm to be finished using the barrel jig 200 and gun smith platform 100. The barrel 300 comprises a flange 302 extending from one end thereof. The flange 302 comprises a hole 304 through which the pin 204 may extend. The pine 204 and the v-shaped barrel rest 208 orient the barrel 300 onto the jig 200.

As shown in FIG. 6C, the jig 200 comprises a barrel clamp 212 that secures the barrel 300 into the v-shaped barrel rest 208. Fasteners 214 may be used to secure the barrel clamp 212 to the base 201 via the apertures 210.

X-Y Stage

Figure 7A:
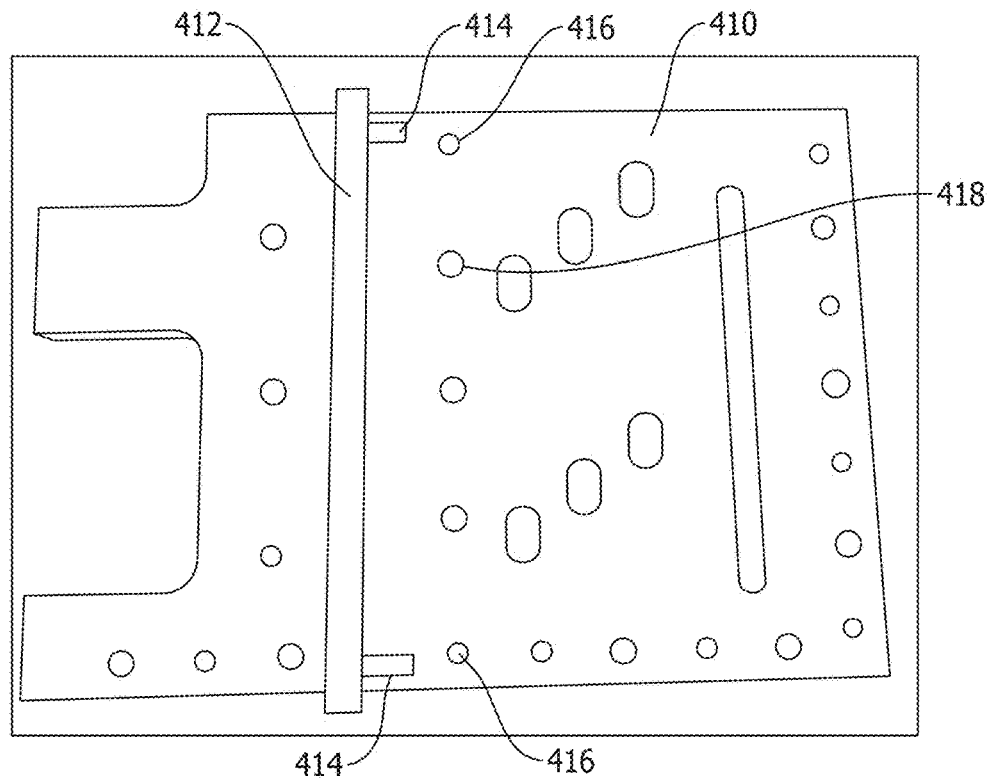
FIGS. 7A, 7B, 7C, 7D, and 7E show assembly of an x-y stage that is used in conjunction with a gun smith platform, according to an exemplary embodiment.
Figure 7B:
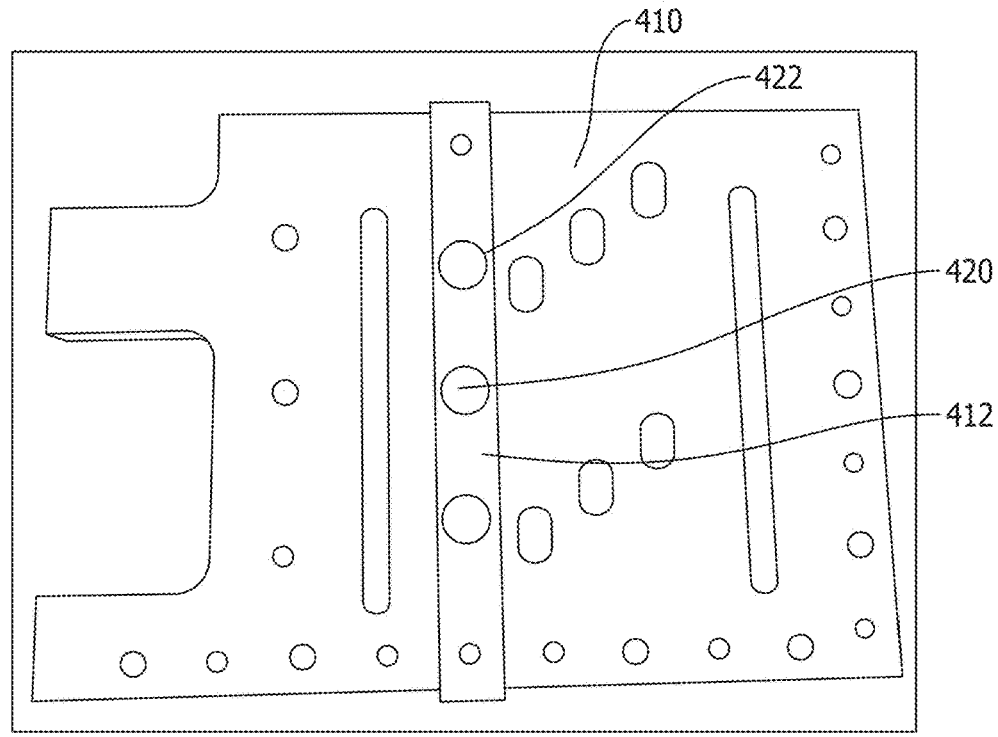
Figure 7C:
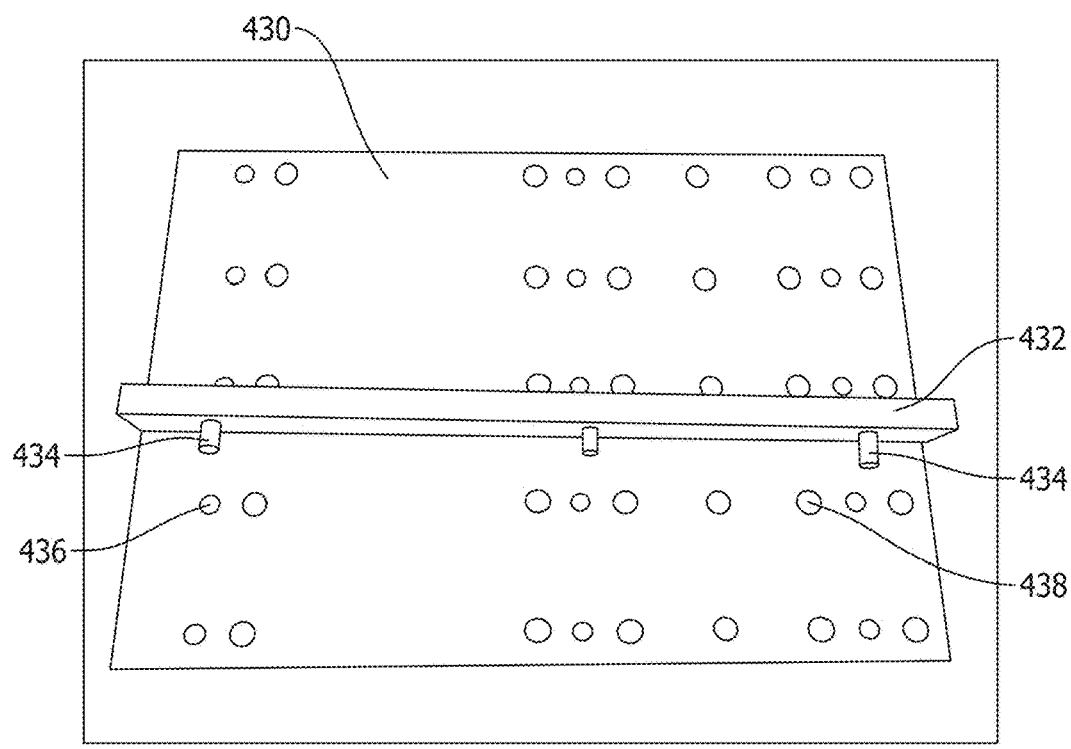
Figure 7D:
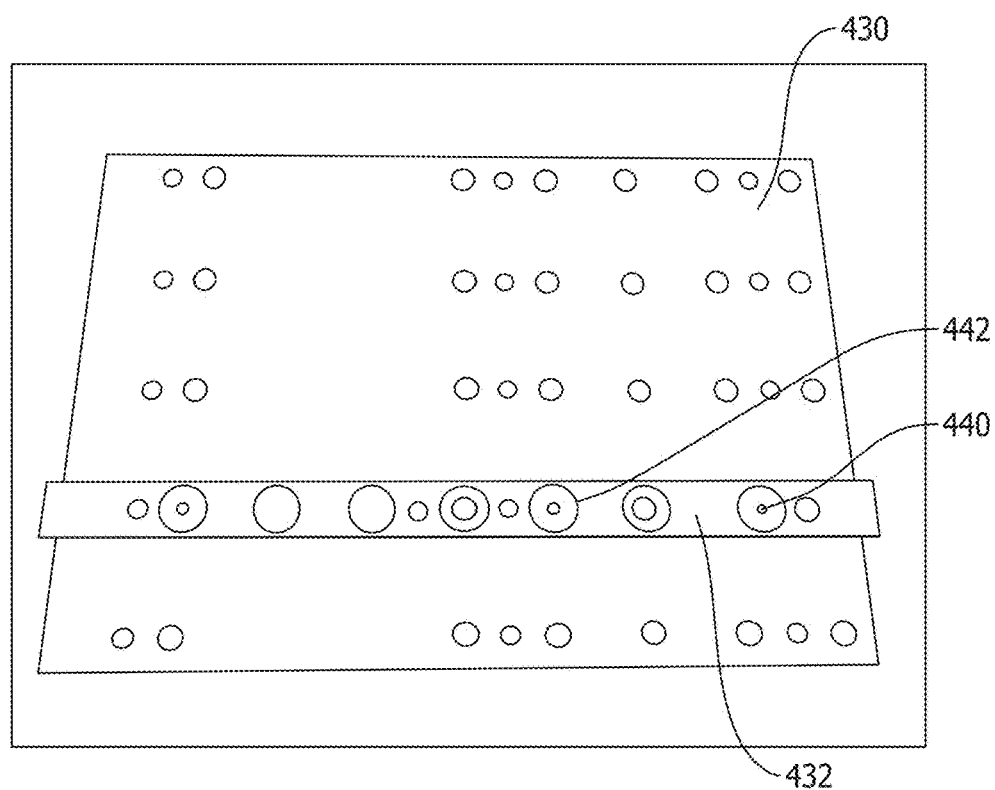
Figure 7E:
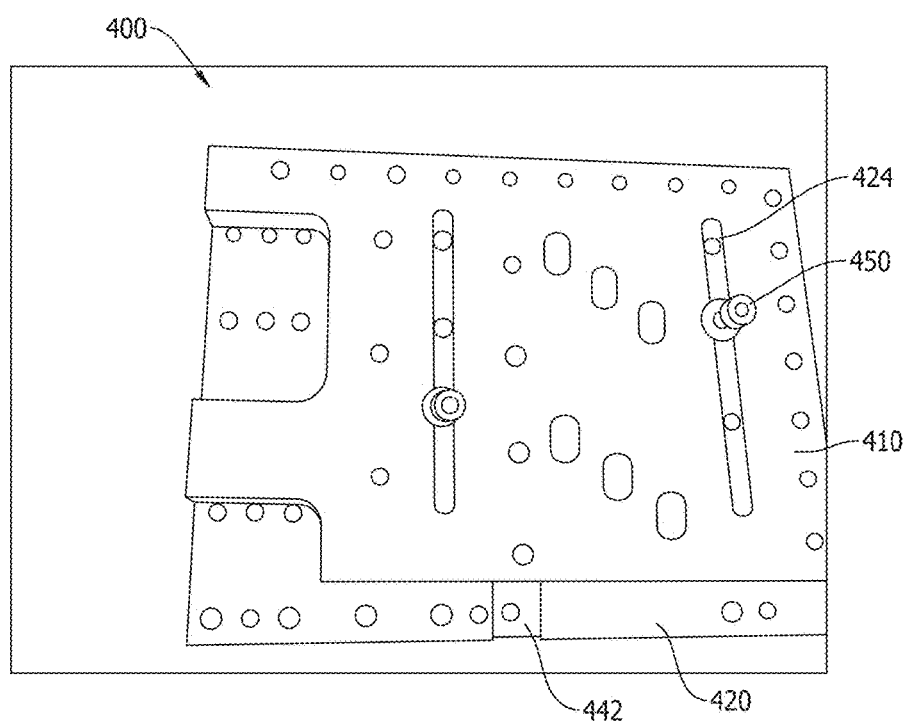

FIGS. 7A, 7B, 7C, 7D, and 7E show assembly of an x-y stage that is used in conjunction with a gun smith platform, according to an exemplary embodiment. FIG. 7A shows a top plate 410 of an x-y stage 400 (FIG. 7E). The top plate 400 comprises a detachable rail 412. Two pins 414 are installed in apertures at each end of the rail 412. The pins 414 are configured to be inserted into corresponding apertures 416 of the top plate 410. Threaded holes 418 are provided for securing the rail 412 to the top plate 410. FIG. 7B shows the rail 412 with the pins 414 inserted into holes 416 (FIG. 7A). Fasteners 420 are inserted through holes 422 and secured to threaded holes 418. In general, pins such as pins 418 are used to precisely align parts to reduce tolerance stack up if parts are aligned with to assembly hardware, FIG. 7C shows the bottom plate 430 of the x-y stage 400 (FIG. 7E). The bottom plate 430 comprises a rail 432. Pins 434 are inserted into apertures at the ends of the rail 432 and at a central position on the rail 432. The pins 434 are configured to be inserted into corresponding guide apertures 436 of the bottom plate 430. Threaded holes 438 are provided to secure the rail 432 to the bottom plate 430. FIG. 7D shows the rail 423 attached to the bottom plate 430 via fasteners 440 extending through holes 442 in the rail 432.

The top plate 410 and the bottom plate 430 with respective rails 412, 432 are joined together via fasteners 450. The fasteners 450 when tightened fix the y direction while allowing the entire x-y stage 400 to slide in the x direction. When stops are used to fix the x direction, the fasteners can be loose to allow movement in the y direction. The bottom plate comprises a recessed track 442 in which the rail 412 of the top plate 410 may fit and slide within allowing constrained motion in one direction (y in this case). The top plate 410 further comprises elongated holes 424 via which the fasteners 450 hold the top and bottom plates 410, 430 together. The Elongated holes allow the top and bottom plates 410, 430 to be secured together at different positions relative to one another. When assembled, the x-y stage 400 may fix a part at a desired position on an x-y plane because the rails 412, 432 are perpendicular to one another. In this example, the rail 432 of the bottom plate 430 may be inserted into the recessed track 129 of the gun smith platform 100 to slide in a first direction, and the rail 412 of the top plate 410 slides in a second direction perpendicular to the rail 432 of the bottom plate in the recessed track 442 disposed in the bottom plate 430.

There is a series of elongate holes on the top plate 410 with spaced holes in the bottom plate 430 that are designed to hold pins. The series of three holes allows movement of the x-y stage 400 in fixed increments when the x-y stage is used to mill surfaces. For example, with a ¼" endmill, it allows precision and fast adjustment in less than ¼" steps that enable a controlled overlap for a resulting flat surface.

The surface X and Y along with mounting holes X1/Y1 in FIG. 7C allow installation of slide stops. These can be used in several manners. For example, on slide stop may be used to set a starting point and another may be used to set a stop point. This allows the use of feeler gauges to set intermediate cut depths until a final depth is reached. The stops in two directions allow feeler gauges to set the direction of motion (increase or decreasing Y) to achieve a desired operation.

To constrain motion of the x-y stage relative to the top plate 102, threaded holes 131 allow slide stops to limit motion and fix position, Feeler gauges are used in a similar manner to set the cutting depth (intermediate or final).

Hammer and Sear Jig Assembly

Figure 8A:
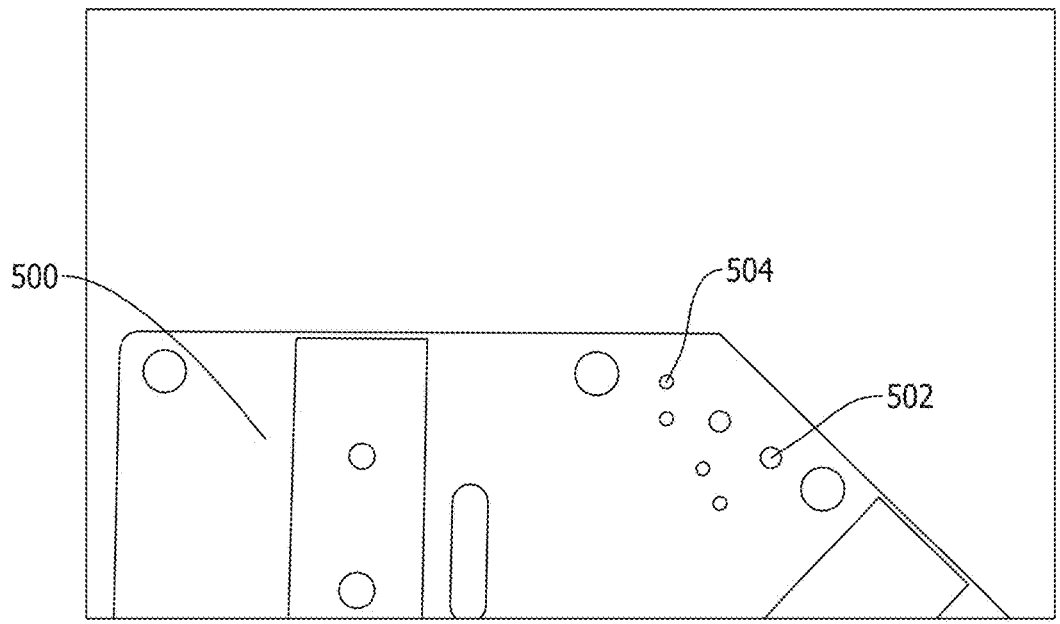
FIGS. 8A and 8B show a hammer block and sear assembly according to an exemplary embodiment.
Figure 8B:
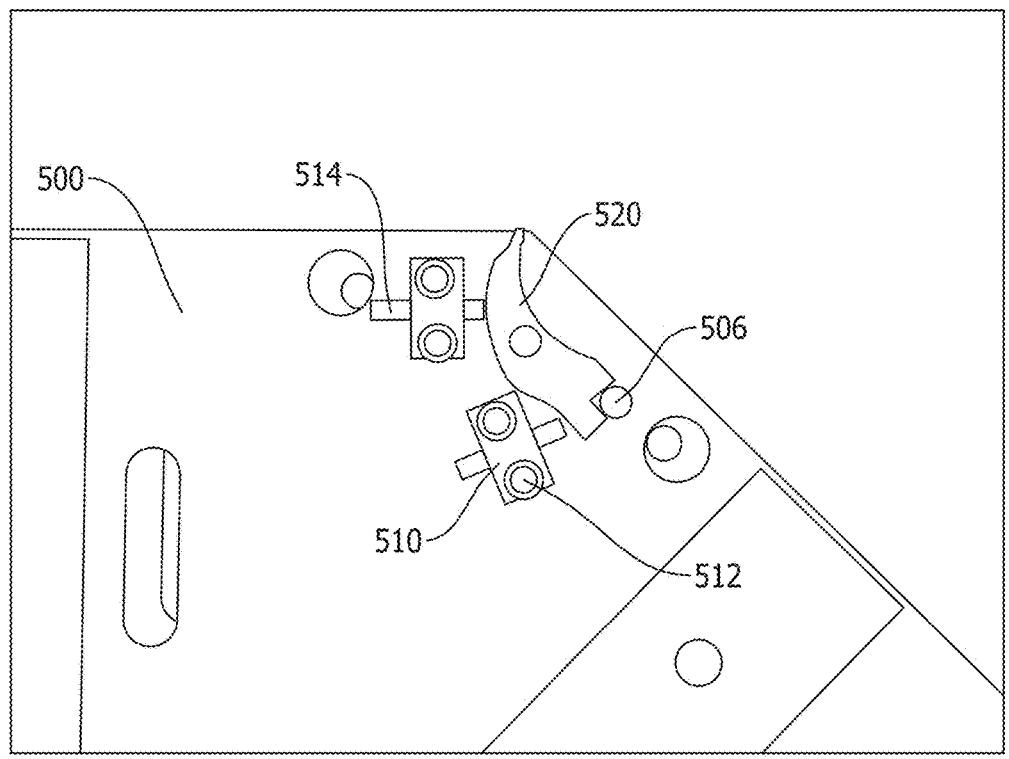

FIGS. 8A and 8B show a hammer block and sear assembly according to an exemplary embodiment. A hammer block 500 is assembled to facilitate a hammer finish process on the gun smith platform. As shown in FIG. 8A, the hammer block 500 comprises pin apertures 502 and threaded apertures 504. FIG. 8B shows the items inserted into the apertures 502 and 504. First, guide pines 506 are inserted into the pin apertures 502. A sear 520 is configured to be placed over the guide pins 506 and is set in position by the guide pins 506. Guide pins 506, when installed, set the default position (according to gun specifications). With guide pins 506 removed, custom angles or settings for the advanced user may be facilitated. Screws 514 allow for fine adjustment for the advanced user.

Two holder blocks 510 are provided and are attached to the hammer block 500 via fasteners 512. Set screws 514 secure the sear in position against the pins 506. In an alternate embodiment, the orientation of the sear may be a custom fit by removing the lower guide pin 506 and setting the position with a single guide pin and the holder blocks 510.

Figure 9A:
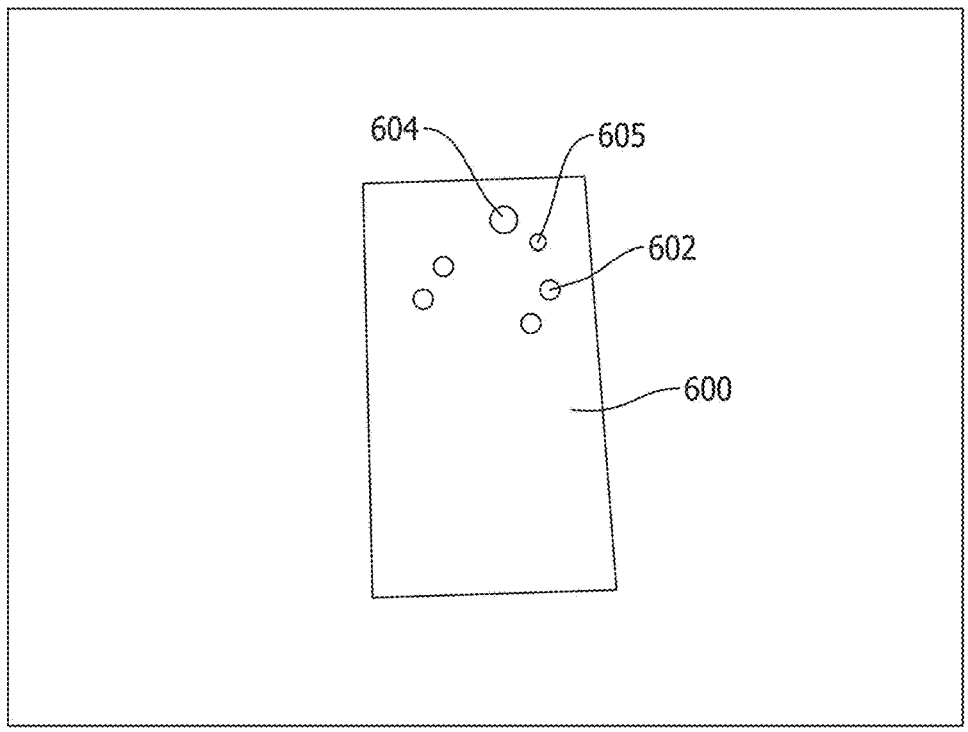
FIGS. 9A, 9B, and 9C show a hammer holder assembly, according to one exemplary embodiment.
Figure 9B:
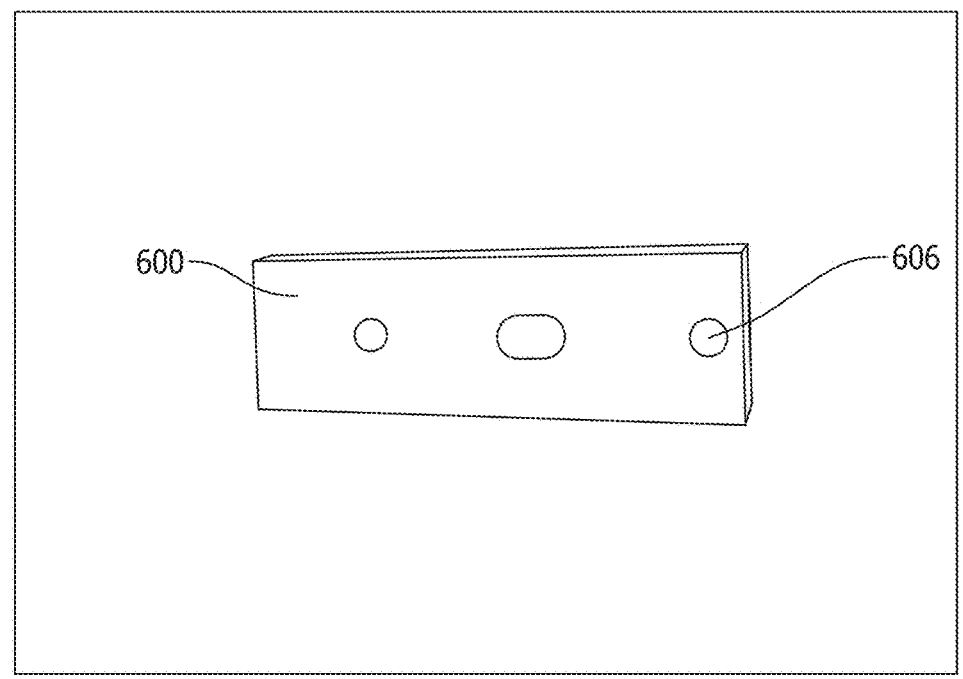
Figure 9C:
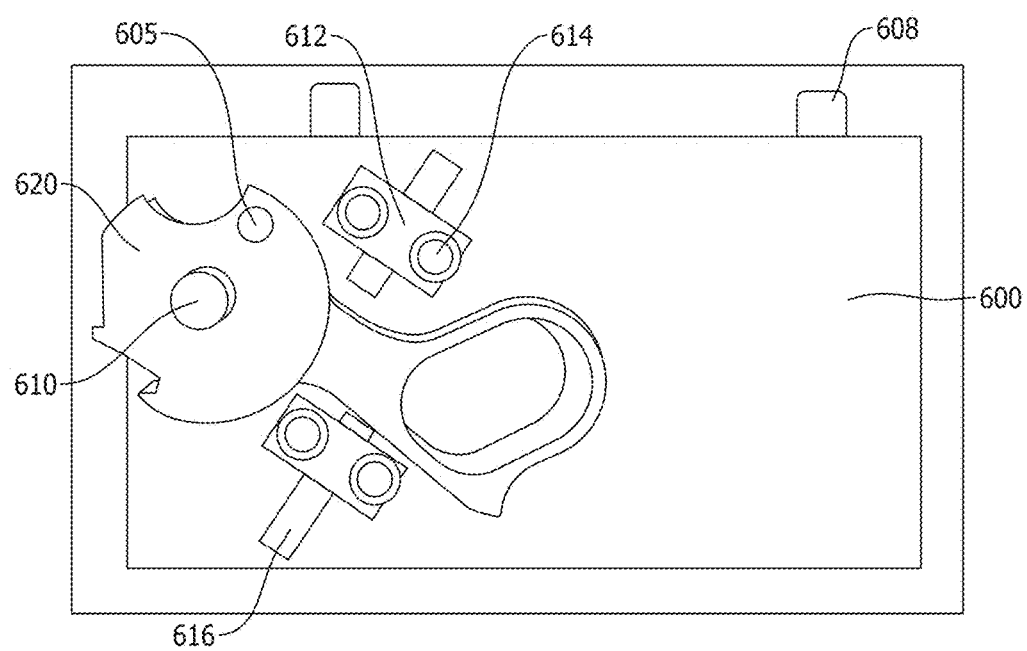

FIGS. 9A, 9B, and 9C show a hammer holder assembly, according to one exemplary embodiment. In FIG. 9A, a hammer holder 600 is provided with several prefabricated threaded holes 602. First and second pin holes 604, 605 are also provided on the front surface of the hammer holder 600. Like guide pins 506, use of the pins set the standard position, removal of the pins and screws 616 allows for custom settings for the advanced user. FIG. 9A shows a side view of the hammer holder 600 with pin holes 606. Use of pins set the default position, removal of the pin and the fact that the mounting hole is elongated, allows for custom settings for the advanced user. This allows custom adjustment in one direction. Feeler gauges between this block and the other parts of the action (see stone holder) can allow for custom adjustment for advanced users. The hammer holder assembly is completed as shown in FIG. 9C. Pins 608 and 610 are inserted into respective pin holes 604, 606. Holder blocks 612 are attached to the hammer holder 600 by threading fasteners 614 into the threaded holes 602. Set screws 616 position the hammer 620 at the proper position for machining.

The hammer holder 600 allows for a standard positioning of the hammer 620 and custom positioning. For standard positioning, a pin (not shown) is inserted through the hammer 620 into pin hole 605 to orient the hammer. For a custom fit, the hammer 620 is positioned without a pin in pin hole 605 using only pin 610 and the hammer blocks 612.

Figure 10A:
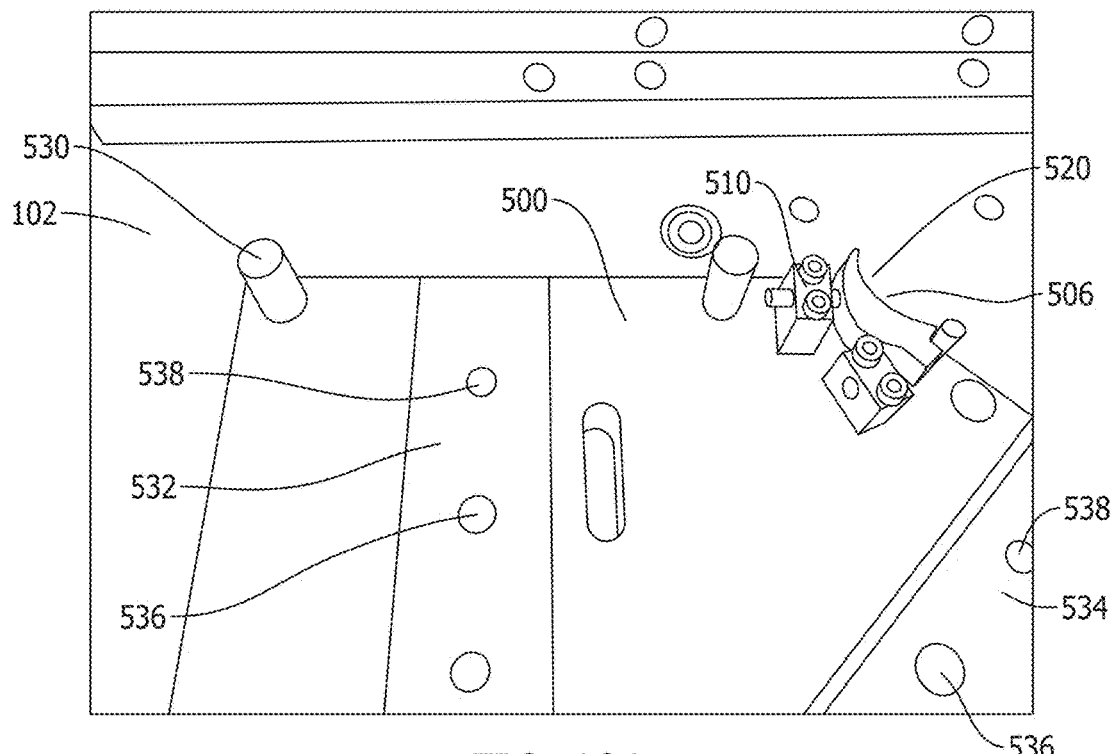
FIGS. 10A and 10B show assembly of the hammer block and hammer holder, according to an exemplary embodiment.
Figure 10B:
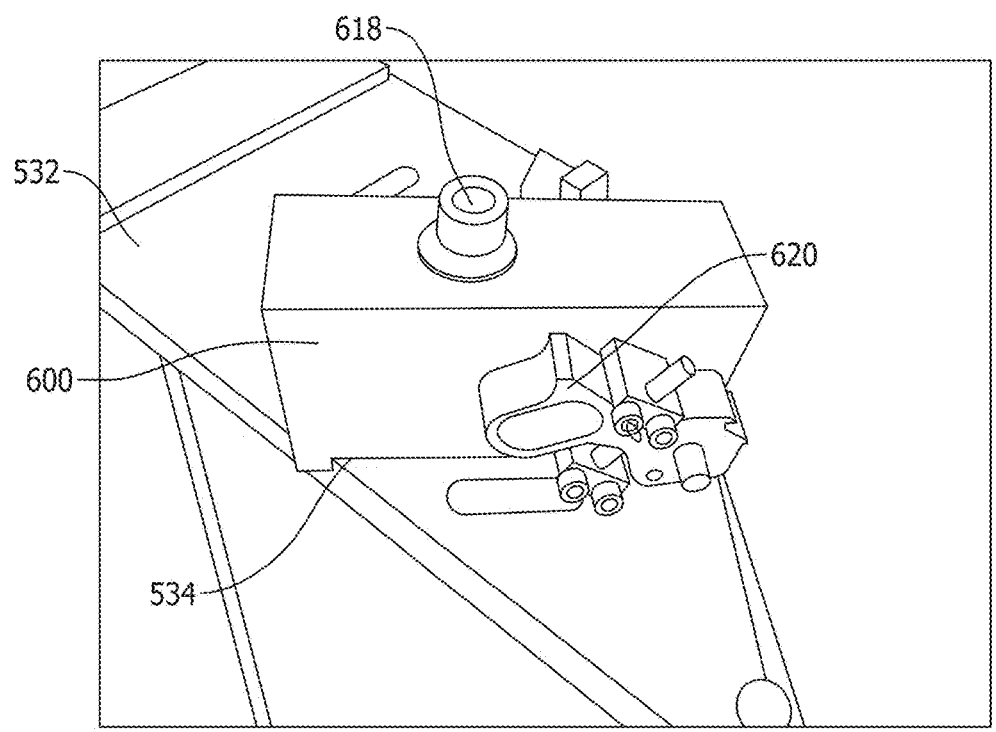

FIGS. 10A and 10B show assembly of the hammer block and hammer holder, according to an exemplary embodiment. A shown in FIG. 10A, the hammer block 500 comprises two pins 530 to locate the hammer block 500 on the top plate 102 of a gun smith platform 100. Further, the hammer block 500 comprises two recessed tracks 532, 534 that are oriented 45 degrees from one another. This allows the hammer holder 600 to be placed in each of the recessed tracks 532, 534 depending on the process being completed, as explained in more detail below. Each of the recessed tracks 532, 534 comprise a threaded hole 536 and pin holes 538 for orienting and securing the hammer holder 600 to the hammer block 500.

FIG. 10B shows the hammer holder 600 secured in the recessed track 534. This is done by inserted the pins 608 (FIG. 9C) into the pin holes 538 to orient the hammer holder 600 within the recessed track 534. The hammer holder 500 is secured to the hammer block 500 by tightening fastener 618 into the threaded hole 536. The hammer holder 600 is attached to recessed track 532 in a similar manner. As mentioned above, the two tracks 532, 534 are precisely fabricated to facilitate processes that comprise different heights of cuts on the hammer, as explained in more detail below.

Fence Stone Holder

Figure 11A:
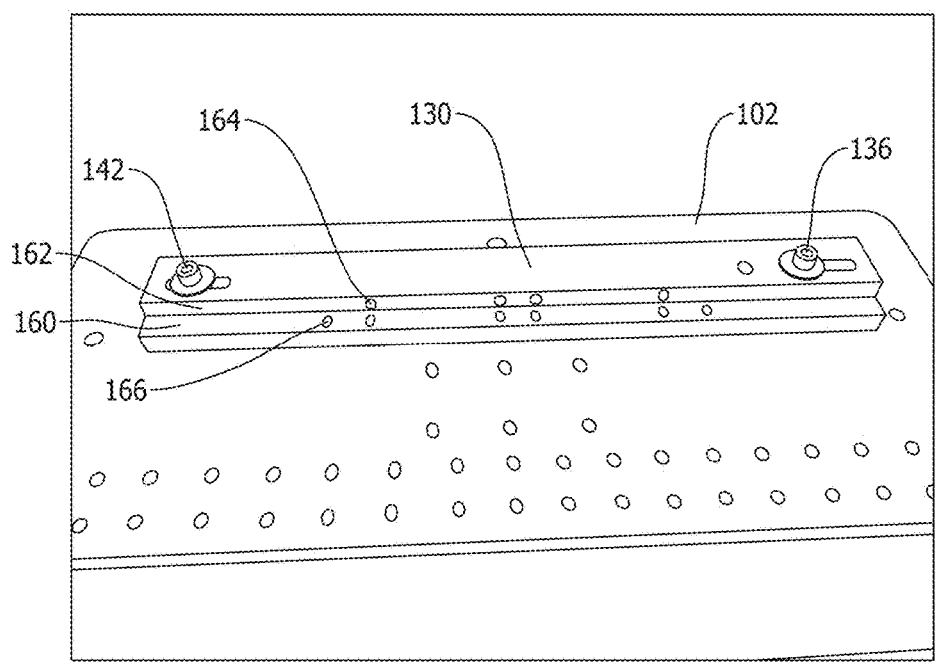
FIGS. 11A, 11B, 11C, 11D, and 11E show a stone attachment on a gun smith platform, according to one exemplary embodiment.

FIGS. 11A, 11B, 11C, 11D, and 11E show a stone attachment on a gun smith platform, according to one exemplary embodiment. As shown in FIG. 11A, the fence 130 is positioned towards a central position on the top plate 102 secured by fasteners 136 and 142. As mentioned above, the fence comprises a shelf 160 forming a vertical face 162. The vertical face 164 comprises several threaded holes 164. Similarly, the shelf 166 comprises several threaded holes 166 therein.

Figure 11B:
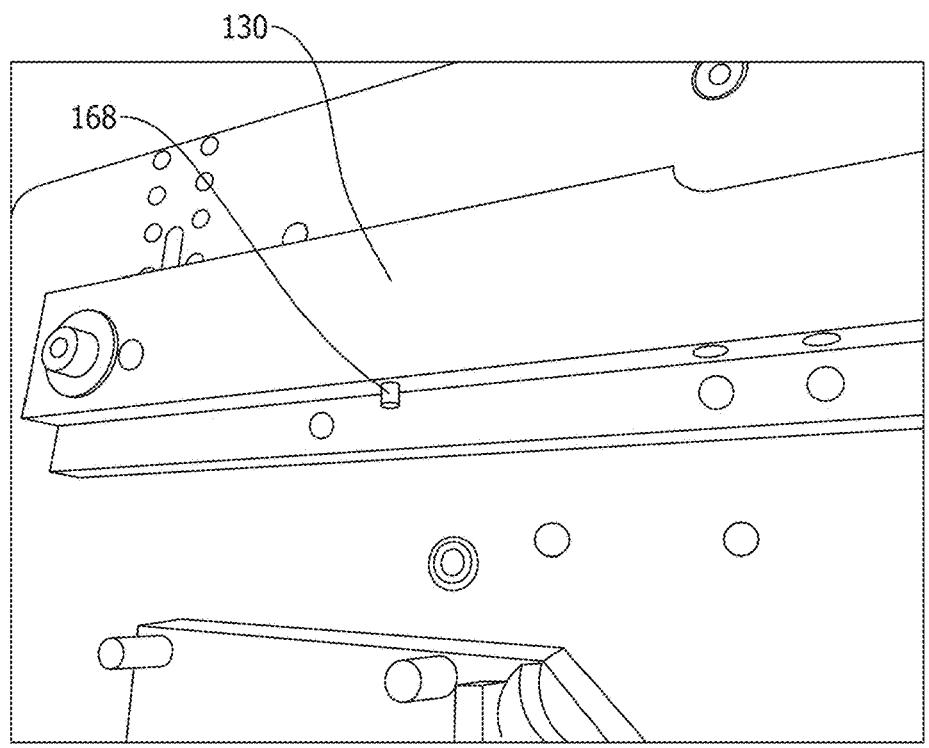

Set screws 168 are inserted into the threaded holes 164 as shown in FIG. 11B. For example, four set screws 168 may be inserted into holes 164 and screwed in so that the set screws are recessed within the vertical face 162. These may be later adjusted if needed to straighten the stone to maintain parallel action in two directions, as will be described below.

Figure 11C:
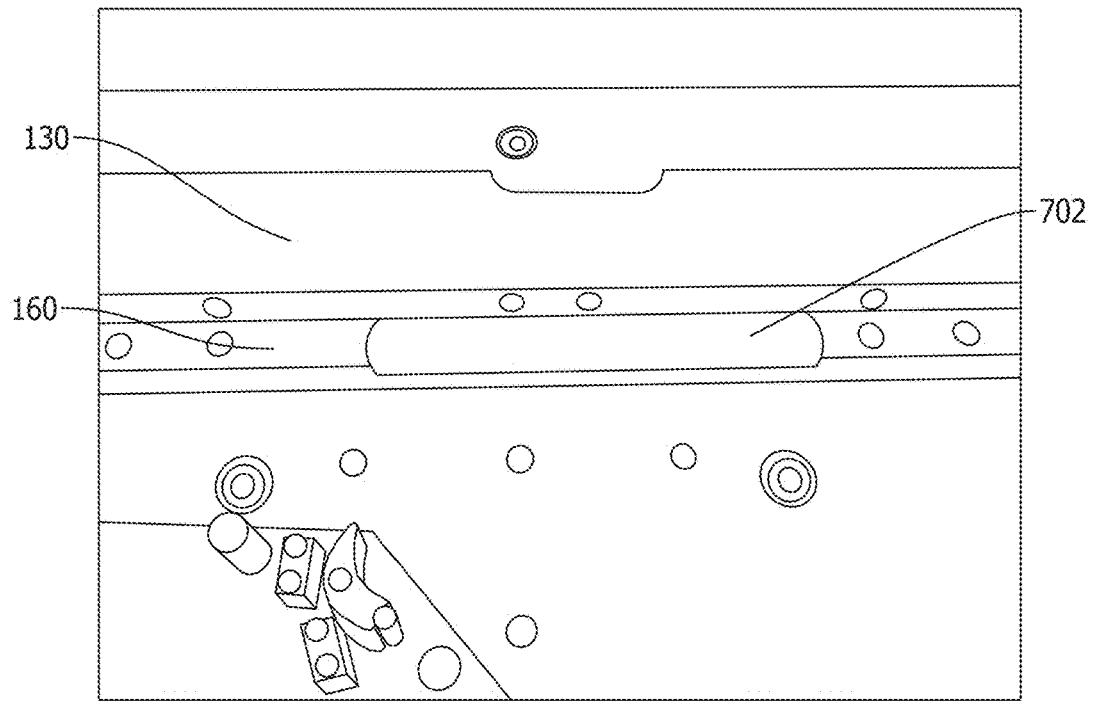
Figure 11D:
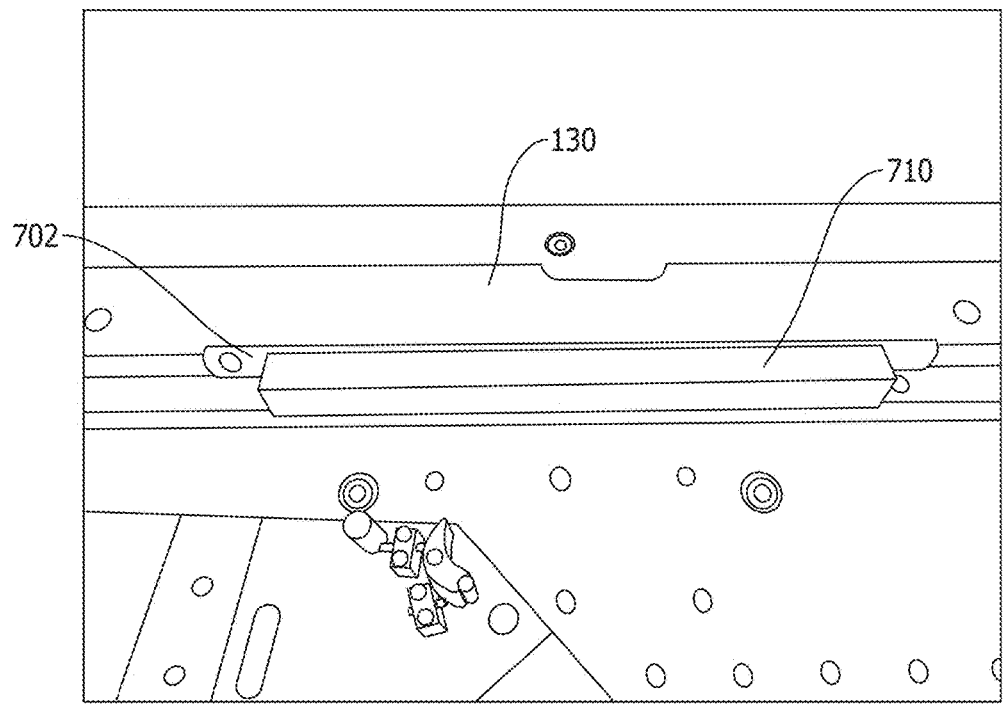

In FIG. 11C, one or more feeler gauges 702 may be positioned on the shelf based on the needed height of the stone. The stone 710 is placed on the feeler gauge 702 as shown in FIG. 11D. Additional feeler gauges 702 may be inserted between the vertical face 162 and the stone 710. The set screws 168 may be adjusted as needed to align the stone 710 relative to the jig to be parallel in two dimensions. In some cases, the same feature can be replicated on both sides of the fence allowing one to hold a coarse and the other a fine stone to reduce the time to complete the process.

Figure 11E:
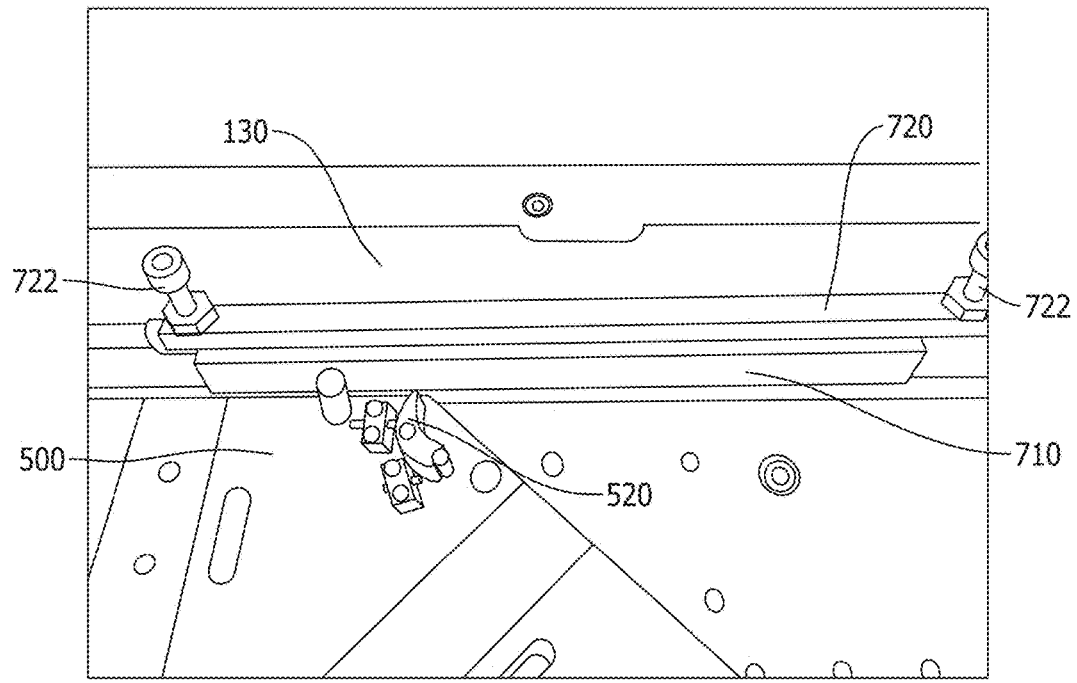

Once the stone 710 is in the desired position, a stone holder 720 is clamped over the stone 710 via fasteners 722 which are screwed into threaded holes 166 as shown in FIG. 11E. In this configuration, the stone 710 may be used to finish a workpiece, such as the sear 520 held by the hammer block 500 shown in FIG. 11E.

As mentioned previously, the gun smith platform 100 is compatible with a wood working router that should be used in conjunction with a speed control device for use on workpieces machined on the gun smith platform. A method for estimating or calibrating the appropriate router speed is provided below. The method utilizes a tuning device, such as a device for tuning musical instruments. The tuning device typically has a sound recording device configured to measure sound frequencies. Tuning devices may be incorporated into other devices with sound recording capabilities via software such a smart phone.

Using a tuning device and running the router under no load at different speed control settings will create a curve to estimate the speed of the router at those settings. This curve may be extrapolated to estimate speeds of the router at lower settings where a tuning device has difficulty measuring the frequency of the router. Using these estimates, the appropriate cutting speed for the material of the workpieces can be selected. This allows a means for customers to establish and verify that they have achieved the correct operating speed.

80% Frame Finishing

The gun smith platform 100 may be used to finish a firearm. For example, a prefabricated 80% complete workpiece may be finished into a firearm utilizing the gun smith platform 100. In this example, a colt 1911 firearm is shown being finished. However, other types of firearms may also be finished using the described system and method.

80% Frame Deck

In a first step in finishing an 80% frame for a colt 1911, it must first be determined how much material needs to be removed from the deck height. The initial height of the fabricated 80% frame is measured and compared to the specification height to determine the amount of material to be removed as an advanced technique. The depth gauges are used to set the finish height to achieve the default position for less advanced users. Intermediate steps can be accurately set with the gauge on the router or use of a caliper with the gauge. The gauge may have features to make this measurement easy by providing a repeatable square surface to take the measurements from.

Figure 12A:
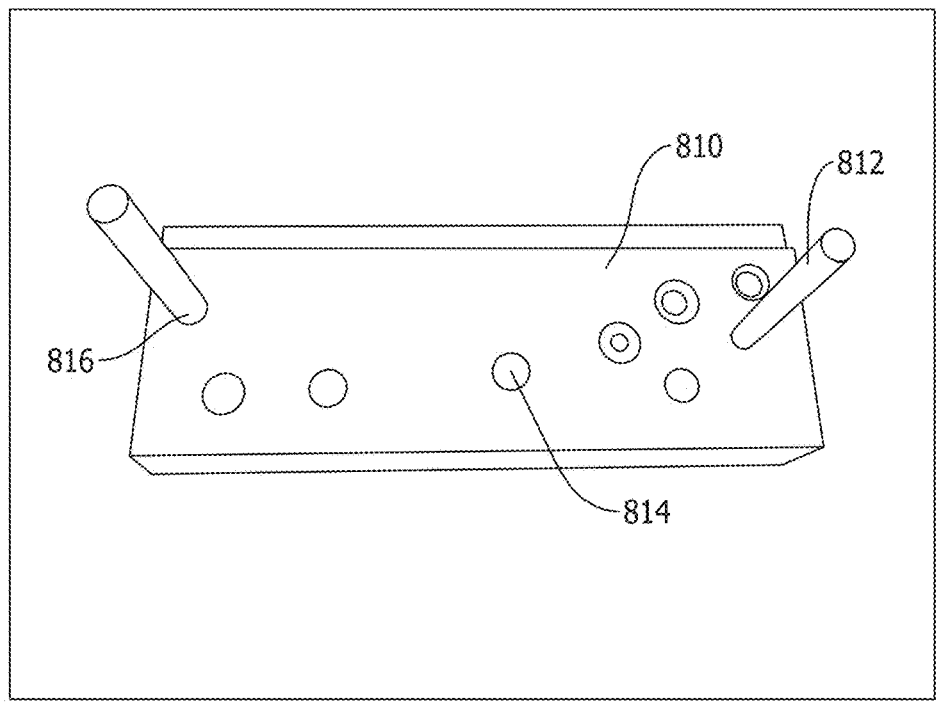
FIGS. 12A, 12B, and 12C show a frame holder according to an exemplary embodiment.
Figure 12B:
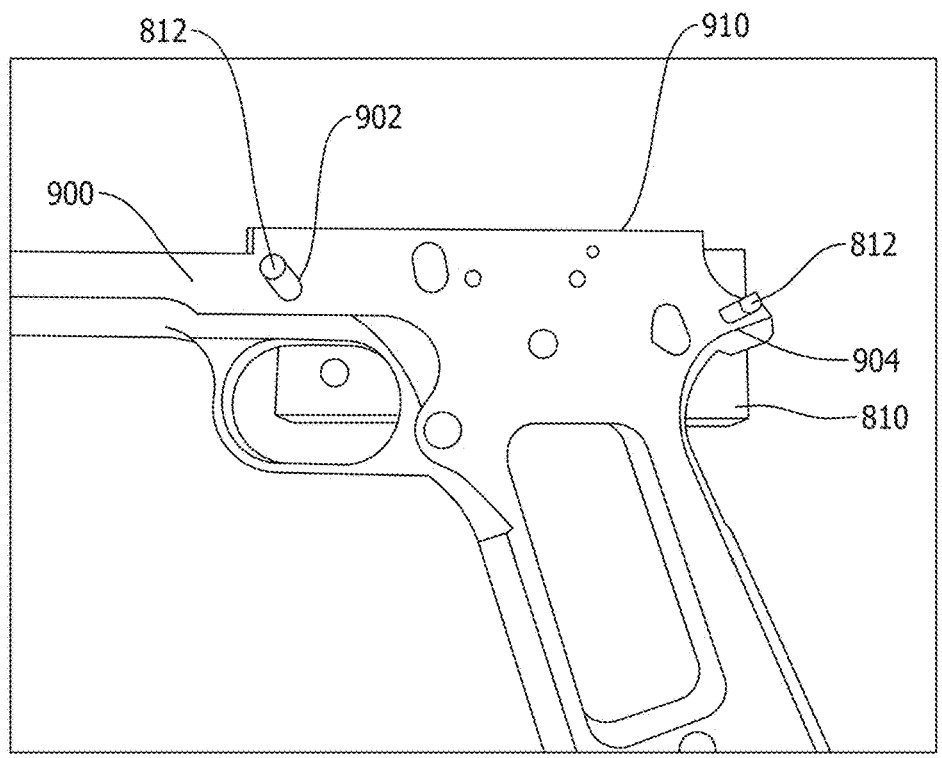
Figure 12C:
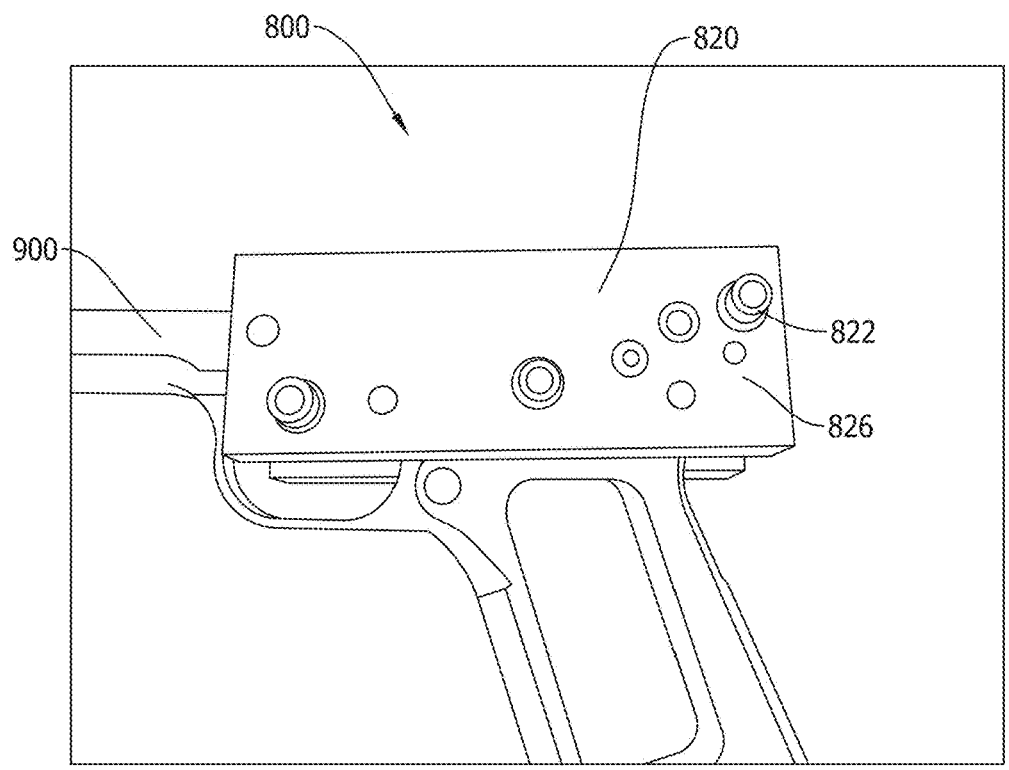

Next, the frame is inserted into a frame holder for material removal on the gun smith platform. FIGS. 12A, 12B, and 12C show a frame holder according to an exemplary embodiment. As shown in FIG. 12A, a right-side frame holder 810 comprises pin holes 816 and fastener holes 814. The holes 814, 816 are prefabricated to fit an 80% frame of a colt 1911 in this example. Pins 812 are fit into the pin holes 816.

A frame 900 of a colt 1911 is placed onto the right-side frame holder 810 as shown in FIG. 12B. Pins 812 are fed through the slide stop 902 and safety 904 prefabricated in the frame 900. The pins orient the deck 910 for material removal with respect to the right-side frame 810.

The left-side frame holder is placed on top of the frame 900 as shown in FIG. 12C. The left-side frame holder is oriented by the pins 812 through pin holes 826. Three fasteners 822 clamp the frame 900 between the left-side frame holder 820 and right-side frame holder 810 by threading into the holes 814. The left-side frame holder 820 and right-side frame holder 810 jointly define the frame holder 800.

Figure 13A:
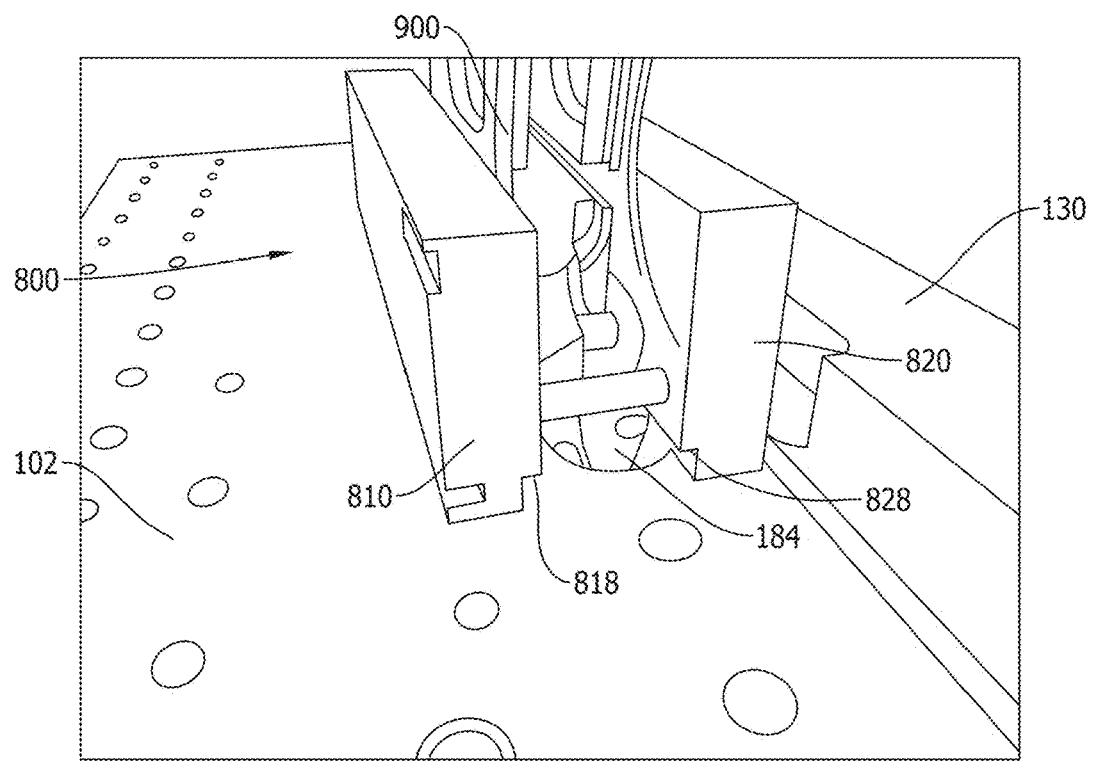
FIGS. 13A, 13B, and 13C show a process of milling a deck of a frame, according to one exemplary embodiment.
Figure 13B:
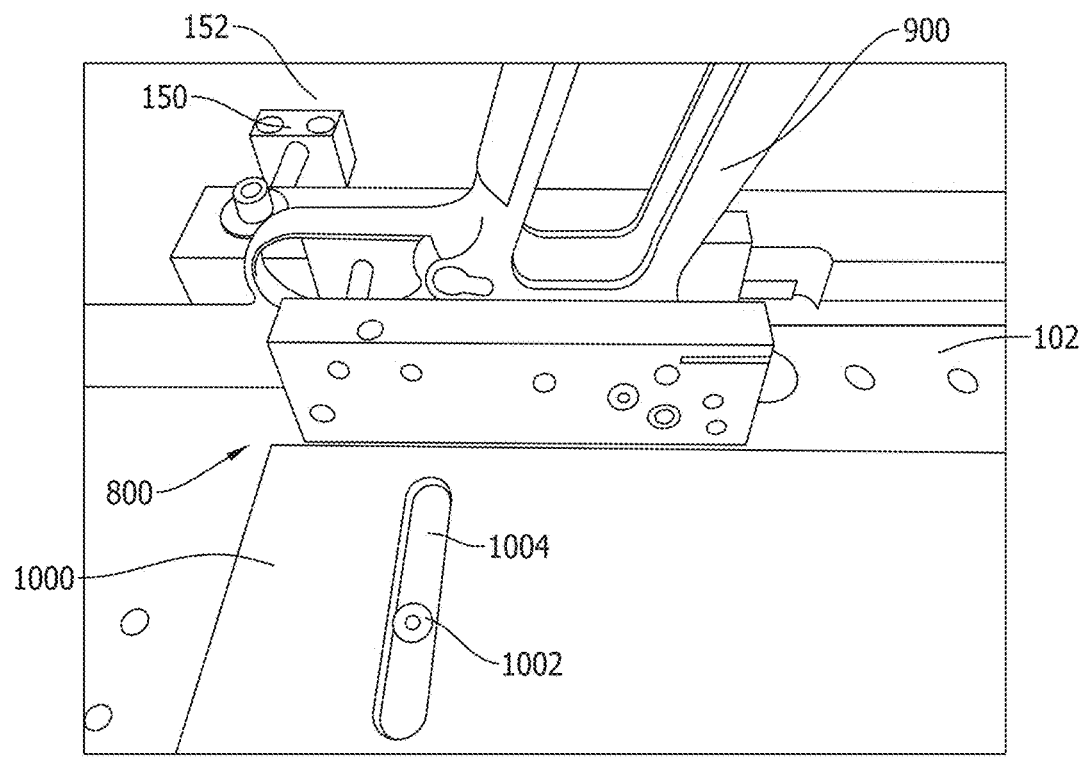
Figure 13C:
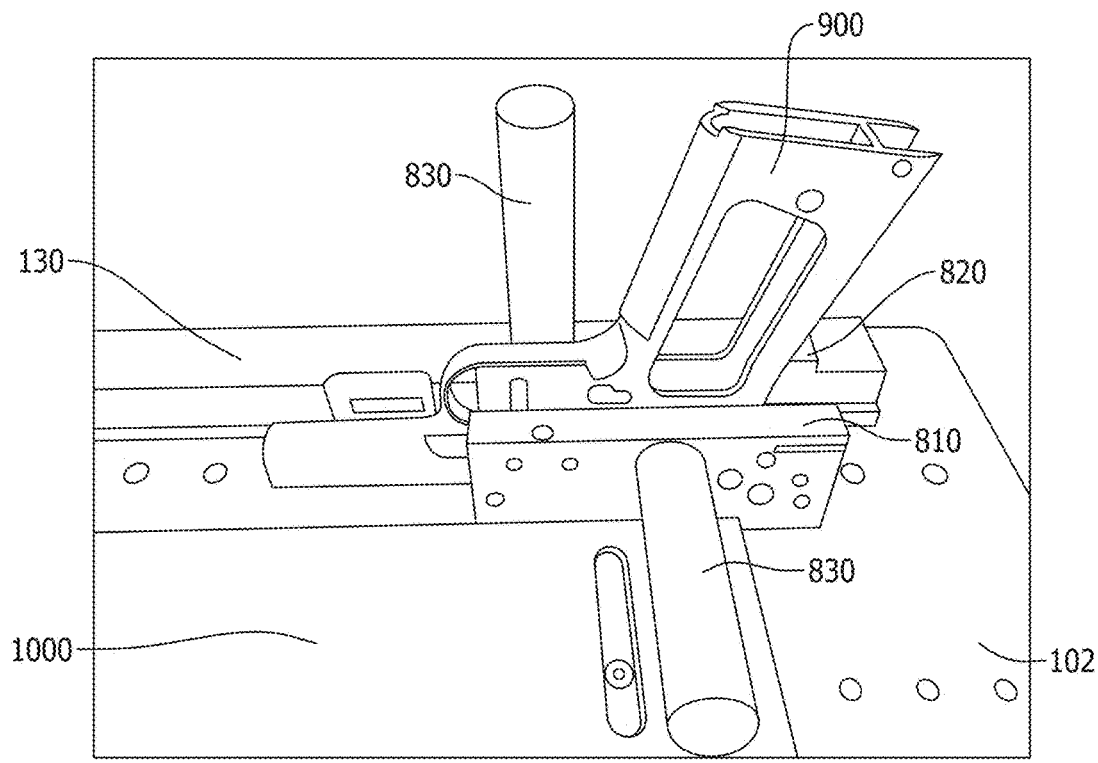

FIGS. 13A, 13B, and 13C show a process of milling a deck of a frame, according to one exemplary embodiment. As shown in FIG. 13A, the fence 130 is positioned on the top plate 102 as described above. The frame holder 800 is placed on the top plate 102 such that the deck 910 (FIG. 12B) may be milled by the work tool 184. The stand 150 and adjustment mechanism 152 allow for precise positioning of the fence 130 as shown in FIG. 13B for milling the deck 910 of the frame 900. The height of the work tool 184 may be set by a template shelf 818, 828 in the left-side and right-side frame holders 810, 820 (FIG. 13A).

A secondary fence 1000 is secured to the top plate 102 as shown in FIG. 13B to help constrain movement. A fastener 1002 holds the secondary fence 1000 into a position that is adjustable via the elongated hole 1004. FIG. 13C shows handles 830 attached to the frame holder 800. The handles 830 facilitate movement of the frame 900 between the fence and the secondary fence 1000 to mill material from the deck 910 of the frame 900.

In this embodiment, a ⅜" to ½" collet adapter may be used in the router to mill material. The secondary fence 1000 is installed such that the fence may move with moderate effort. More specifically, the secondary fence is allowed to slide back and force with minimum side to side movement. The frame assembly 800 is moved slowly over the end mill to avoid damage to the end mill while maintaining sufficient downward pressure on the assembly 900. The use may also push the assembly 800 towards the fence 130 to stabilize the part. An exemplary feed rate for moving the assembly during the process is 1" every 10 seconds. To achieve an accurate finish, multiple passes may be required removing a layer of material on each pass. For example, the depths of cut on each pass may not exceed 0.005". The passes are repeated until the deck height conforms with the specification height. The deck height may be verified using calipers, pin gauges, or height gauges, or a combination thereof.

Figure 14:
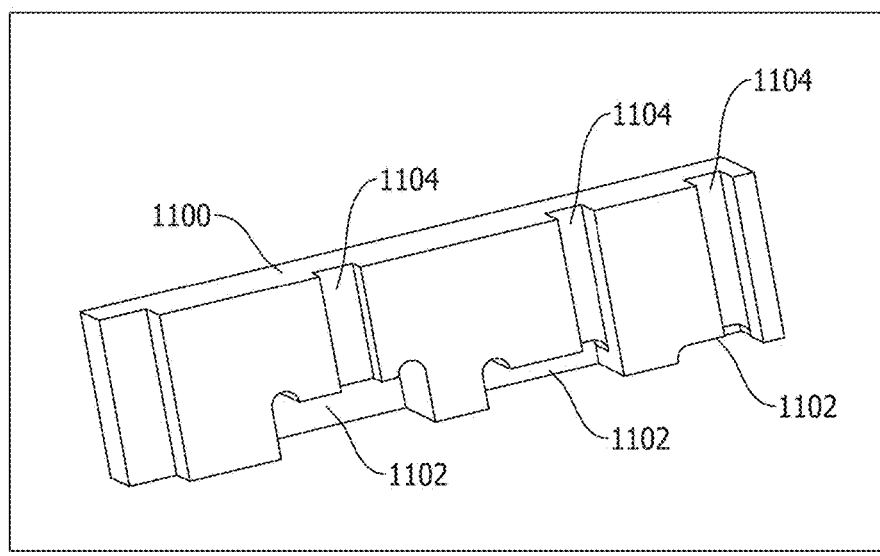
FIG. 14 shows a template according to an exemplary embodiment.

The height of the router work tool 184 may be controlled by a template 1100. FIG. 14 shows a template according to an exemplary embodiment. Before milling a part, the work tool 184 may be brought up into contact which one of the depth settings 1102 of the template 1100. This can control the depth of cut for each of the required passes. In other embodiments, the depth of cut may be set by directly measuring the height of the work tool 184, such as using calipers or other measuring tools. Some routers may also comprise devices that measure the change in height of a work tool. In some cases, the gauge feature can be built into the parts (FIGS. 13A and 13B).

The template 1100 further comprises slots 1104. The slots 1104 allow caliper to measure heights before final cuts to assure small steps are taken on subsequent passes to remove the correct amount of material. The slots 1104 may thus define intermediate passes, while the gauge depth settings 1102 define final passes.

80% Frame—Barrel Seat

Figure 15A:
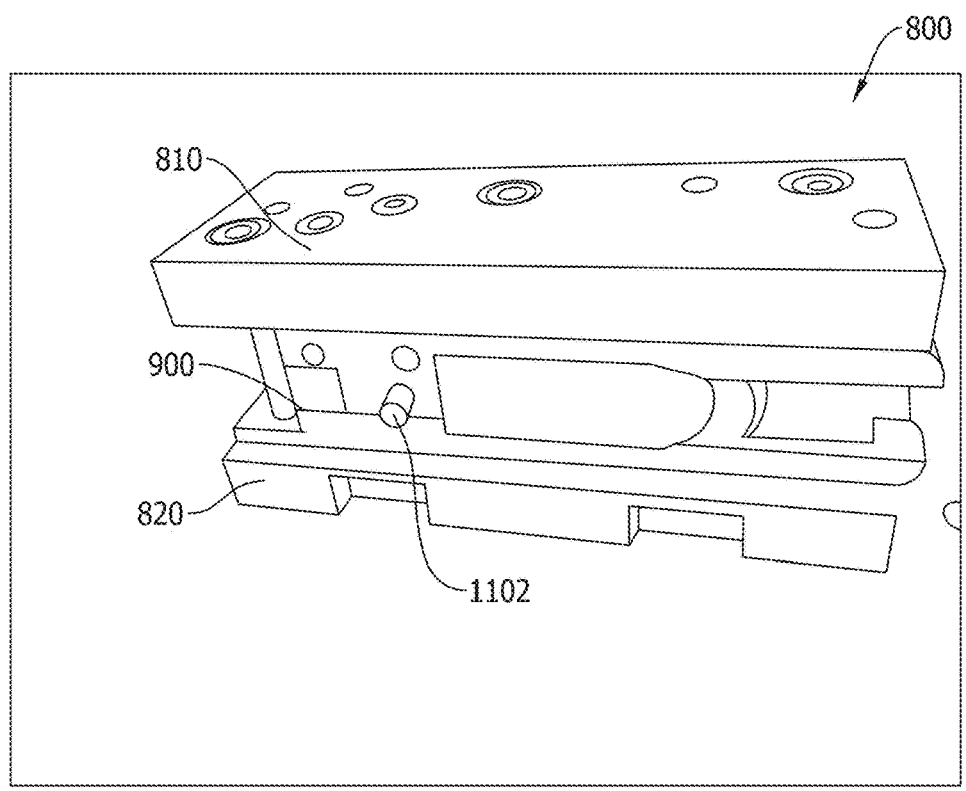
FIGS. 15A, 15B, 15C, and 15D show steps of finishing a barrel seat, according to an exemplary embodiment.
Figure 15B:
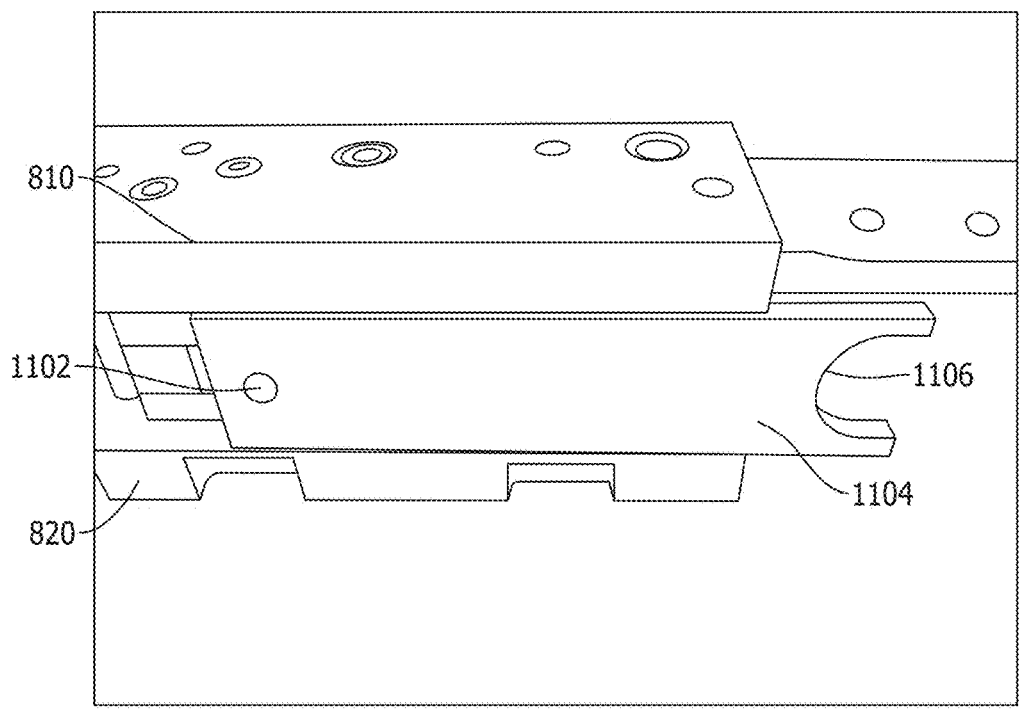
Figure 15C:
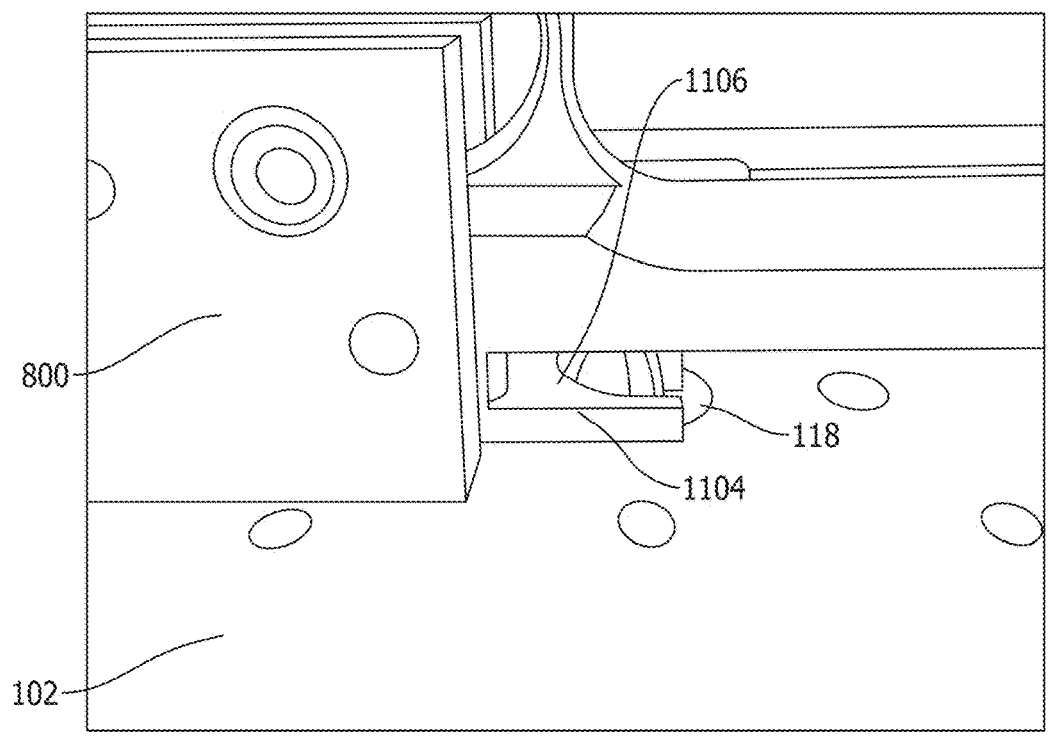

FIGS. 15A, 15B, 15C, and 15D show steps of finishing a barrel seat, according to an exemplary embodiment. In this embodiment, the first step for finishing a barrel seat comprises setting the fence 130 to the appropriate position. FIG. 15A shows a top of the frame holder 800 and frame 900. A roll pin 1102 is placed in a disconnect hole of the frame 900. As shown in FIG. 15B, the roll pin 1102 guides a frame center tool 1104 in between the right-side and left-side frame holder 810, 820. A square feature that fits between the inside of the frame above the trigger is the other reference point. The frame center tool 1104 is used to orient the frame holder 800 for the barrel seat finishing process by way of a recess 1106 in one end thereof. The roll pin 1102 also interacts with pin holes 129 and the frame center tool 1104 with the u-shaped recess 1106 centers the frame 900 to the work tool 184.

Figure 15D:
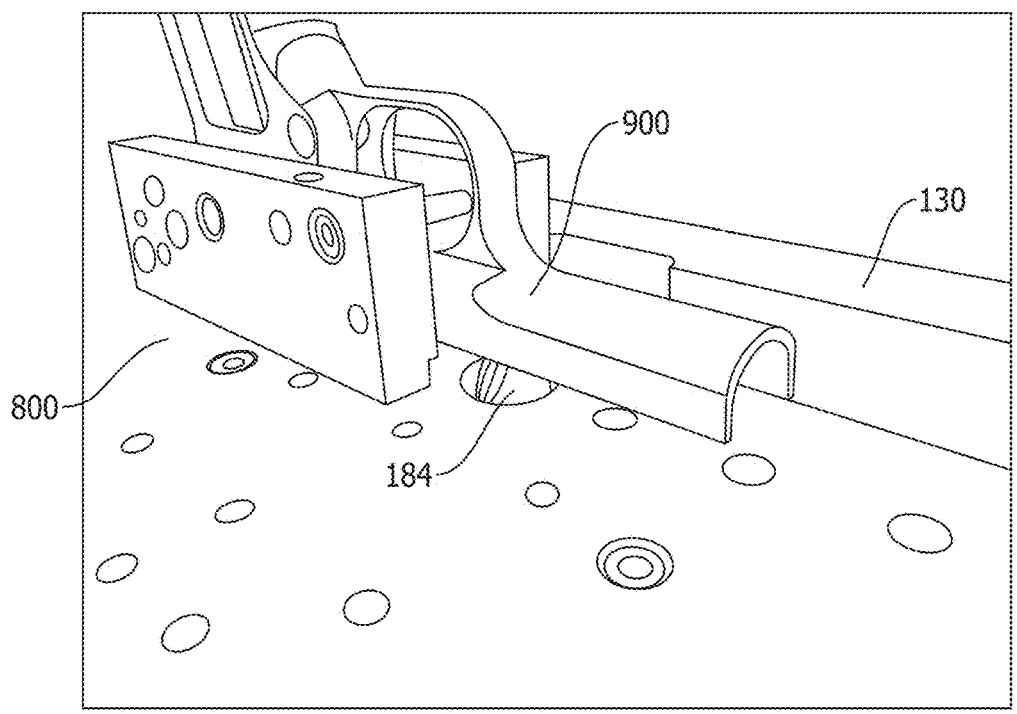

The recess 1106 is aligned with the hole 118 in the top surface 102 to center the frame holder 800 over the work tool aperture 118. When the frame holder 800 is centered, the fence 130 can be brought into the correct position. The fence 130 is positioned as described above. In FIG. 15D, with the fence 130 in position and the center tool 1104 removed, the barrel seat can be finished by moving the frame holder 800 along the fence 130 to machine a barrel seat of the frame 900 with the work tool 184.

80% Frame—Frame Rails

Figure 16A:
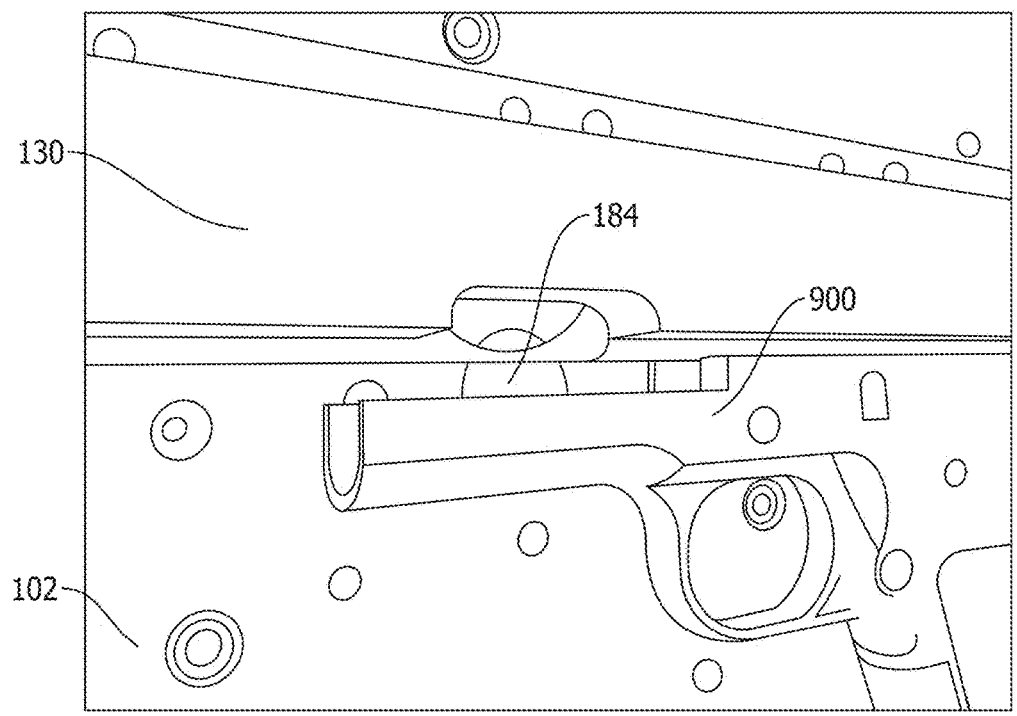
FIGS. 16A, 16B, 16C, 16D, and 16E show steps of finishing frame rails, according to an exemplary embodiment.
Figure 16B:
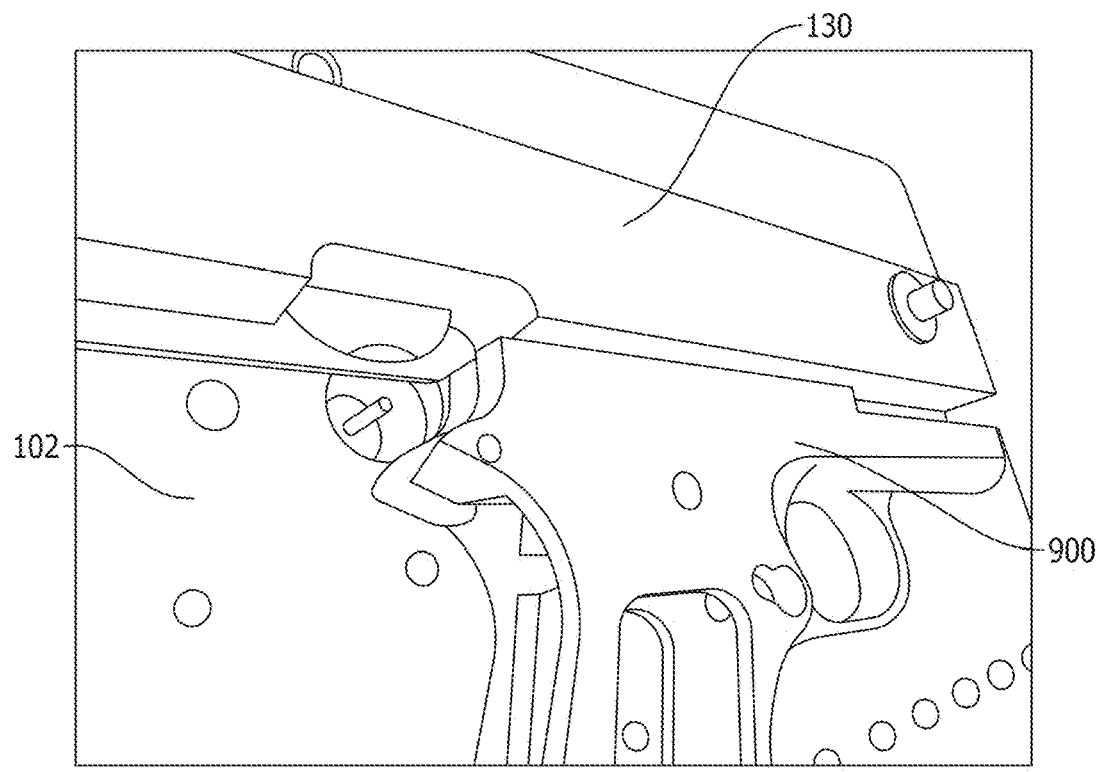
Figure 16C:
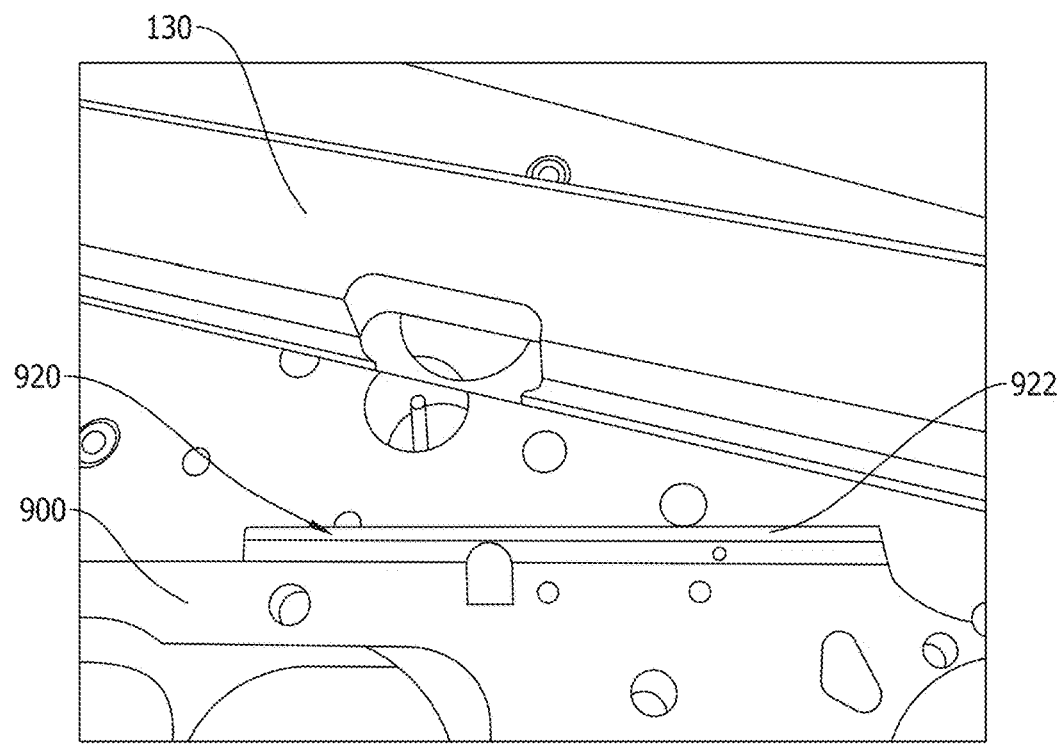
Figure 16D:
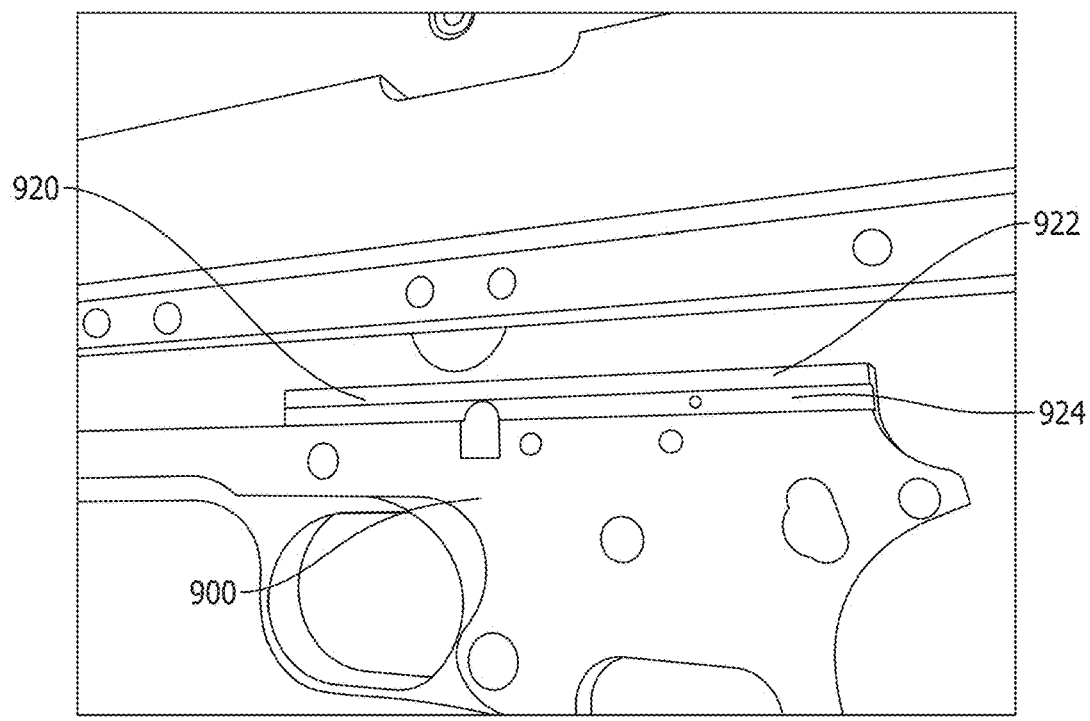

FIGS. 16A, 16B, 16C, 16D, and 16E show steps of finishing frame rails, according to an exemplary embodiment. As shown in FIG. 16A, a work tool 184 is inserted into the router 180 to machine a rail 920 into the frame 900. In this example, a ⁷⁄₆₄ (0.109″) carbide end-mil is used. However, any suitable tool based on the particular firearm being finished may be used. The fence 130 is set on the top plate 102 as described above. The frame 900 is fed along the fence 130 to mill the rail 920 on both sides of the frame 900 as shown in FIGS. 16A and 16B. After each pass, the height of the end-mill tool 108 is increased, such as by 0.005-0.010 inches. Intermediate heights and the final heights are verified and compared to specification. Gauges such as those in template 1100 may be used to set the position of the end mill height. The fence 130 is also positioned according to spec to facilitate the removal of material. This process finishes the rail groove top 922 height of the frame 900 as shown in FIG. 16C.

Figure 16E:
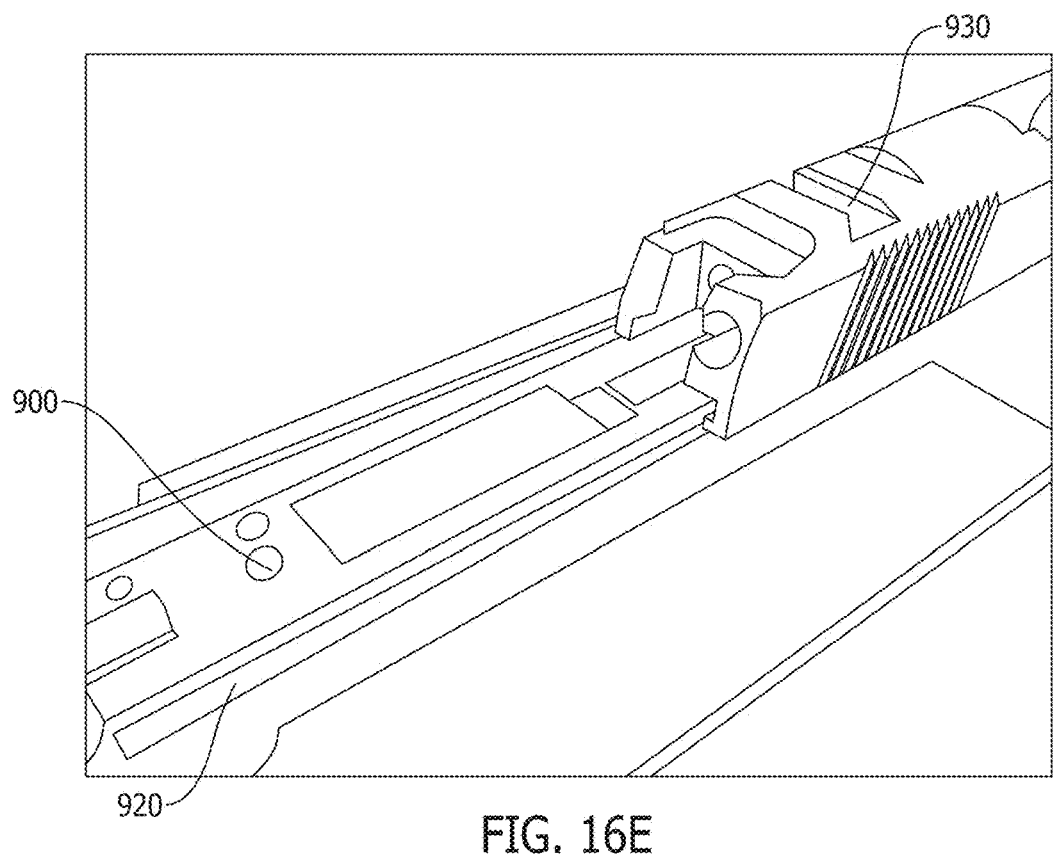

16D shows the fence 130 repositioned to mill the frame groove bottom. In FIG. 16C. With the fence 130 repositioned, the frame groove bottom 924 is milled and verified similar to the frame top 922 as described above. With the rail 920 finished, a slide may be fit over the rail 920. In FIG. 16E, a frame is clamped such that the slide 930 is positioned on the rail 920. Filing and other detail work may be done to ensure a correct fit. The final cut is indicated by the gauge. The use of the alignment knob (approx. 10 mils of indicated movement is 5 mils of actual movement at the center) is used to set the intermediate cut depth. The gauge is used to verify the final cut depth.

80% Frame—Hammer and Sear Holes

Figure 17A:
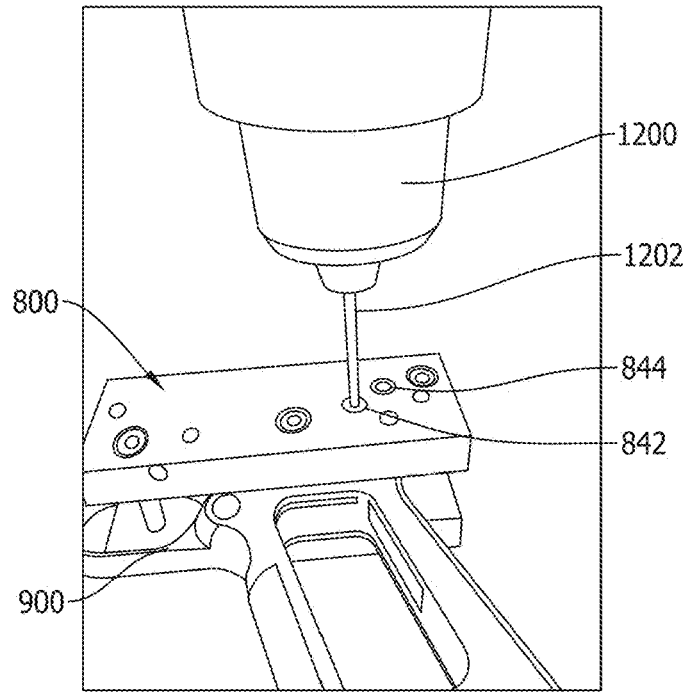
FIGS. 17A and 17B show steps for processing hammer and sear holes, according to one exemplary embodiment.
Figure 17B:
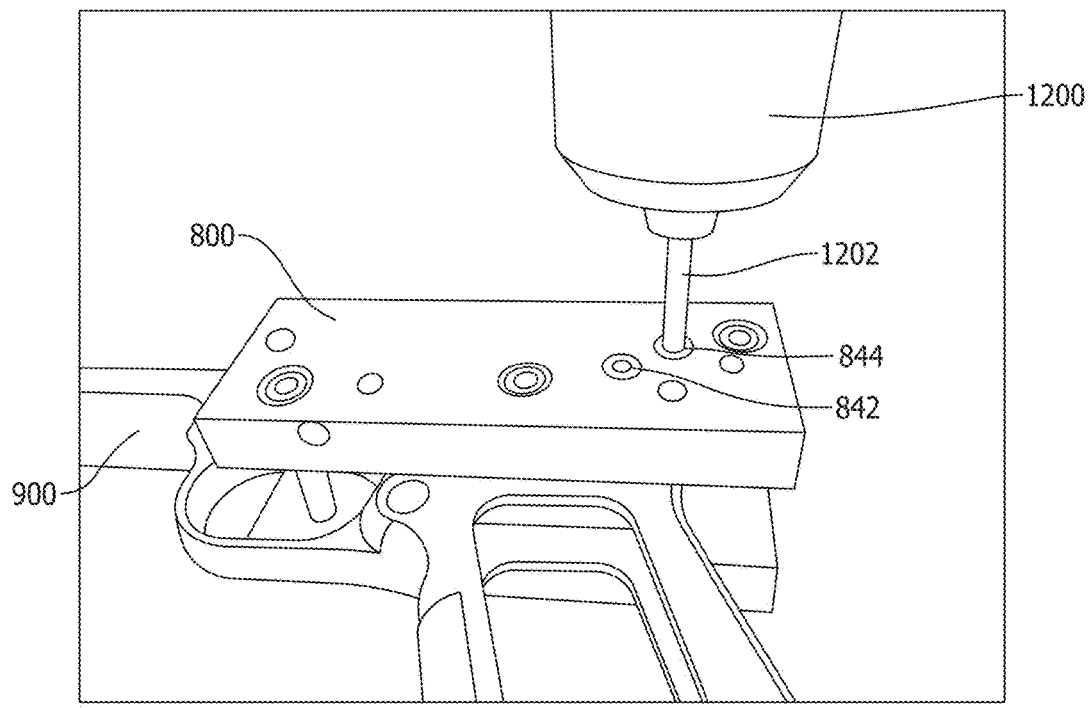

FIGS. 17A and 17B show steps for processing hammer and sear holes, according to one exemplary embodiment. With the frame holder 800 assembled as explained previously, the hammer and sear holes may be drilled out of the frame 900. The frame holder 800 comprises a sear pin guide hole 842 and a hammer pin guide hole 844. A drill or drill press 1200 along with a drill bit 1202 is used to drill through the frame 900. In FIG. 17A, a sear hole is drilled through the sear guide hole 842 of the frame holder 800. In this example, a #34 drill bit (0.111″) is used. In FIG. 17B, a hammer is drilled through the hammer guide hole 844 of the frame holder 800. In this example, a 4 mm drill bit (0.1575″) is used. Other drill bit sizes may of course be used depending on the specification of the part. In some instances, the hammer and sear holes in the frame 900 may need a countersink. Such may be added in any known method to both sides of the frame 900.

Beaver Tail Radius

Fitting a modern beavertail safety requires modifying the frame. There are three main styles of beavertails. The "Ed Brown" style uses a 0.250″ radius and include Beavertails from STI and Chip McCormick. Another style is the "Smith & Alexander" that uses a smaller 0.220 radius. Both of these styles are compatible with the disclosed safety beavertail jig as described below. The third style is Wilson Combat that uses a compound radius and is not currently compatible with this jig.

Jig Setup

Figure 18:
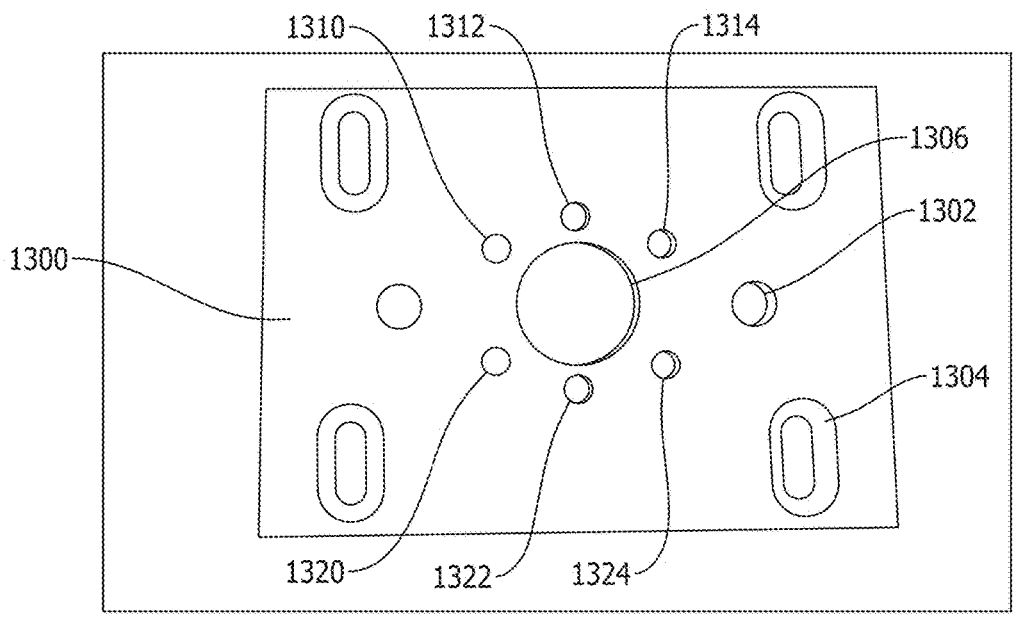
FIG. 18 shows a beaver tail safety jig, according to an exemplary embodiment.

FIG. 18 shows a beaver tail safety jig, according to an exemplary embodiment. The beaver tail safety jig 1300 comprises alignment holes 1302. These holes are fabricated to align the jig 1300 to the top plate 102 of the gun smith platform 100. When aligned, holes 1304 facilitate securing the jig 1300 to the top plate 102. The jig 1300 is secured to the top plate 102 such that the work tool 183 extends through the aperture 1306 on the jig 1300.

The jig 1300 is configured to facility a beavertail safety with a 0.250″ or a 0.220″ radius. A first series of holes 1310, 1312, 1314 are configured to aid in sequentially removing thin layers of material in three passes for a final 0.250″ radius. A second series of holes 1320, 1322, 1324 are configured to aid in sequentially removing thin layers of material in three passes for a 0.220″ radius.

The jig 1300 is also configured to allow for a custom radius. To achieve a custom radius, the jig 1300 is not aligned using the pin alignment holes 1302, but is fastened to the top plate 102 via the elongated holes 1304 at a location measured by the user.

For the custom setting, the $2^{nd}$ fence is set as the reference, Feeler gauges between the $2^{nd}$ fence and the jig 1300 when the pins in holes 1302 are moved allows for custom settings. This allows the user to remove a small amount of material at a time, test fit, and remove more material until the desired fit.

Beaver Tail Finishing

Figure 19A:
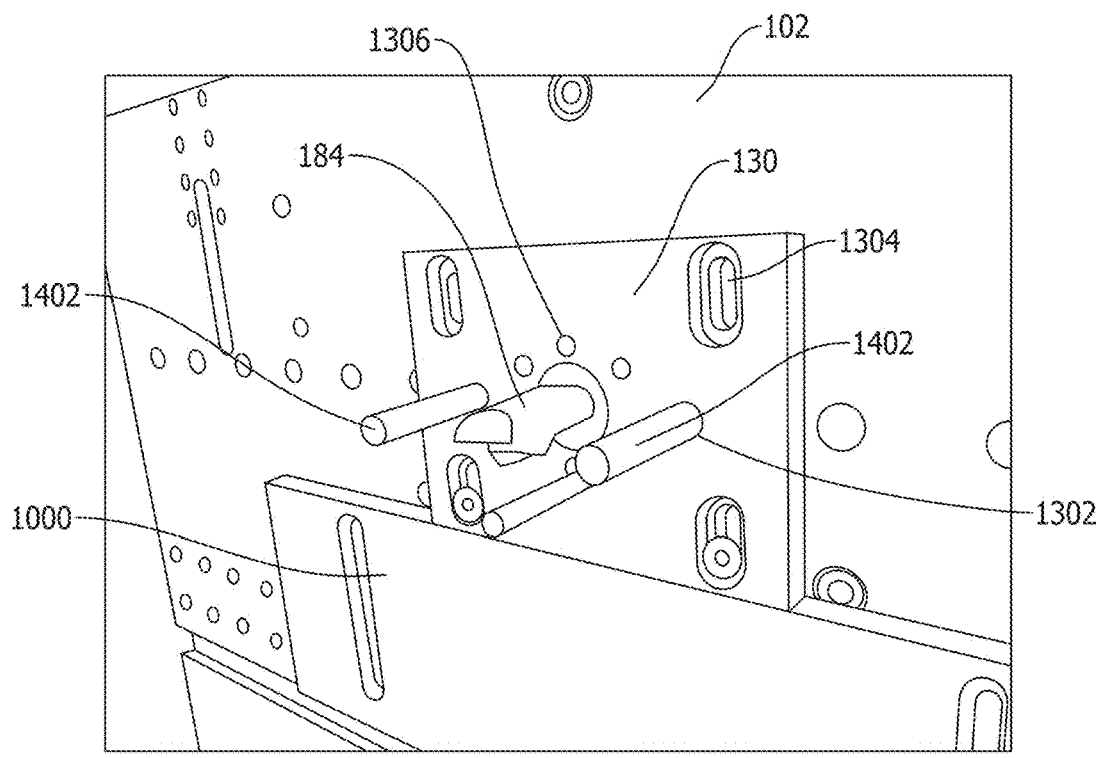
FIGS. 19A, 19B, 19C, and 19D show steps for finishing a beavertail safety, according to an exemplary embodiment.
Figure 19B:
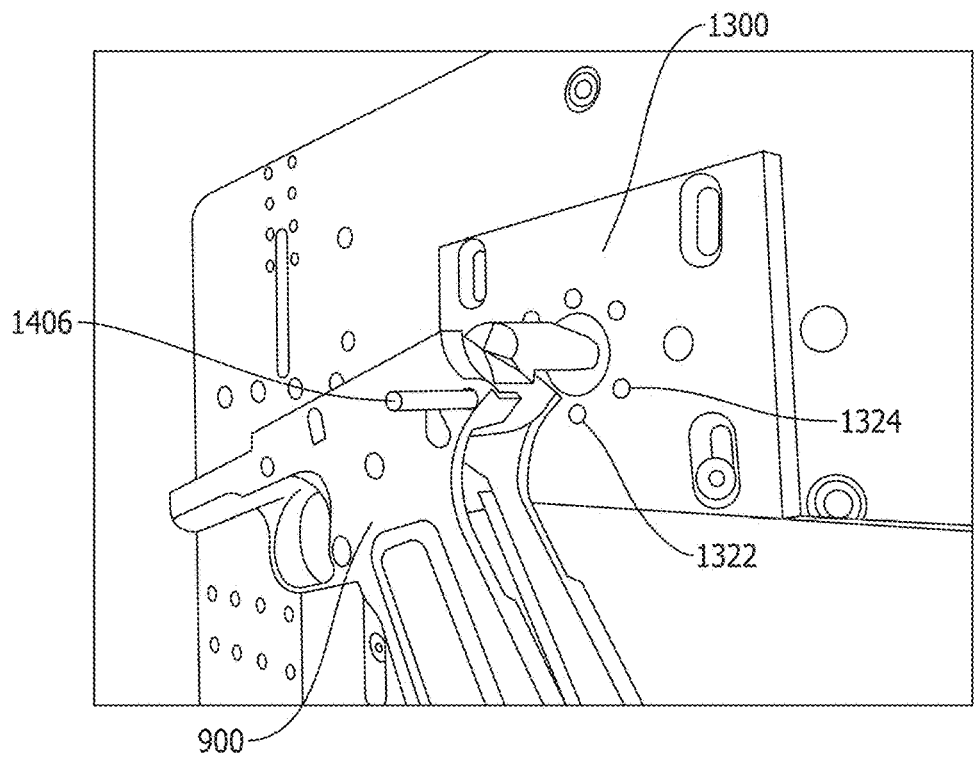

FIGS. 19A, 19B, 19C, and 19D show steps for finishing a beavertail safety, according to an exemplary embodiment. In FIG. 19A, the jig 1300 is placed on the top plate 102 and is aligned via pins 1402 extending through alignment holes 1302. The jig 1300 is secured via fasteners 1404 through holes 1304. As mentioned above, the pins 1402 need not be used in a custom setup, and the jig 1300 may be secured with fasteners 1404 through elongated holes 1304 at a custom location. The work tool 184 extends through aperture 1306. The secondary fence 1000 may be brought next to the jig 1300 for a flat surface on which to rotate the frame 900.

Figure 19C:
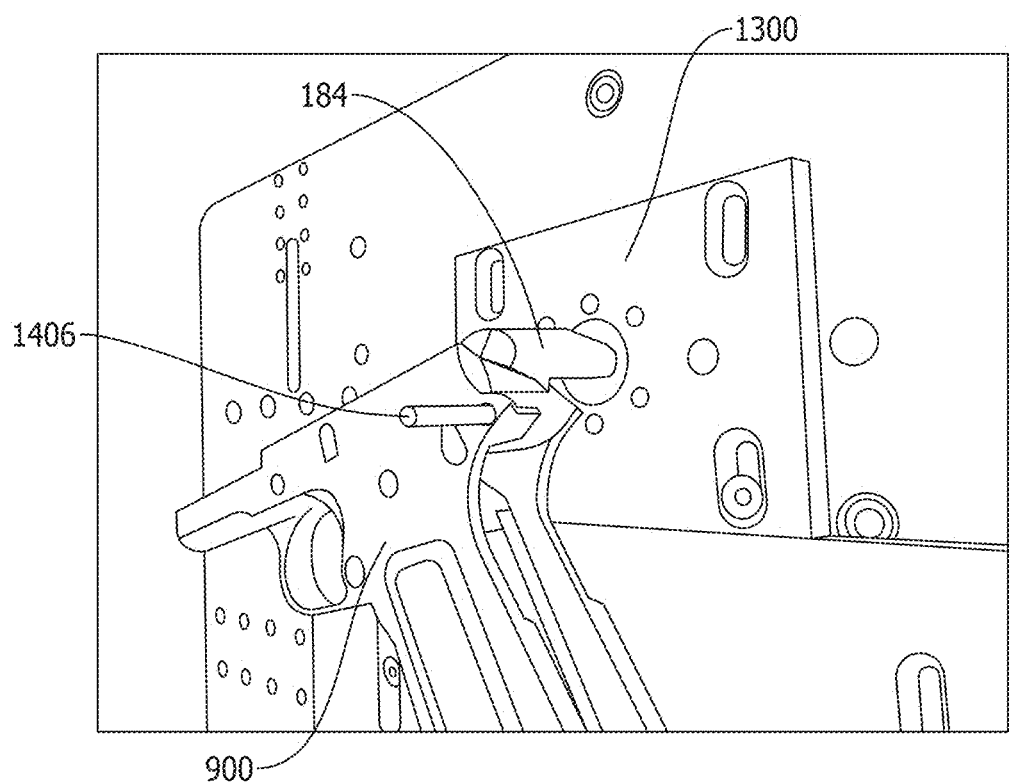
Figure 19D:
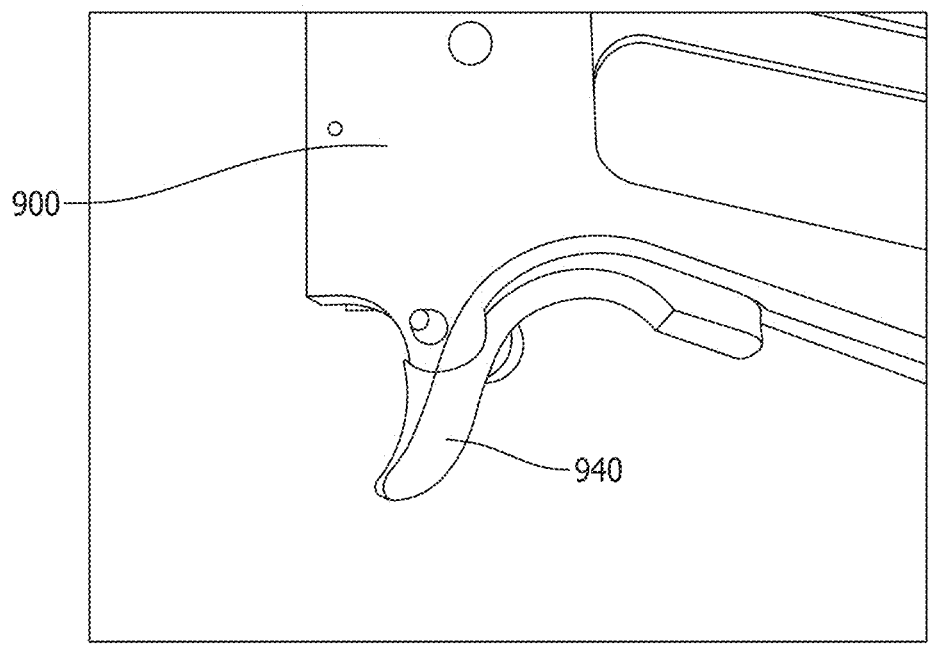

The frame 900 rests on top of the jig 1300 and is positioned by a pin 1406 through the frame 900. The pin 1406 is first positioned in the hole farthest from the work tool 184. In this example, the hole 1320 is the farthest from the work tool 184. The frame 900 is rotated about the pin 1406 to cut the radius. After the first pass, the pin 1406 is moved to the next closest aperture 1324, and the process is repeated. The last pass is made with the pin 1406 in the hole closest to the work tool, or hole 1322 in this example, as shown in FIG. 19C. The last pass provides the final accurate radius for the beaver tail safety. The process is performed in a similar manner using holes 1310, 1312, 1314 for the other radius. The jig 1300 could be configured to provide radii of different sizes other than those shown in FIGS. 19A-19C. FIG. 19D shows a beavertail safety 940 attached to the frame 900 after finishing the radius. The part may also include a safety shield to reduce potential exposure of cutting surface as well as stops to set the start and stopping points.

Top End Slide/Barrel Fit

The fitting of the barrel to the frame and slide is divided into two parts. The first part involves fitting the top of the barrel to the slide and the second part involves fitting the bottom of the barrel to the frame and slide and obtaining the proper timing.

The top end process involves 1) measurements to determine desired level of fit, 2) trimming of the barrel hood width to fit the frame, 3) trimming of the lug(s) width for barrel fit, and 4) fitting of the barrel and slide for lockup depth.

The bottom end process involves 1) determine the lower lug height required to achieve lockup, 2) trimming of the lower lug to achieve lock up and proper slide position at lockup, 3) selecting and fitting the proper barrel link, and 4) frame bridge/barrel seat/slide adjustments to achieve proper timing.

Figure 20A:
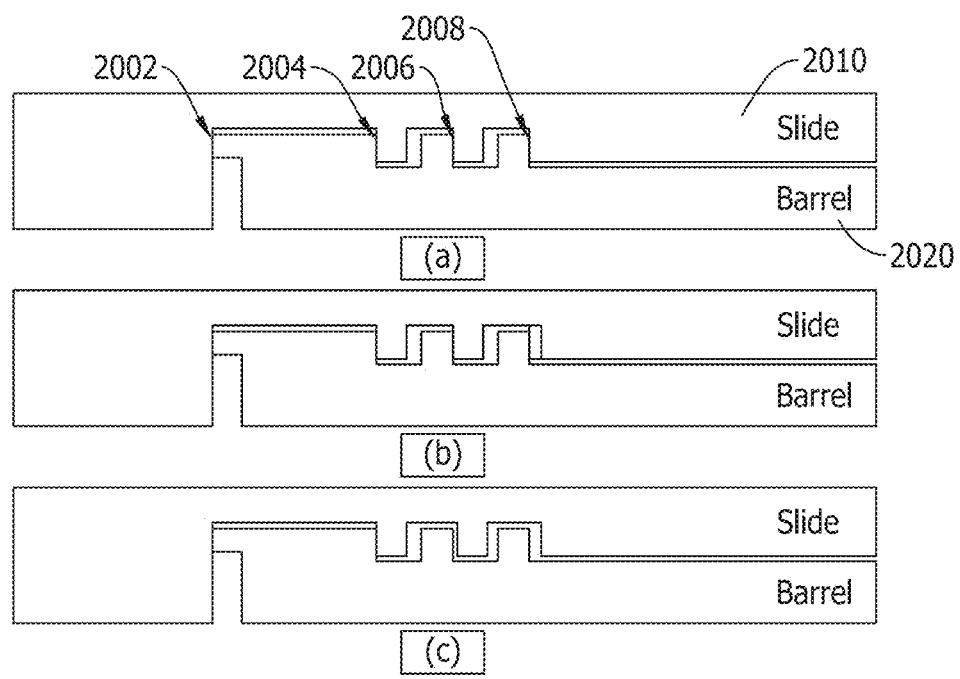
FIG. 20A shows an ideal case where the barrel and slide contact at 4 points during lockup.

In the ideal case, as the slide moves into the locked position, the slide pushes on the rear of the barrel at the breech/hood. As the barrel is pushed forward, the barrel link, bottom barrel lug, and the slide stop pin acts to push the barrel up to engage the slide and barrel at the three top lug points. FIG. 20A shows an ideal case where the barrel and slide contact at 4 points during lockup. Specifically in FIG. 20A, the slide 2010 comprises the breach/hood 2002 that interacts with the barrel 2020. In the ideal fit shown in part (a), all three lugs of the barrel 2020 are engaged with the slide 2010.

This configuration results in the highest accuracy and durability because all three lugs share the stress of locking the slide to the barrel in the $1^{st}$ instance of a round being fired. Achieving this configuration requires the greatest amount of time and precision in fitting. With some "gunsmith fit" barrels, even without removing any material from the rear lug, the #3 lug 2008 does not have any overlap to achieve a 4-point fit, resulting in the 3-point fit shown in part (b) of FIG. 20A. Since two of the lugs share the load when the round is fired, this approach is used in competition guns chambered for more powerful rounds. Lastly, for accuracy a 2-point fit is shown in part (c) of FIG. 20A. This retains the accuracy and has sufficient durability for standard 45 ACP rounds. This is the typical fit achieved with "drop in" barrels that require minor fitting or represents the fastest way to fit a "gunsmith fit" barrel. "No fit" or "true drop-in" may not make contact with any of the lug, allowing movement between the frame and slide when a tight no-movement lockup condition is desired for accuracy. Poorly fit barrels may make contact with the rear of the barrel at other points besides the hood/breach interface.

Figure 20B:
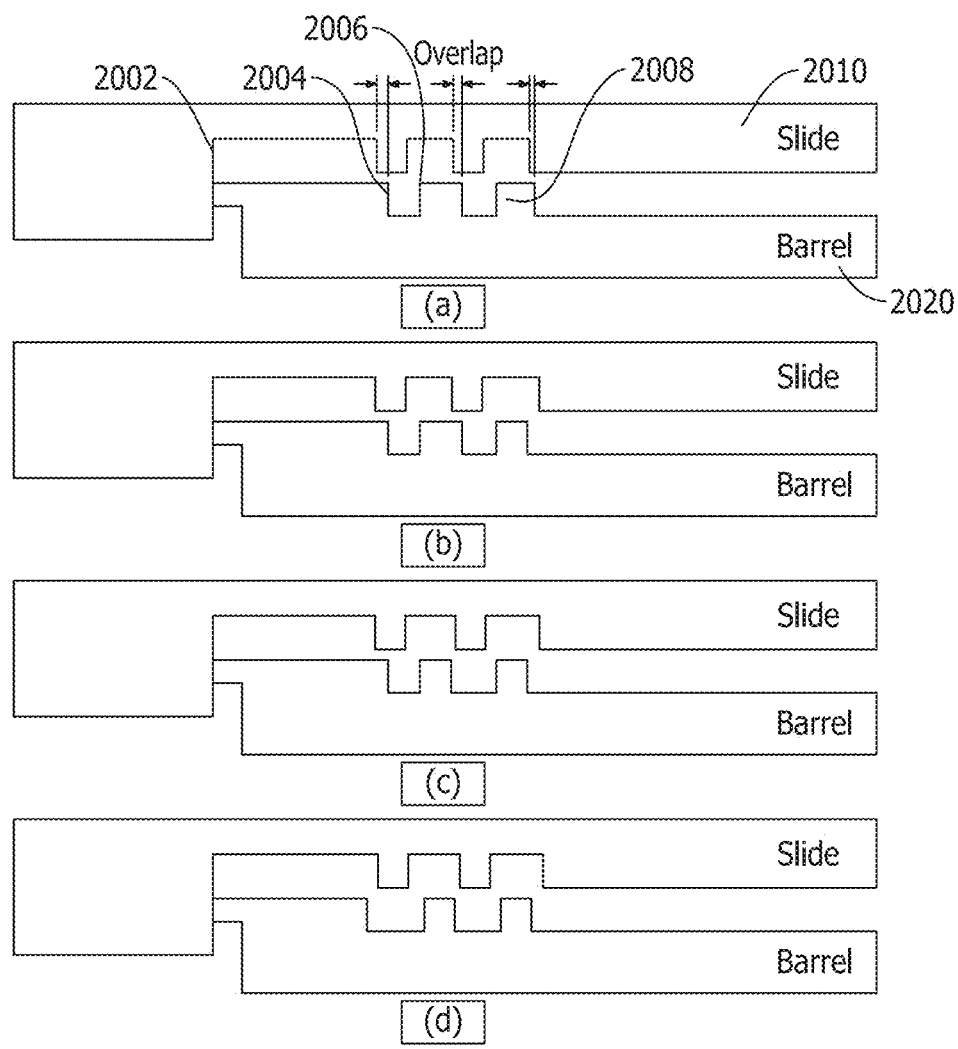
FIG. 20B shows possible and common cases of the barrel and slide relationship before fit.

FIG. 20B shows possible and common cases of the barrel and slide relationship before fit. All parts (a)-(d) of FIG. 20A show the slide breech making contact with the barrel hood while showing differences in the overlap at the different lugs 2004, 2006, 2008. To determine the actual case, measurements and calculations will be made to determine 1) if there is overlap at each of the lugs 2004, 2006, 2008 and 2) the amount of overlap when it exists. Case (a) is the case where all three lugs 2004, 2006, 2008 have overlap enabling the possibility of a 4-point fit and the desired case with "gunsmith fit barrels". Generally, the overlap of 2004 is the greatest and the overlap of 2006 is the smallest. Case (b) has only lugs 2004, 2006 with overlap. This can happen with certain combinations of "gunsmith fit barrels" and the actual slides. Typically, 2008 doesn't overlap. In case (c), only lug 2004 has overlap. This condition is frequently encountered with "drop in barrels" that require minor fitting. Case 4 has no overlap in any of the lugs 2004, 2006, 2008 which is typically of true "drop in" barrels.

From a fitting point of view, the fastest way to fit the barrel is to achieve a 2-point fit. This is accomplished by removing material from the hood to achieve lockup with lug 2004. In many cases, the slide and barrel tolerance will result in no interference from lugs 2006 and 2008. This results in an accurate and tight lockup with the least amount of fitting effort. For a 3 or 4-point contact fit, the lug with the least amount overlap needs to be determined and the hood is trimmed to allow that lug to fit. Afterwards, the remaining lugs that have overlap are manually filed to fit without a gap at the lock up surfaces. This allows for a more durable design since multiple lugs can share the stress that holds the barrel and slide together in the initial moments after the round is fired.

Barrel Hood Fitting

Figure 21A:
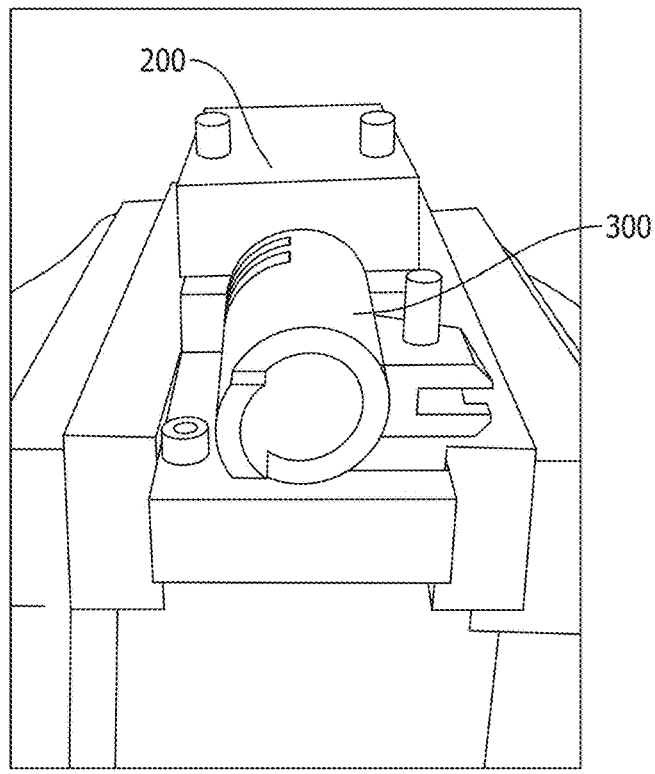
FIGS. 21A and 21B show steps for trimming barrel width, according to an exemplary embodiment.
Figure 21B:
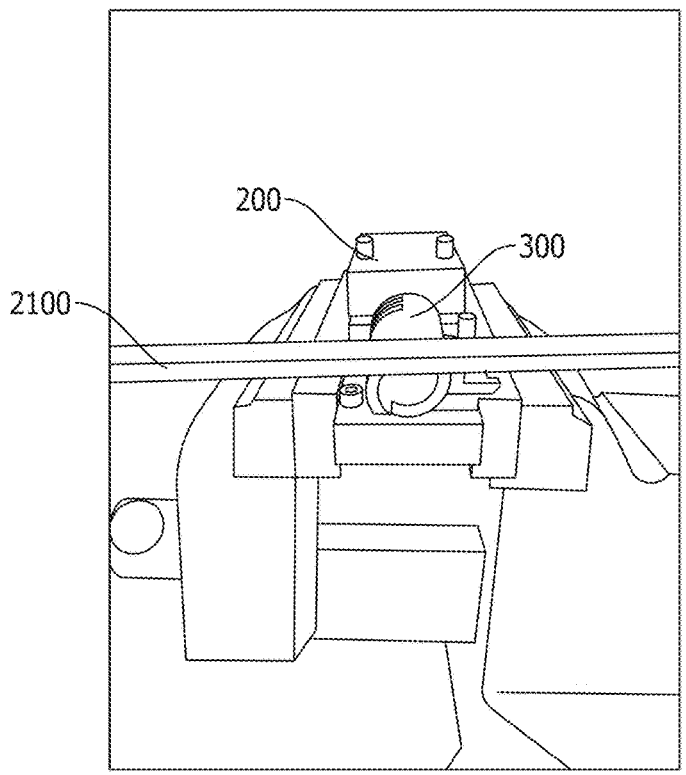

FIGS. 21A and 21B show steps for trimming barrel width, according to an exemplary embodiment. Once it is determined how much material is to be removed from the barrel 300, the barrel 300 is clamped into the barrel holder 200 as described above. The barrel 300 may be marked to indicate the amount of material for removal. A side file 2100 may be used to remove material from each side. After removing material, the barrel may be test fit for alignment until the barrel just fits inside the slide and that a targeted side gap between the slide and the barrel is achieved. Here the barrel holder 200 provides a parallel surface reference that enables more accurate results.

Barrel Top Lug Fitting

As explained above, the lugs are measured to determine the amount of overlap that may exist. The amount of material to be removed on one or more of the lugs depending on the amount of overlap and the desired number of lugs to be engaged. For this process, the x-y stage 400 is assembled as shown in FIG. 7A-7D.

Figure 22A:
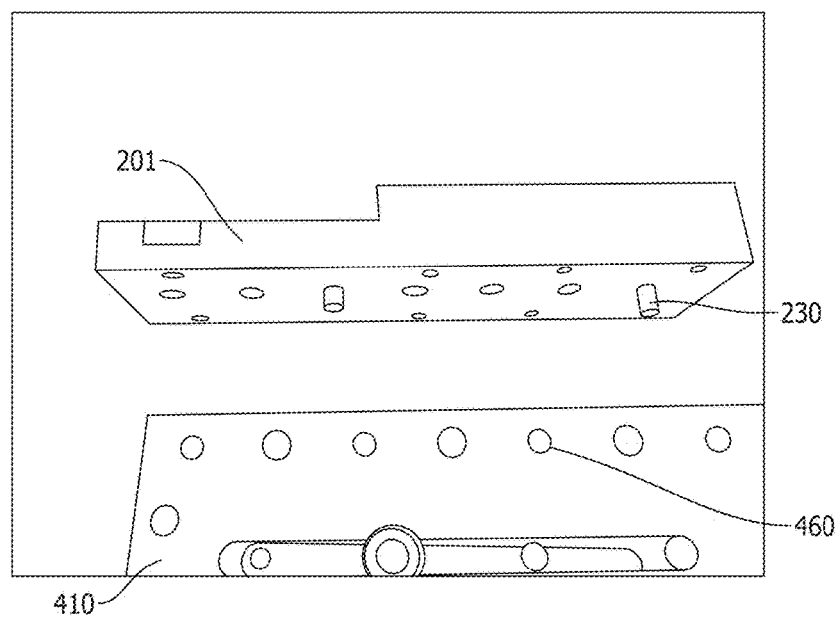
FIGS. 22A, 22B, 22C, and 22D illustrate steps of preparing a barrel holder for barrel top lug fitting, according to an exemplary embodiment.
Figure 22B:
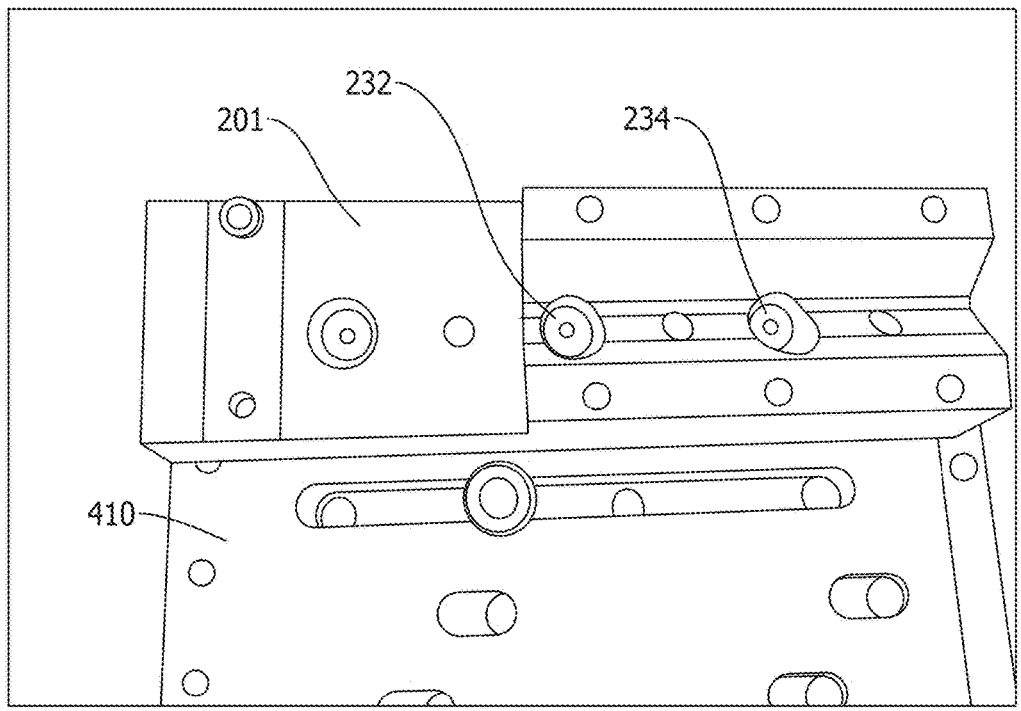
Figure 22C:
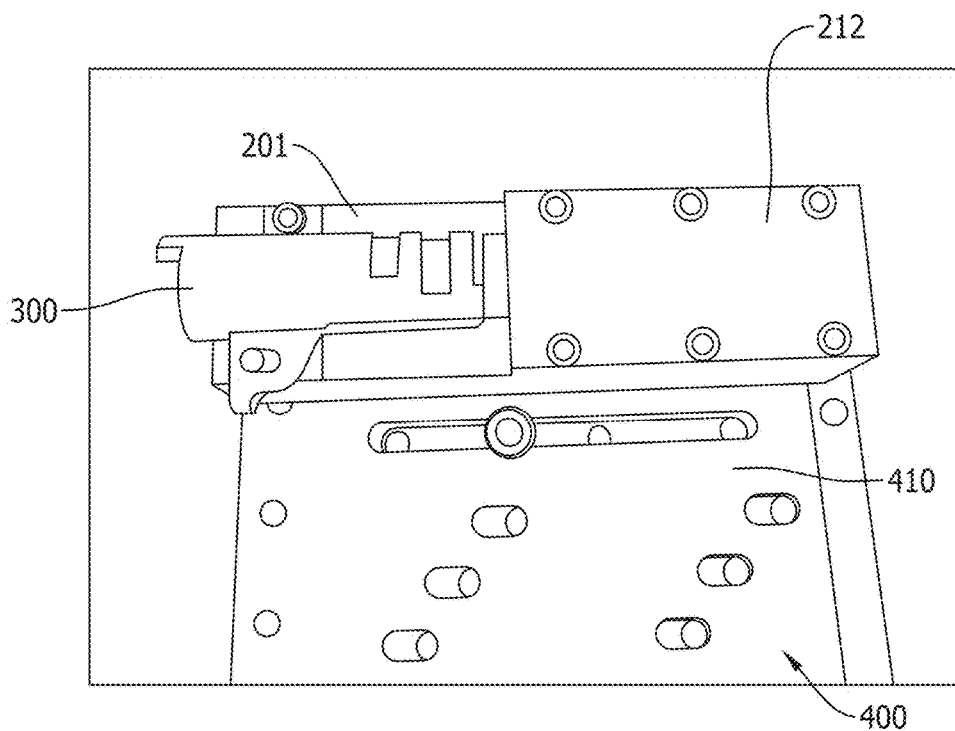
Figure 22D:
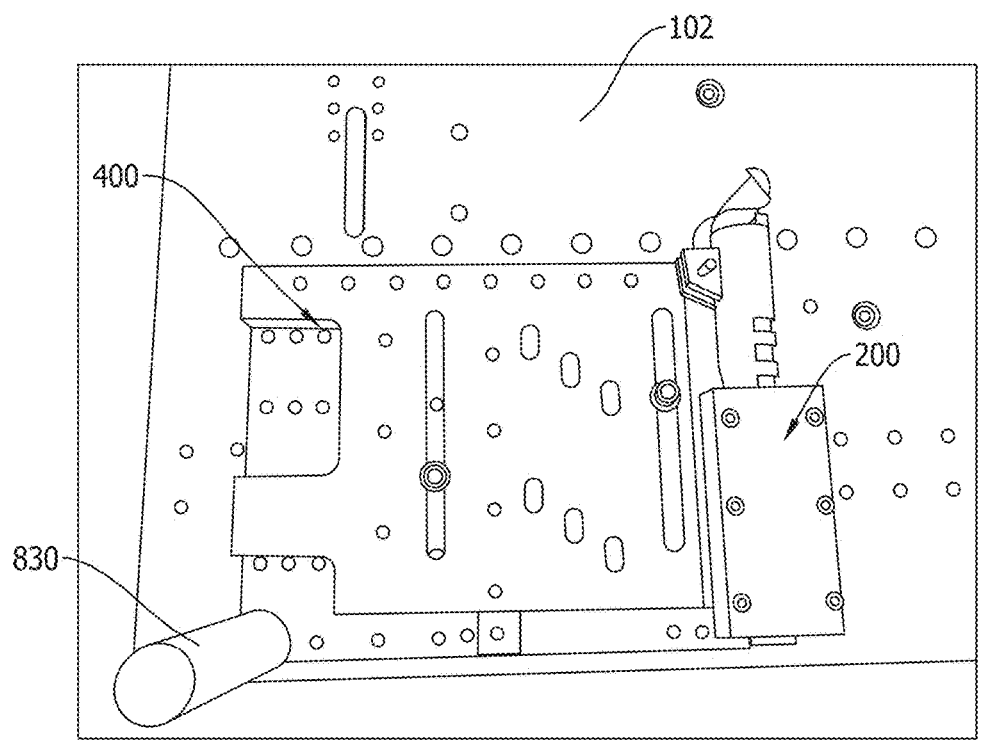

FIGS. 22A, 22B, 22C, and 22D illustrate steps of preparing a barrel holder for barrel top lug fitting, according to an exemplary embodiment. As shown in FIG. 22A, alignment pins 230 are inserted into the base 201 of a barrel holder 200. The alignment pins 230 are received into apertures 460 of the top plate 410 of the x-y stage 400. The base 201 is fastened to the top plate 410 of the x-y stage 400 by fasteners 234 that extend through apertures 232 of the base 201 and into the apertures 460 of the top plate 410. The barrel clamp 212 then secures the barrel 300 into the barrel holder as described previously, as shown in FIG. 22C. In FIG. 22D, the x-y stage 400 with the barrel holder 200 is attached to the top plate 102 with the rail 432 in the recessed track 129 as described above.

Figure 23A:
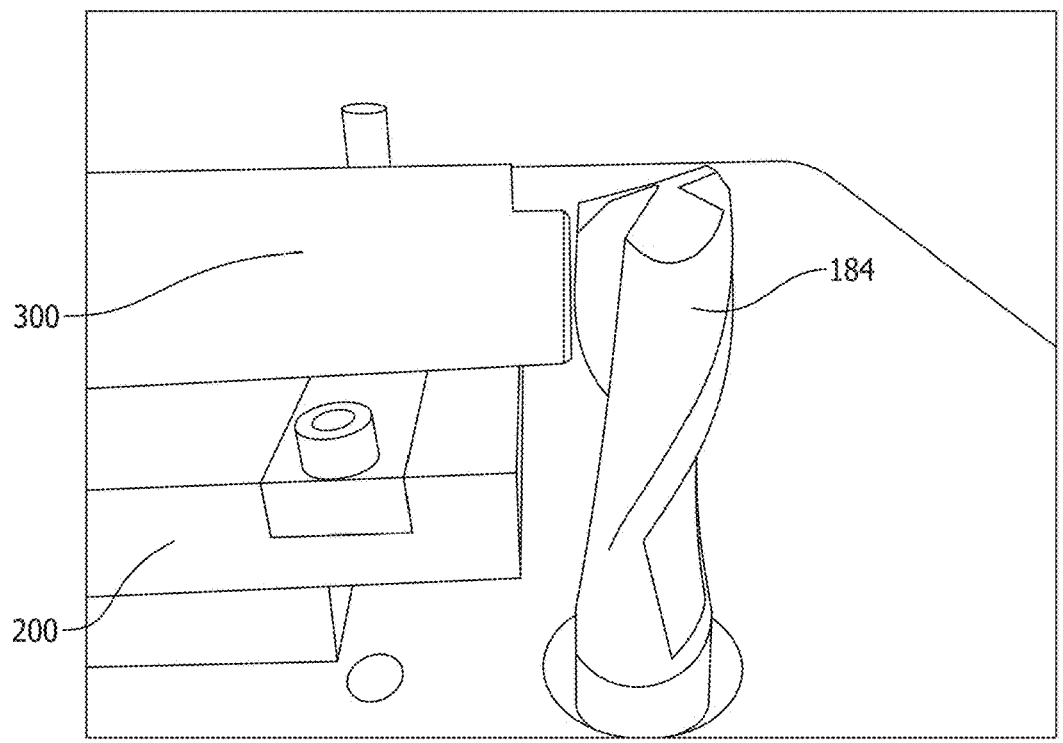
FIGS. 23A and 23B show steps of removing material from the barrel, according to an exemplary embodiment.
Figure 23B:
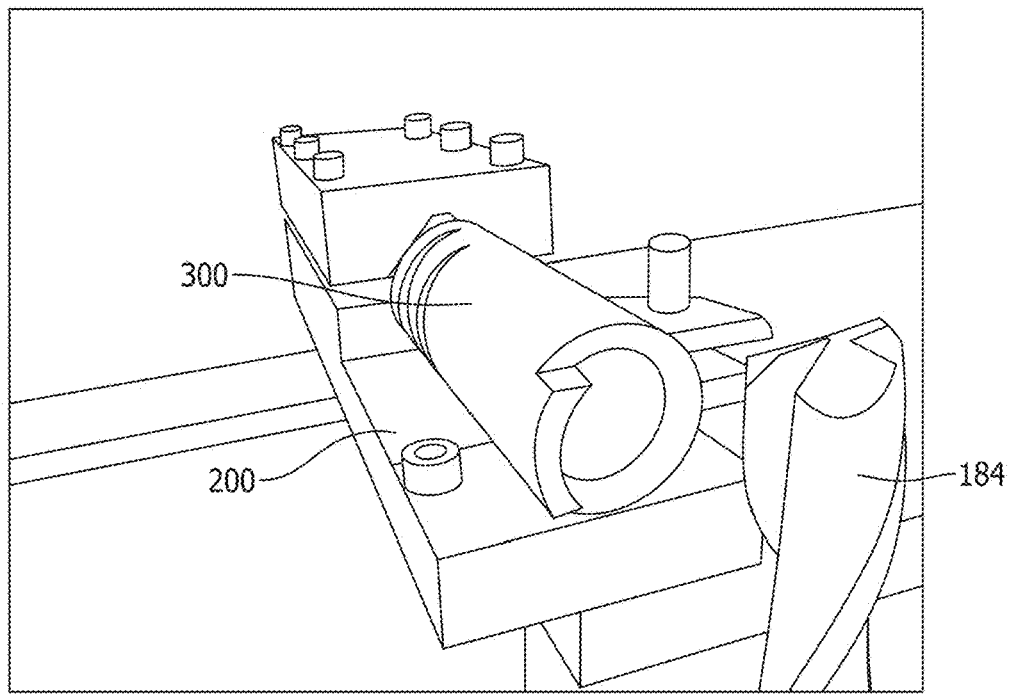

Once the x-y stage 400 and barrel holder 200 are assembled to the gun smith platform 100, the x-y stage is adjusted to be in the correct position and material may be removed. FIGS. 23A and 23B, show steps of removing material from the barrel, according to an exemplary embodiment. First, as shown in FIG. 23A, height of the end-mill 184 is adjusted to be slightly above the top of the barrel 300. The x-y stage 400 is moved so that the barrel 200 lines up with the end-mill 184 and is secured in position on the top plate 102. The stopper 470 on the x-y stage can then be moved to touch the top plate indicating the zero position. A feeler gauge representing the amount of material to be removed can then be used to set the top plate to remove the targeted amount of material. If a large amount of material needs to be removed, the $2^{nd}$ stop can be used to indicate the stop distance. Feeler gauges from the start or from the end can be used to set the intermediate steps.

As shown in FIG. 23B, the x-y stage 400 is moved from left to right across the end-mill 184 to remove material from the barrel 300. A downward pressure is applied on the x-y stage and towards the end-mail reducing any play from the rail 432 within the recessed track 129. This process is repeated progressively adjusting the x-y stage until the desire amount of material is removed.

Bottom-End Frame/Barrel Fit

Trimming the Bottom Lug

Figure 24:
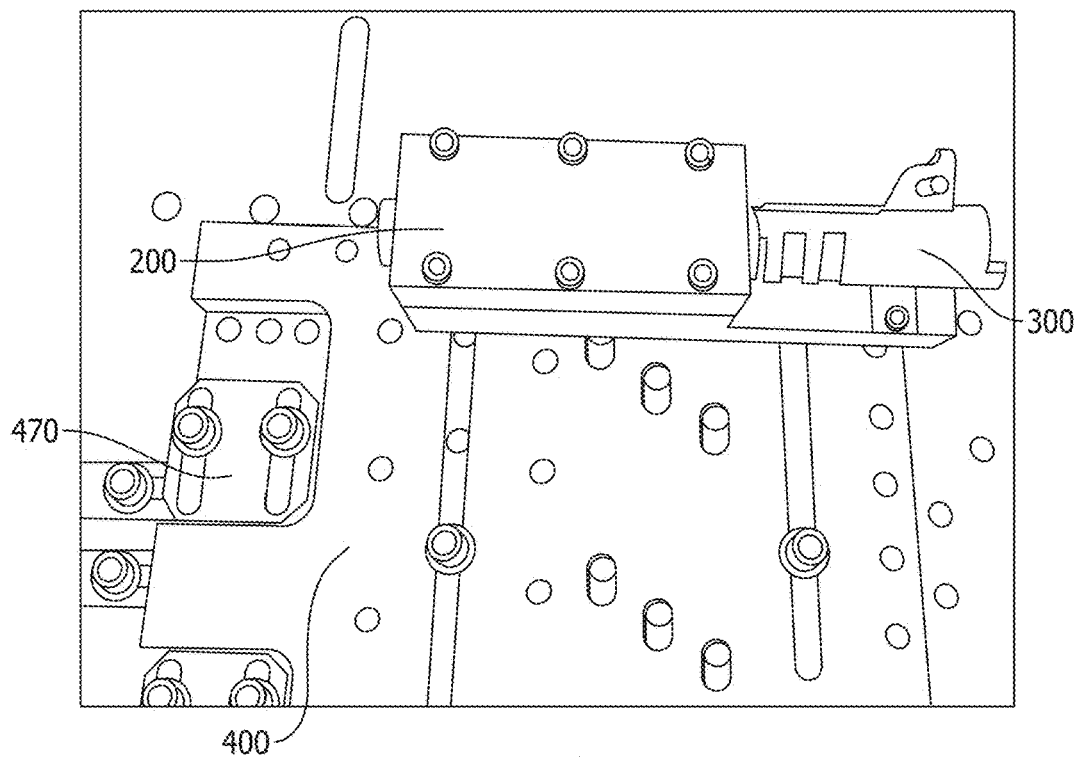
FIG. 24 shows steps for trimming a bottom lug of a barrel, according to one exemplary embodiment.

FIG. 24 shows steps for trimming a bottom lug of a barrel, according to one exemplary embodiment. For this process, the barrel holder 200 is again attached to the x-y stage 400 at a new position shown in FIG. 24. The barrel 300 may then be moved relative to the tool to trim the bottom lug of the barrel 300. A stopper 470 is used to set a point where the work tool 184 and barrel needs to meet the slide stop that sets the resting point of the slide on the frame. A feeler gauge is then used to set distances for each cut.

Sear and Hammer Jig

Sear Jig

Figure 25A:
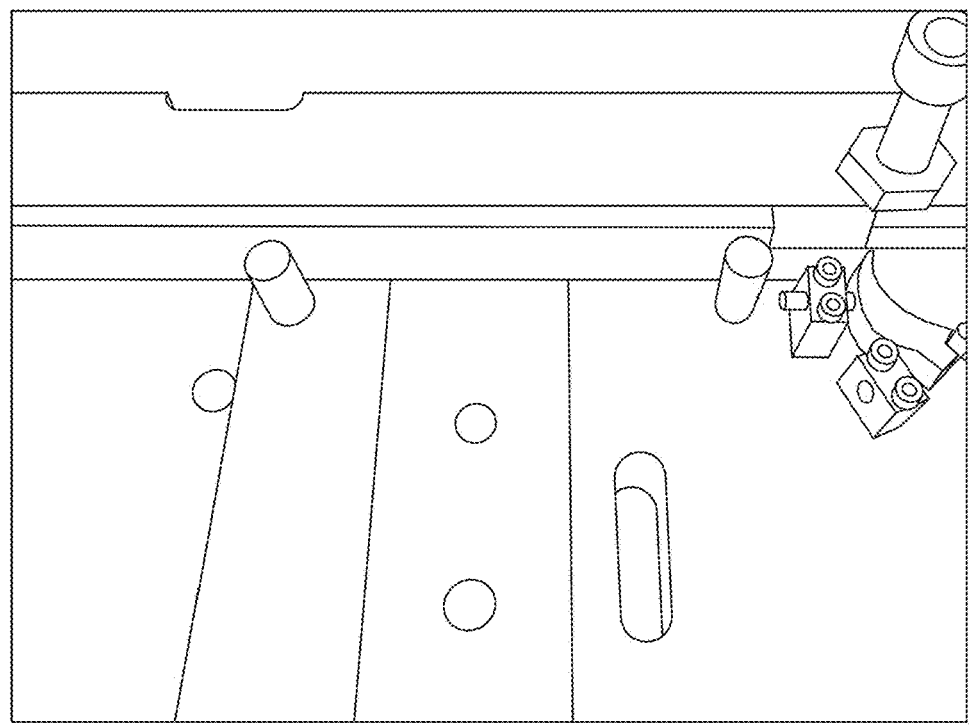
FIGS. 25A, 25B, 25C, and 25D show steps for finishing a sear, according to one exemplary embodiment.
Figure 25B:
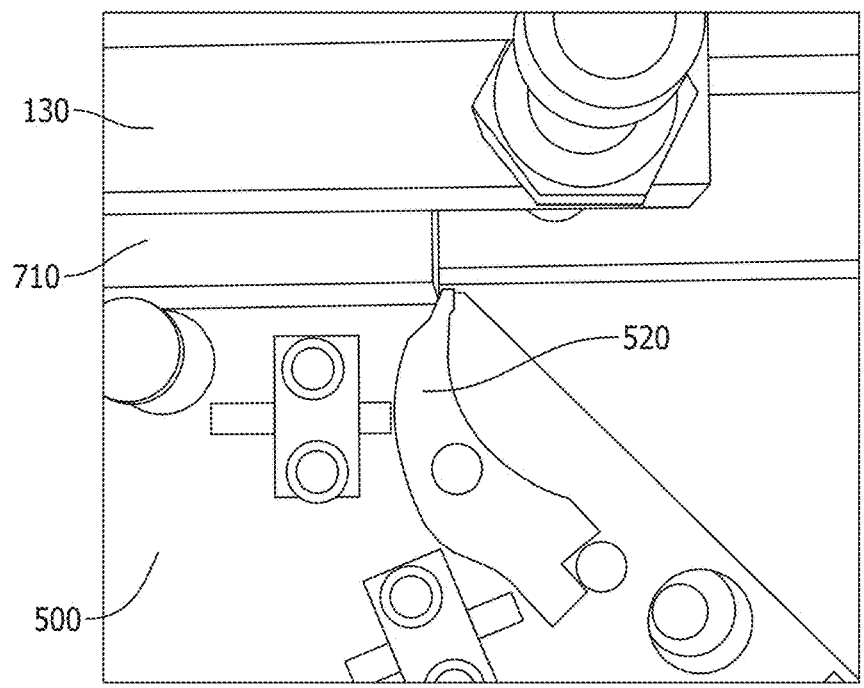
Figure 25C:
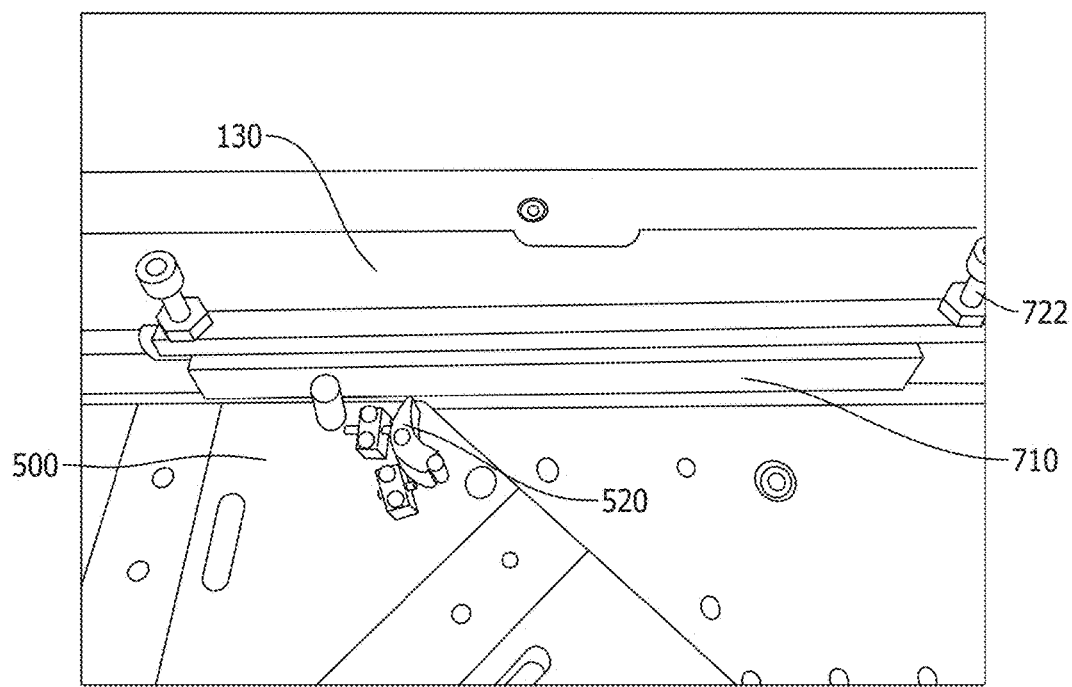

Finishing the sear is done using the setup described above with reference to FIGS. 8A and 8B. The fence 130 with a stone setup as explained with reference to FIGS. 11A-11E is used to remove material from the sear. FIGS. 25A, 25B, 25C, and 25D show steps for finishing a sear, according to one exemplary embodiment. The hammer block 500 with the sear 520 is brought into contact with the fence 130. Dowels 540 on the hammer block 500 are guides to set the stone 710. Feeler gauges are placed between the fence 130 and stone 710 until the stone 710 meets the dowels 540. This should bring the sear 520 into the correct position to remove material from the sear 520 as shown in FIG. 25B. The hammer block 500 is then slowly moved back and forth along the stone 710 to remove material from the sear as shown in FIG. 25C. A finer or courser stone 710, or a series of stones 710 may be used depending on the amount of material to be removed from the sear 520.

Figure 25D:
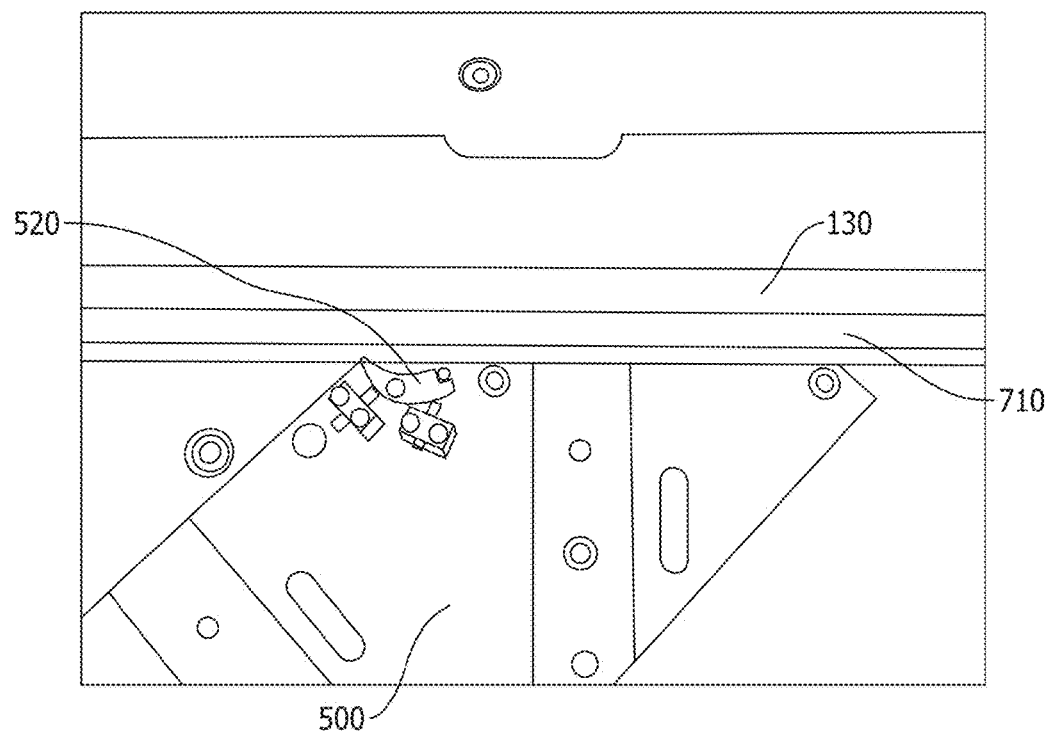

The secondary sear surface is finished by rotating the hammer block 500 by 45 degrees and again abutting the hammer block 500 against the fence 130 as shown in FIG. 25D. The secondary surface is then filed, brought to the desired specification, and polished. Note that the sear does not need to be removed from the block 500, but is maintained in the same position on the block 500. This helps to achieve the 45 degree angle by utilizing the features of the block 500.

Hammer Jig

Figure 26A:
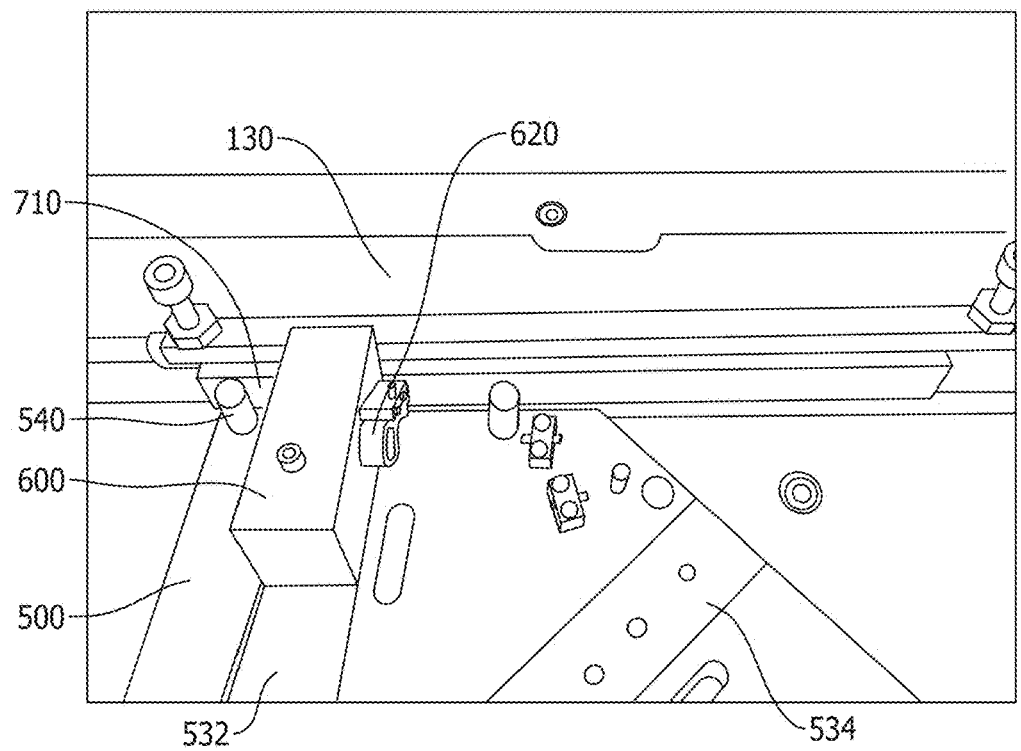
FIGS. 26A, 26B, and 26C show steps for finishing a hammer, according to an exemplary embodiment.
Figure 26B:
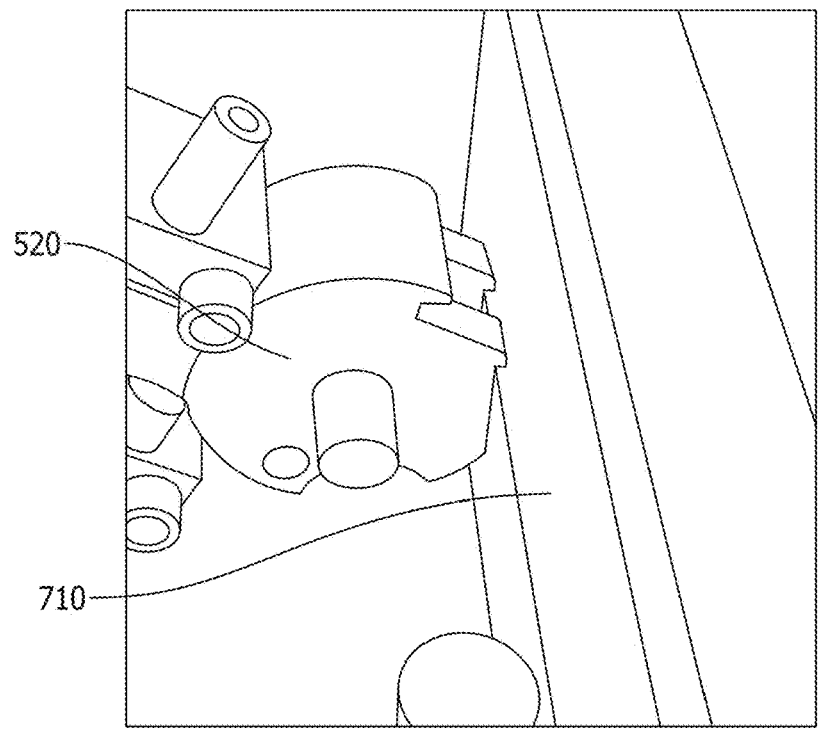
Figure 26C:
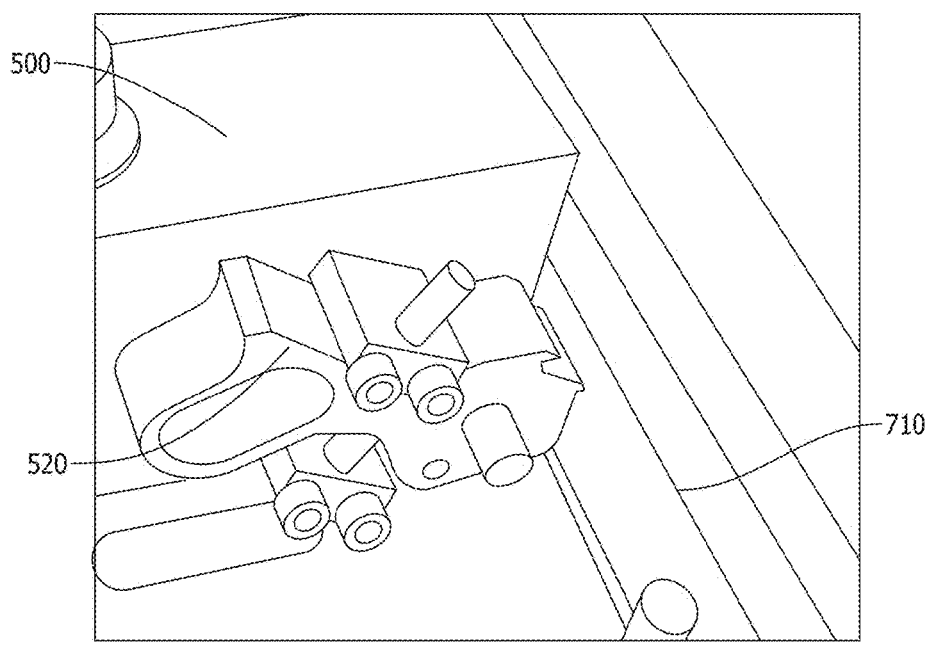

The hammer is also finished using the fence and stone setup as described in FIGS. 11A-11E. The hammer block 500 and hammer holder 600 are used as described in FIGS. 9A-10B. FIGS. 26A, 26B, and 26C show steps for finishing a hammer, according to an exemplary embodiment. In FIG. 26, the hammer holder 600 is secured in the recessed track 532. The hammer block 500 is pushed against the fence 130, and the stone 710 is set to contact the dowels 540. This allows the stone 710 to remove material from the hammer 520 as shown in FIG. 26B. The hammer hook depth is set by moving the hammer holder 500 to the other recessed track 534 to allow the stone to remove material from the hook of the hammer 520.

Slide Jig

Figure 27A:
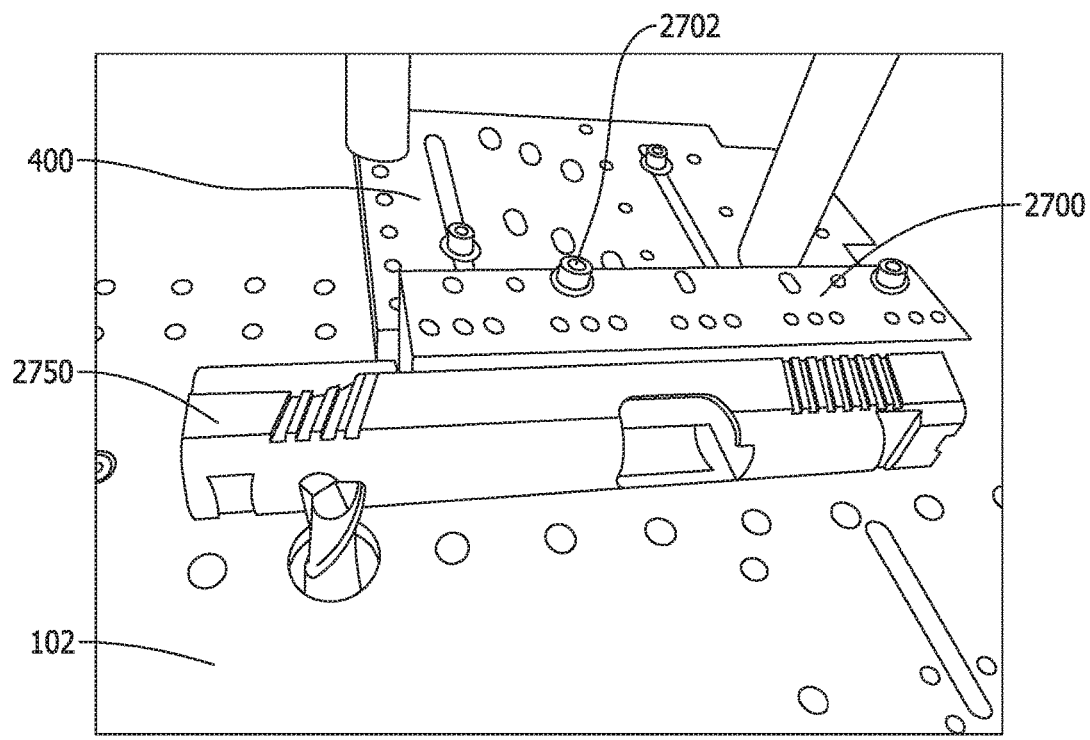
FIGS. 27A and 27B show a slide jig to finish a slide part of a firearm, according to an exemplary embodiment.
Figure 27B:
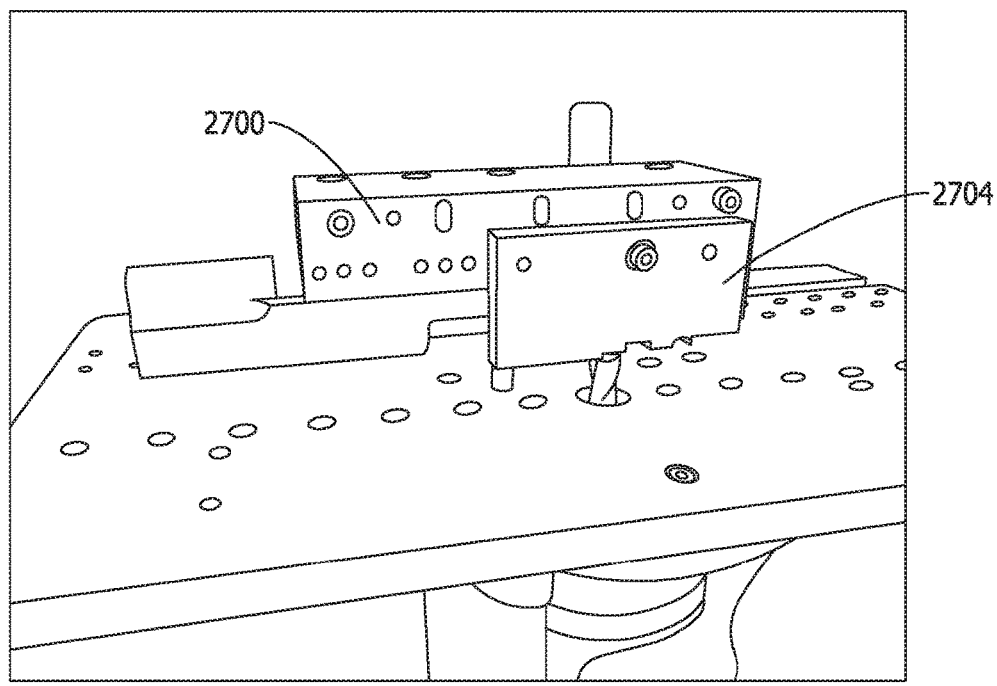

FIGS. 27A and 27B show a slide jig to finish a slide part of a firearm, according to an exemplary embodiment. As shown in FIG. 27A, a slide jig 2700 is clamped around a slide 2750 via fasteners 2702. The slide jig 2700 is attachable to the x-y stage 400 to position the slide jig 2700 for operations on the top plate 102. This allows adjustment of the slide jig 2700 on the top plate 102. With the slide jig 2700 attached to the x-y stage, the slide is held so that a top of the slide can be flattened as shown in FIG. 27A. The slide jig 2700 may also be configured as shown in FIG. 27B to allow a number of precision milling operations to install simple dovetail slights or complex bomar sights that have complex pattern milling.

Figure 28A:
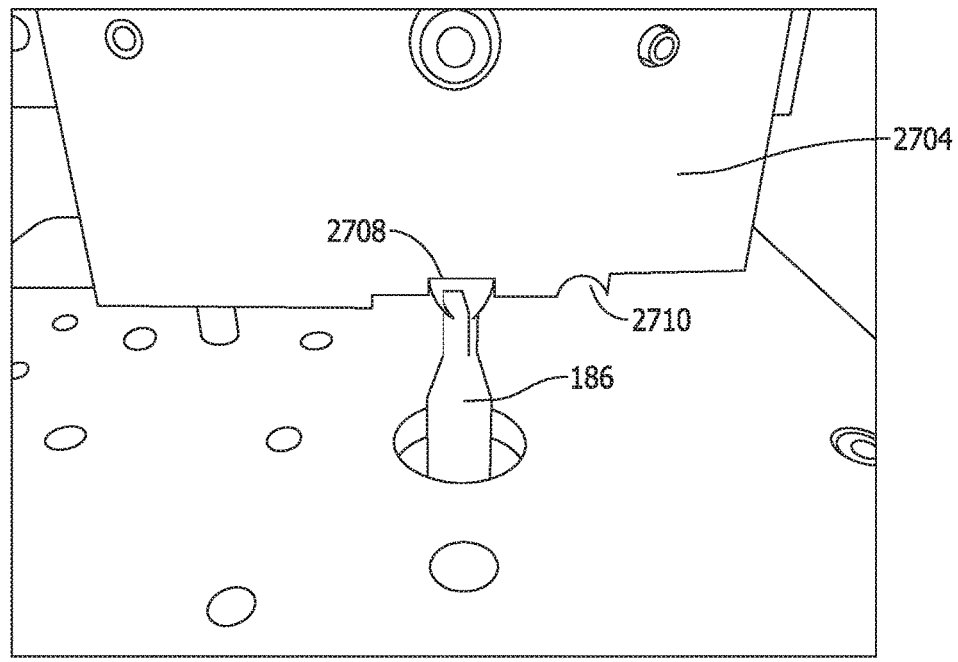
FIGS. 28A, 28B, 28C, 28D, 28E, and 28F show exemplary operations performed with a slide jig.
Figure 28B:
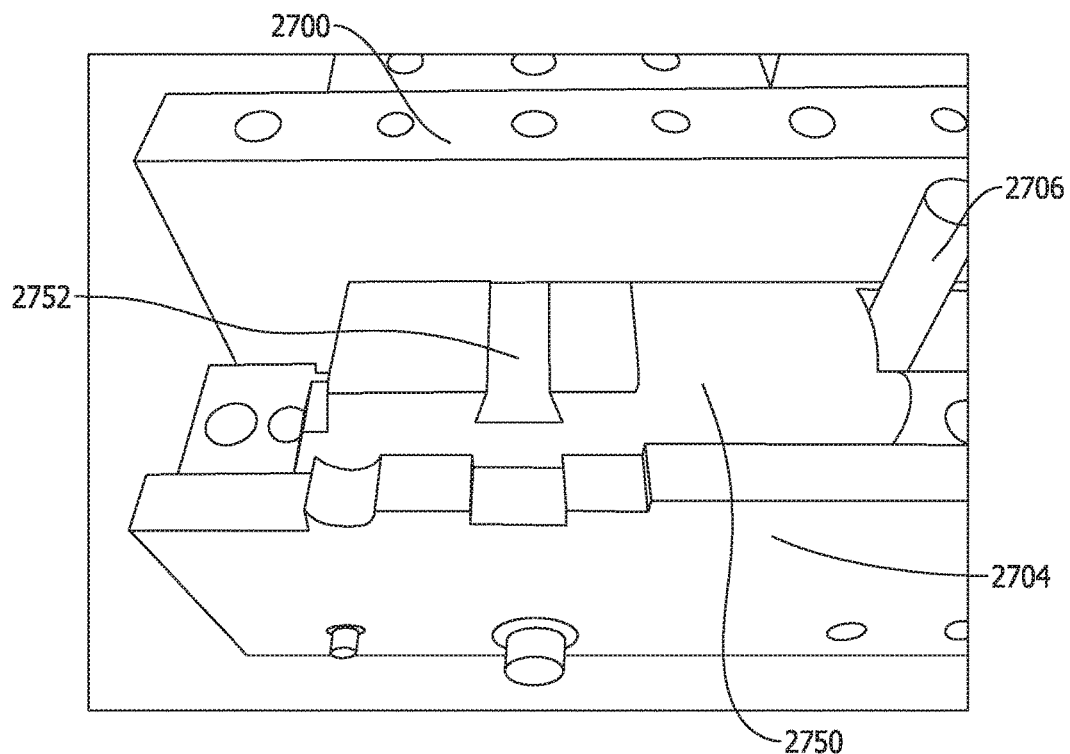

FIGS. 28A, 28B, 28C, 28D, 28E, and 28F show exemplary operations performed with a slide jig. As shown in FIG. 28B, a pin 2706 references the slide 2750 to the jig 2700 through the ejector port, touching the breech. This allows proper alignment to the slide 2750 for various operations. For dovetails as shown in FIGS. 28A and 28B, a first slide jig attachment 2704 comprises a dovetail template 2704 that aids to set the X and Y position relative to the slide 2750 attached to the jig 2700. With the use of stops 470 on the table and the x-y stage 400, the position on the slide 2750 (Y) can be set using the template 2708 and the Z (height) is set with the endmill depth setting on the router.

Figure 28C:
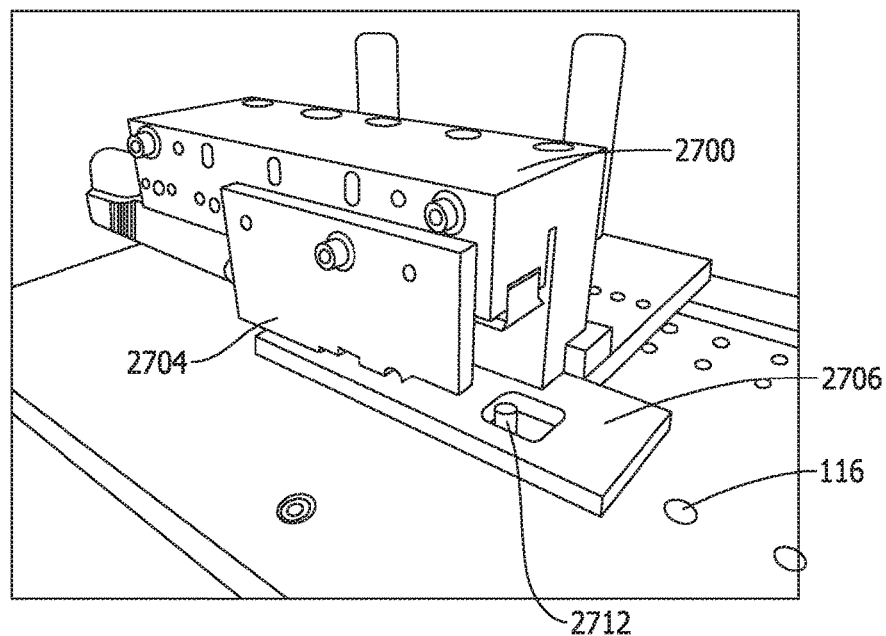
Figure 28D:
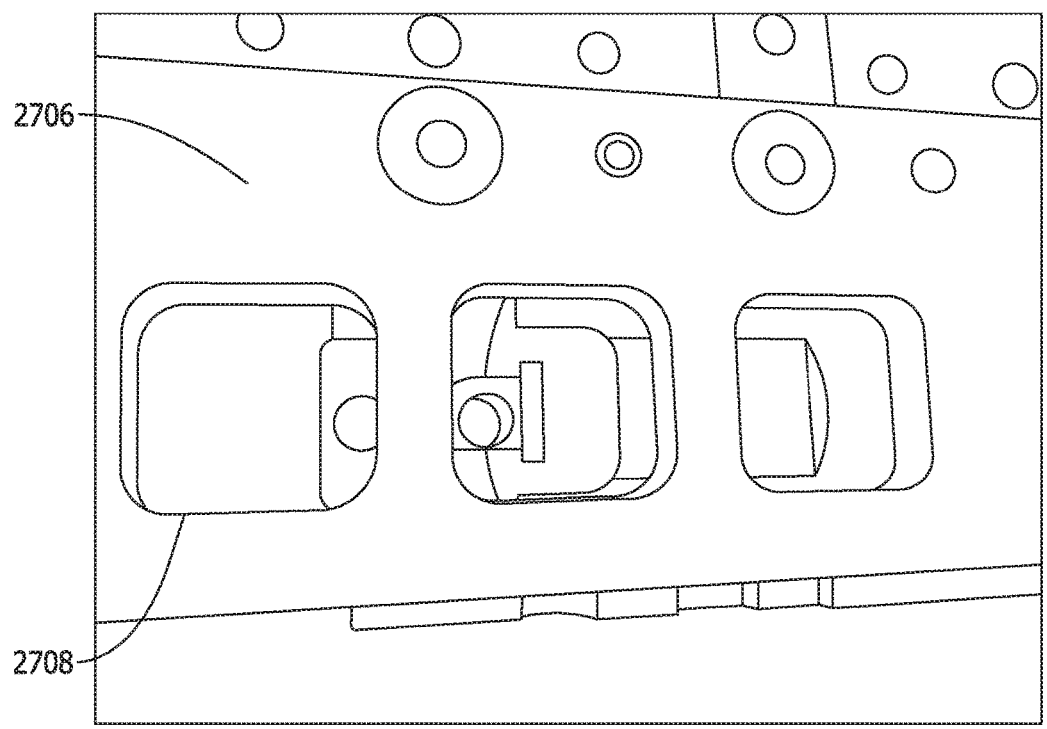
Figure 28E:
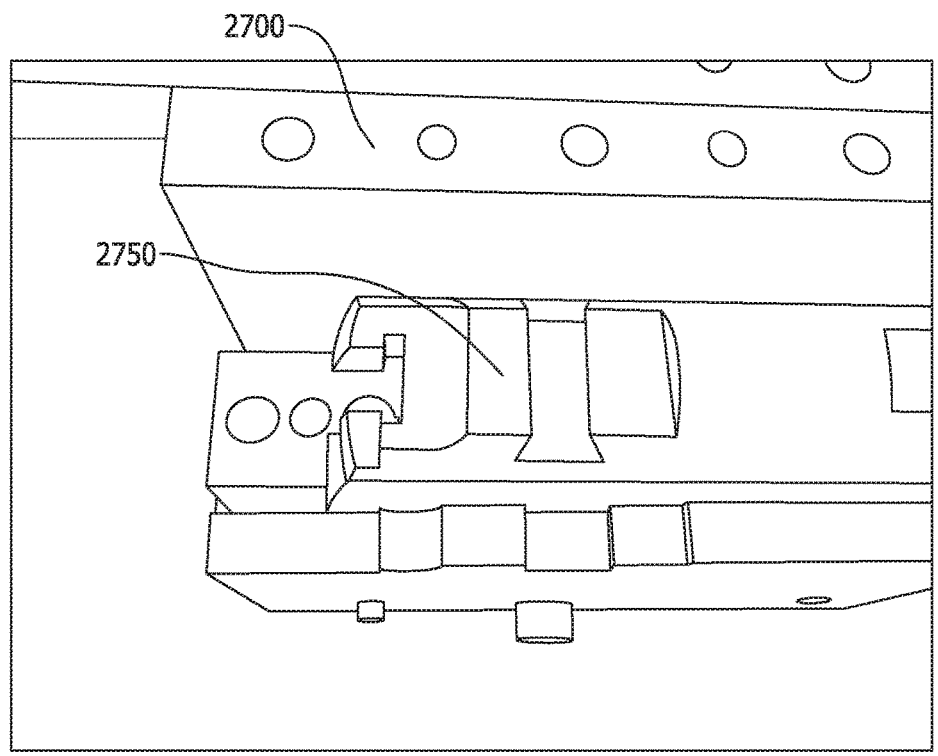
Figure 28F:
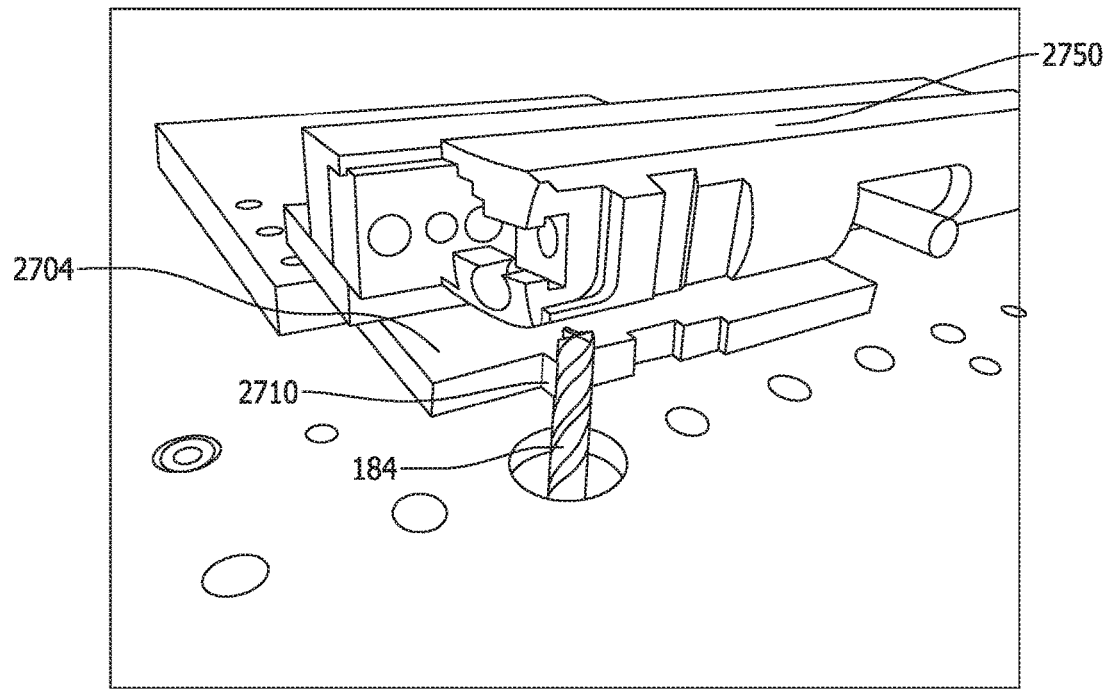

For the bomar style sights, a complex shape needs to be milled into the sight. As shown in FIG. 28C, two pins 2706 away from the center and received in alignment holes 116 are used for two templates 2708 in a slide jig attachment 2706 to guide the endmill to cut the features. This allows for no wear compared to traditional router jigs. Template 2710 (FIG. 28A) is also used to drill a final feature into the slide as shown in FIGS. 28E and 28F.

Slide Lug Sanding Tool

In order to obtain a proper fit, it is sometimes necessary to remove material inside of the slide to gain the required clearance for a proper barrel fit. The traditional tool is a U-shaped metal form where sand paper goes and a handle that allows the user to move it front to back to sand it down. This is a very time-consuming process.

Figure 29A:
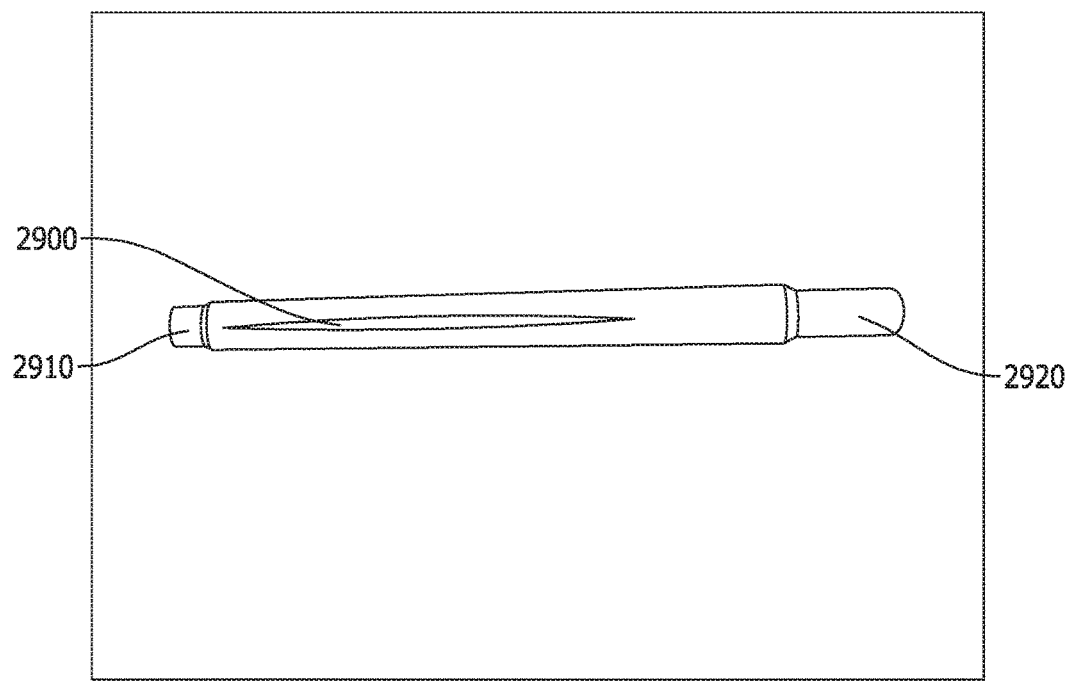
FIGS. 29A and 29B show a slide lug sanding tool, according to an exemplary embodiment.
Figure 29B:
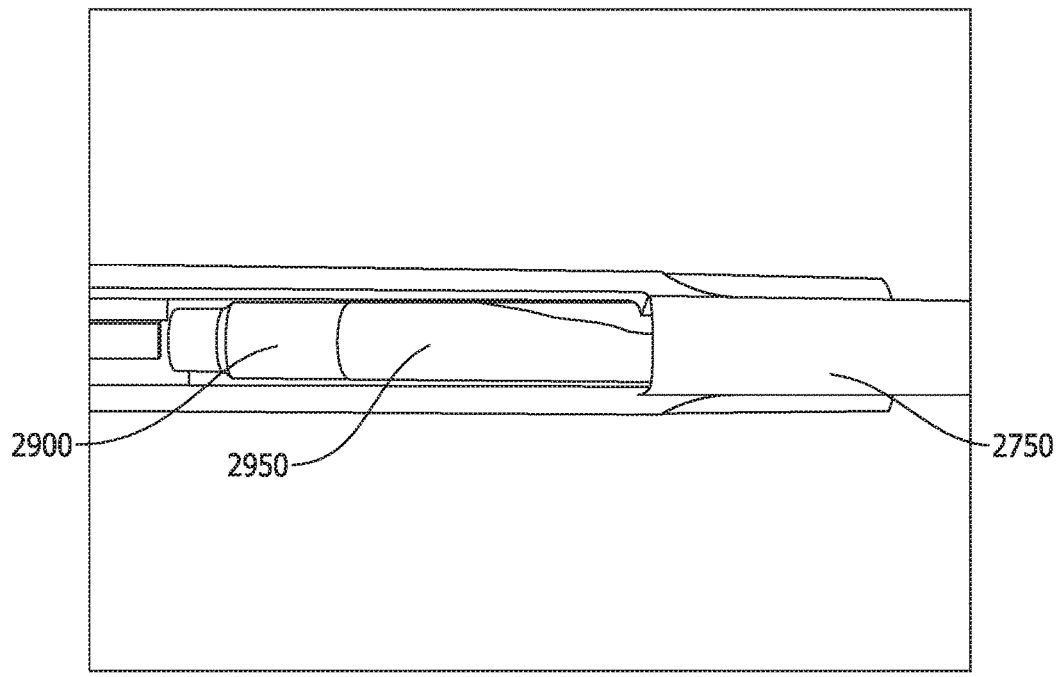

FIGS. 29A and 29B show a slide lug sanding tool, according to an exemplary embodiment. A slide lug sanding tool 2900 is comprised of a rod that is undersized where the user can wrap sandpaper 2950 to achieve the desired fit. This allows a drill to quickly remove metal. Using finer grit paper, this can also be used to polish the inside surface. A first end 2910 of the jig contains a smaller diameter knob that allows it to stop against the breech so the critical transition step area in the slide is not damaged. A second end 2920 can be attached to a drill to remove material. In one embodiment, a slot can be cut into the shaft to make it easier to hold the sandpaper. In another embodiment, an adhesive may be used to hold the sandpaper.

Test Frame

Figure 30:
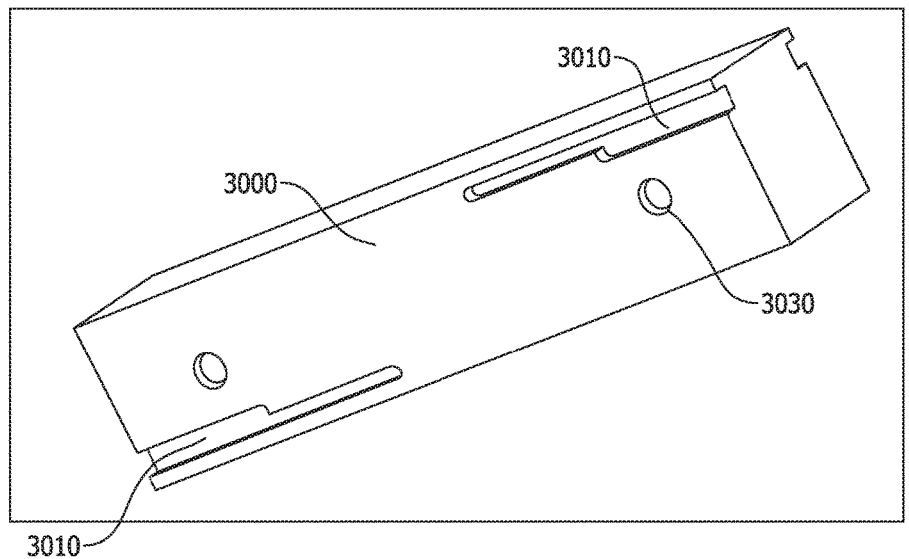
FIG. 30 shows a test frame according to an exemplary embodiment.

FIG. 30 shows a test frame according to an exemplary embodiment. Typically for precision guns, the groove depth, width, and the top frame rail width are under cut and filed by hand for a precise fit that has less than 0.005" of fit tolerance. This is a very time-consuming process and it is difficult to maintain the required parallelism using hand files. On the other hand, if the frame can be precisely cut, one can achieve both a precise fit and reduced time and effort; however, it is very difficult to make slide measurements and the dimensions change as a function of length along the slide.

The general principle is that a frame to slide fit requires fitting of 5 different settings to shape 9 surfaces. The purpose of the test frame is to clearance all features but the $1^{st}$ step. This allows the user to cut part of the test frame and test for fit with the slide. Adjustments can be made to achieve the desired fit. When achieved, the test frame and actual frame is process with this setting. Afterwards, all features but the next one that needs to shaped by the process step are clearanced to allow cutting of the test frame and fit with the slide. When achieved, the test and actual frame is run through the process. This is then repeated until all the steps are complete. In this case, the finished frame should be able to fit the frame with little or no hand fitting for a true custom fit.

The gun smith platform described herein makes use of a test frame 3000 that can be used to test and adjust the setting on the GSPlat, and then check its fit to the actual slide. This allows for precise adjustments that will fit the actual side without having to make precision measurements and to adjust the GSPlat to those measurements (each giving errors that compound).

The test frame 3000 is the same or nearly the same width as an actual frame. If the widths are off, shims can be added to accommodate the differences between the test frame 3000 and the router table. To fit the slide, the following adjustments and cuts need to be made.

1. The width of the top rail (height of the ⅜ endmill),
2. The bottom edge of the groove (distance between the fence and endmill),
3. The depth of the groove (end mill height to determine the width between the groove), and
4. The top edge of the groove (distance between the fence and endmill).

The test frame 3000 has features 3010 that are undersized for the remaining features that allow the user to test and adjust one setting at a time. For instance, for step 1, the width of the cut is equal to the width of the top of the frame. Since only the height is critical, the end mill can be easily adjusted so it falls between the groove making the endmill to frame distance easy to set. The set of features on the test block from the edge has features in 2-4 as undersized so it will not limit the fit. This allows the user to focus on setting and test cutting the top rail width and then test fitting the test block to the actual slide. When the desired fit is achieved, the user cuts the width of the top rail all the way through on the test block (both sides) then repeats on the actual frame. Now both the test block and frame have the desired width of the top rail.

The user then sets up the end-mill to achieve the proper bottom edge. Since the block is made of Al, the height can be set to match the test fixture and only part of the material is cut at each time allowing for a test fit with the slide since #3-4 are undersized and will not limit the fit (using up ⅛ to ¼ of the $2^{nd}$ set of feature). Once the bottom edge is set, the endmill is lowered and the frame is cut from the bottom up in 0.005" increments. At each pass, the test frame is also cut the entire distance and checked to see if it fits the frame. If not, the endmill height is incremented, the test frame and actual frame cut and test fit until the desired final height is achieved. At this time, the test piece will have the bottom of the groove set at the proper height and depth and it is cut through the entire test frame.

The final step is to decrease the fence distance to cut the top edge of the groove. This can be done by testing cutting ½" at a time until the desired fit is achieved. Afterwards, the test frame is cut all the way through and can be test fitted along the entire length of the frame. If satisfactory, this setting can be used to cut the actual frame.

This process and test frame allow for precise fitting. For GSPlat, the test frame has thread holes 3030 to use existing handles. For other style frames, the steps in the side are added to match the frame and fit into the slide holder for this step. The shown test frame is for the government class frames and allow for two test fits per given block.

A test frame with the slide stop and safety holes can be added to the test frame to make it compatible with the FrmJig. The FrmJig without the roll pins, can allow for precise setting required to achieve a "accurate" slide/frame fit.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A gun smith platform comprising:
    a top plate comprising:
        a tool hole centrally disposed on the top plate and extending through the top plate through which a work piece attached to a work tool mounted to a bottom side of the top plate may extend,
        a plurality of alignment holes extending in a linear pattern from the tool hole, the alignment holes configured to receive alignment pins,
        at least one row of threaded mounting holes disposed parallel to the linear pattern of alignment holes, and
        a recessed track disposed parallel to the at least one row of threaded mounting holes; and
    four legs attached to and supporting the top plate.

2. The gun smith platform of claim 1, further comprising a fence configured to attach to the top plate.

3. The gun smith platform of claim 2, wherein the top plate comprises an anchor fastening hole, an elongated fence hole, and stand holes, the fence comprises a first end and a second end, and the fence is anchored to the top plate at the anchor fastening hole and the first end and is adjustable along the top plate along a length of the elongated fence hole at the second end.

4. The gun smith platform of claim 3, further comprising an adjustment mechanism mounted at the stand holes on the top plate, the adjustment mechanism changing a position of the second end of the fence along the elongated hole.

5. The gun smith platform of claim 4, wherein the adjustment mechanism comprises a handle driving a screw to change the position of the second end of the fence along the elongated hole.

6. The gun smith platform according to claim 2, wherein the fence comprises a shelf on at least one side, the shelf comprising threaded fence holes in a symmetrical pattern about a center of the fence.

7. The gun smith platform of claim 1, further comprising a work tool template having pins to align the template via the alignment holes and a tool alignment hole configured to define a position of the work tool mounted on the bottom side of the top plate.

8. The gun smith platform of claim 1, further comprising an x-y stage disposed on the top plate, the x-y stage comprising a front plate and a rear plate that are movable relative to one another.

9. The gun smith platform of claim 8, wherein the rear plate comprises a rear plate rail on a first side of the rear plate that is received in the recessed track of the top plate and comprises a rear plate recessed track on a second side of the plate, and the front plate has a front plate rail that is received in the rear plate recessed track.

10. The template based gun finishing system comprising:
    a gun smith platform comprising:
        a top plate comprising:
            a tool hole centrally disposed on the top plate and extending through the top plate through which a work piece attached to a work tool mounted to a bottom side of the top plate may extend,
            a plurality of alignment holes extending in a linear pattern from the tool hole, the alignment holes configured to receive alignment pins,
            at least one row of threaded mounting holes disposed parallel to the linear pattern of alignment holes, and
            a recessed track disposed parallel to the at least one row of threaded mounting holes; and
        four legs attached to and supporting the top plate; and an x-y stage disposed on the top plate, the x-y stage comprising a front plate and a rear plate that are movable relative to one another, the rear plate comprising a rear plate rail on a first side of the rear plate that is received in the recessed track of the top plate and comprises a rear plate recessed track on a second side of the plate, and the front plate having a front plate rail that is received in the rear plate recessed track.

11. The system of claim 10, further comprising
a self-centering barrel holder comprising a base portion and a clamping portion attachable to the base portion, the base portion defining a v-shaped self-centering barrel rest, the base portion being removably attachable to the x-y stage.

12. The system of claim 10, further comprising a hammer block, the hammer block comprising a sear holder and a hammer holder.

13. The system of claim 12, wherein the sear holder comprises guidance pins to orient a sear in a default position and comprises sear holder blocks to orient the sear in a custom position.

14. The system of claim 12, wherein the hammer block comprises a first side and an adjacent second side oriented forty-five degrees from the first side.

15. The system of claim 14, wherein the hammer block comprises a first recessed track extending from the first side and a second recessed track extending from the second side, the hammer holder being configured to be secured in the first and second recessed tracks.

16. The system of claim 12, wherein the hammer holder comprises guidance pins to orient the hammer in a default position and comprises hammer holder blocks to orient the hammer in a customer position.

17. The system of claim 10, further comprising a frame holder comprising:
a front side and a rear side that are connected to hold a frame therebetween,
a frame center tool disposed between the front side and the rear side, the frame center tool comprising a pin hole and a u-shaped recess to orient the frame holder relative to the tool hole.

18. The system of claim 17, wherein a pin extends through the pin hole and into the one of the alignment holes to orient the frame holder relative to the tool hole.

19. The system of claim 17, wherein the frame holder comprises a hammer pin guide hole and a sear pin guide hole in each of the front and the rear sides of the frame holder.

20. The system of claim 10, further comprising a beaver tail jig that is aligned to the alignment holes and comprises two sets of holes to facilitate two different beaver tail radii.

* * * * *